United States Patent
Yamagata et al.

(10) Patent No.: US 8,294,230 B2
(45) Date of Patent: Oct. 23, 2012

(54) SURFACE PROFILE SENSOR AND METHOD FOR MANUFACTURING THE SAME

(75) Inventors: Takahiro Yamagata, Kawasaki (JP); Kouichi Nagai, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 42 days.

(21) Appl. No.: 12/548,027

(22) Filed: Aug. 26, 2009

(65) Prior Publication Data

US 2009/0309180 A1   Dec. 17, 2009

Related U.S. Application Data

(63) Continuation of application No. PCT/JP2007/057670, filed on Apr. 5, 2007.

(51) Int. Cl.
*H01L 31/0216* (2006.01)
(52) U.S. Cl. ............ 257/435; 257/E31.11; 257/E31.121
(58) Field of Classification Search .............. 257/71, 257/417, 414, 415; 702/52
See application file for complete search history.

(56) References Cited

U.S. PATENT DOCUMENTS

| | | | |
|---|---|---|---|
| 4,887,166 A * | 12/1989 | Kakinuma et al. ........... | 358/471 |
| 5,559,504 A | 9/1996 | Itsumi et al. | |
| 5,678,486 A | 10/1997 | Bachmeir et al. | |
| 5,745,046 A | 4/1998 | Itsumi et al. | |
| 5,858,477 A | 1/1999 | Veerasamy et al. | |
| 6,143,142 A | 11/2000 | Shi et al. | |
| 6,261,693 B1 | 7/2001 | Veerasamy | |
| 6,273,488 B1 | 8/2001 | Pike et al. | |
| 6,277,480 B1 | 8/2001 | Veerasamy et al. | |
| 6,280,834 B1 | 8/2001 | Veerasamy et al. | |
| 6,284,377 B1 | 9/2001 | Veerasamy | |
| 6,303,225 B1 | 10/2001 | Veerasamy | |
| 6,303,226 B2 | 10/2001 | Veerasamy | |
| 6,312,808 B1 | 11/2001 | Veerasamy et al. | |
| 6,335,086 B1 | 1/2002 | Veerasamy | |
| 6,338,901 B1 | 1/2002 | Veerasamy | |
| 6,340,192 B2 | 1/2002 | Pike et al. | |
| 6,368,664 B1 | 4/2002 | Veerasamy et al. | |
| 6,387,443 B1 | 5/2002 | Shi et al. | |
| 6,395,333 B2 | 5/2002 | Veerasamy | |
| 6,416,816 B2 | 7/2002 | Veerasamy et al. | |

(Continued)

FOREIGN PATENT DOCUMENTS

EP  0194783 A2  9/1986

(Continued)

OTHER PUBLICATIONS

International Search Report of PCT/JP2007/057670, date of mailing Jun. 5, 2007.

*Primary Examiner* — Zandra Smith
*Assistant Examiner* — Paul Patton
(74) *Attorney, Agent, or Firm* — Westerman, Hattori, Daniels & Adrian, LLP

(57) ABSTRACT

A surface profile sensor includes an interlayer insulating film provided with a planarized upper surface formed above a semiconductor substrate, a detection electrode film formed on the interlayer insulating film, an upper insulating film formed on the detection electrode film and the interlayer insulating film and including the surface on which a silicon nitride film is exposed, and a protection insulating film deposited on the upper insulating film and made of a tetrahedral amorphous carbon (ta-C) film including a window formed on the detection electrode film.

12 Claims, 64 Drawing Sheets

U.S. PATENT DOCUMENTS

| | | |
|---|---|---|
| 6,447,891 B1 | 9/2002 | Veerasamy et al. |
| 6,461,731 B1 | 10/2002 | Veerasamy et al. |
| 6,472,017 B2 | 10/2002 | Veerasamy et al. |
| 6,475,573 B1 | 11/2002 | Veerasamy et al. |
| 6,491,987 B2 | 12/2002 | Veerasamy |
| 6,531,182 B2 | 3/2003 | Veerasamy et al. |
| 6,537,668 B1 | 3/2003 | Vijayen et al. |
| 6,544,627 B1 | 4/2003 | Vijayen et al. |
| 6,592,992 B2 | 7/2003 | Veerasamy |
| 6,592,993 B2 | 7/2003 | Veerasamy |
| 6,638,570 B2 | 10/2003 | Veerasamy |
| 6,663,753 B2 | 12/2003 | Veerasamy et al. |
| 6,709,605 B2 | 3/2004 | Tonosaki et al. |
| 6,713,178 B2 | 3/2004 | Veerasamy |
| 6,713,179 B2 | 3/2004 | Veerasamy |
| 6,740,211 B2 | 5/2004 | Thomsen et al. |
| 6,740,384 B2 | 5/2004 | Veerasamy et al. |
| 6,764,579 B2 | 7/2004 | Veerasamy et al. |
| 6,777,030 B2 | 8/2004 | Veerasamy et al. |
| 6,780,726 B2 * | 8/2004 | Thomas ............... 438/393 |
| 6,793,979 B2 | 9/2004 | Veerasamy |
| 6,805,891 B2 | 10/2004 | Vijayen et al. |
| 6,808,606 B2 | 10/2004 | Thomsen et al. |
| 6,899,828 B2 | 5/2005 | Shi et al. |
| 6,923,891 B2 | 8/2005 | Cheah et al. |
| 7,033,649 B2 | 4/2006 | Veerasamy |
| 7,049,003 B2 | 5/2006 | Thomsen et al. |
| 7,067,175 B2 | 6/2006 | Veerasamy |
| 7,402,350 B2 | 7/2008 | Veerasamy et al. |
| 7,513,215 B2 | 4/2009 | Vijayen et al. |
| 7,544,397 B2 | 6/2009 | Veerasamy et al. |
| 7,692,200 B2 * | 4/2010 | Kamikawa et al. ............. 257/79 |
| 7,768,082 B2 * | 8/2010 | Nagai ............................ 257/417 |
| 2003/0203543 A1 | 10/2003 | Tanabe et al. |
| 2004/0185590 A1 | 9/2004 | Miyai et al. |
| 2004/0239342 A1 | 12/2004 | Yoshida et al. |
| 2005/0259853 A1 | 11/2005 | Miyai et al. |
| 2006/0125490 A1 | 6/2006 | Yoshida et al. |
| 2006/0166009 A1 | 7/2006 | Veerasamy |
| 2007/0198980 A1 | 8/2007 | Kwon |
| 2009/0162572 A1 | 6/2009 | Veerasamy et al. |

FOREIGN PATENT DOCUMENTS

| | | |
|---|---|---|
| JP | 61-221883 A | 10/1986 |
| JP | 05-061965 A | 3/1993 |
| JP | 07-168930 A | 7/1995 |
| JP | 2000-512053 A | 9/2000 |
| JP | 2001-506319 A | 5/2001 |
| JP | 2002-194123 A | 7/2002 |
| JP | 2002-294470 A | 10/2002 |
| JP | 2002-544380 A | 12/2002 |
| JP | 2003-058872 A | 2/2003 |
| JP | 2003-269907 A | 9/2003 |
| JP | 2003-301257 A | 10/2003 |
| JP | 2003-534223 A | 11/2003 |
| JP | 2004-218087 A | 8/2004 |
| JP | 2004-256837 A | 9/2004 |
| JP | 2004-333476 A | 11/2004 |
| JP | 3624843 B2 | 3/2005 |
| JP | 3658342 B2 | 6/2005 |
| WO | 98/41666 A1 | 9/1998 |

* cited by examiner

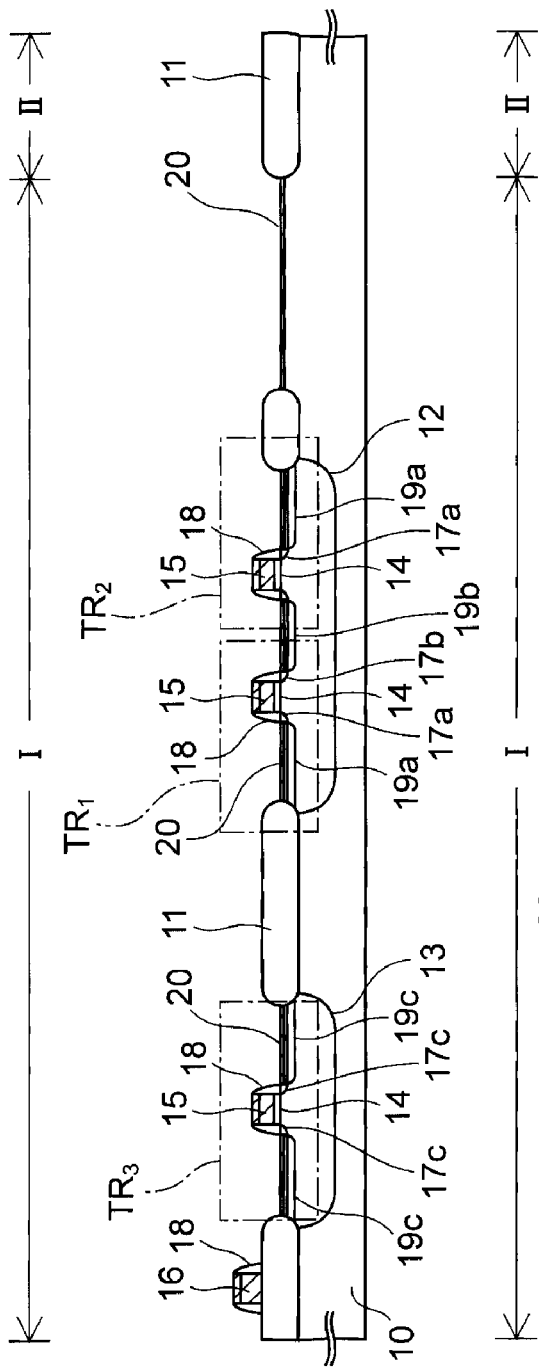
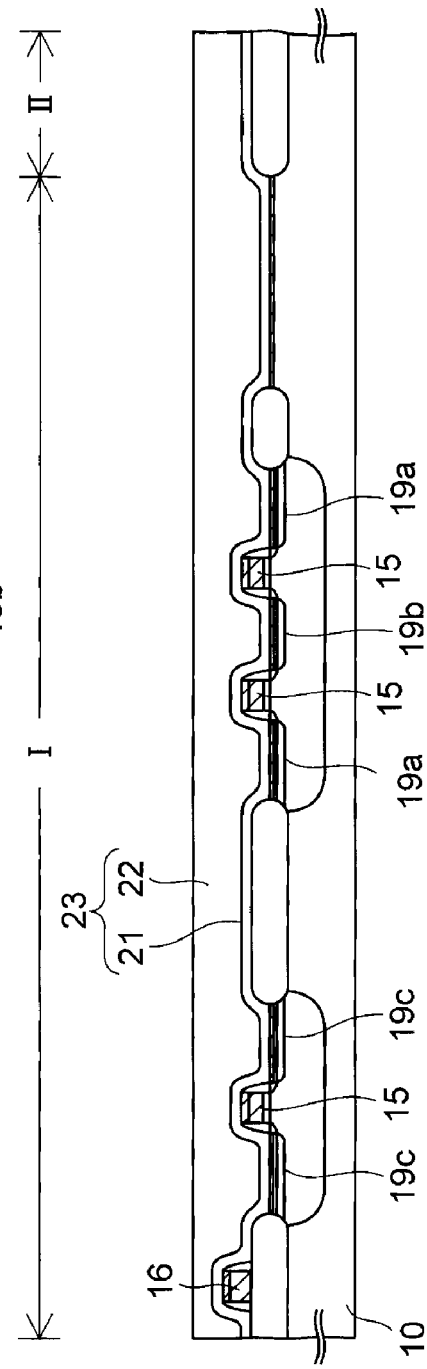

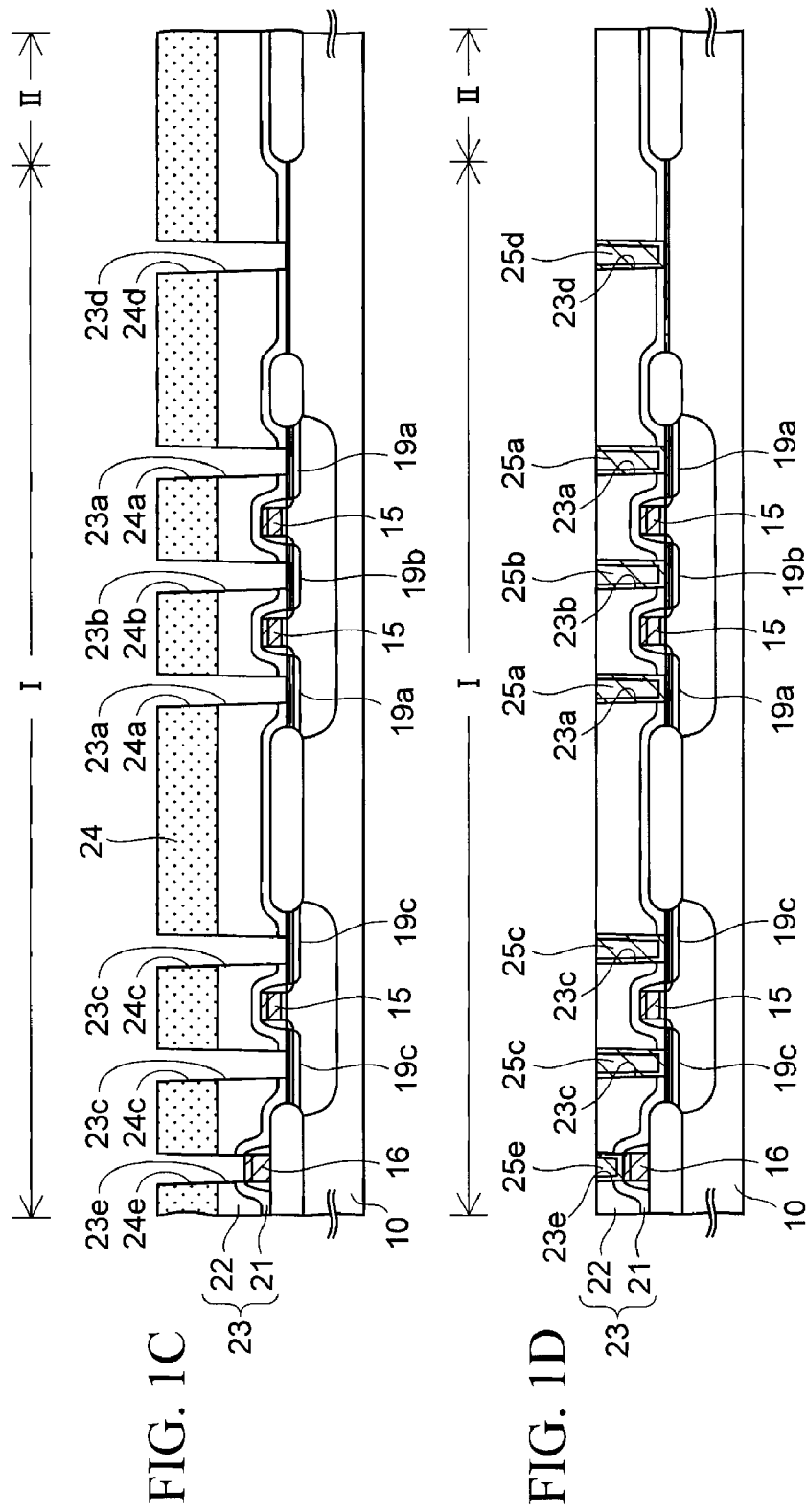

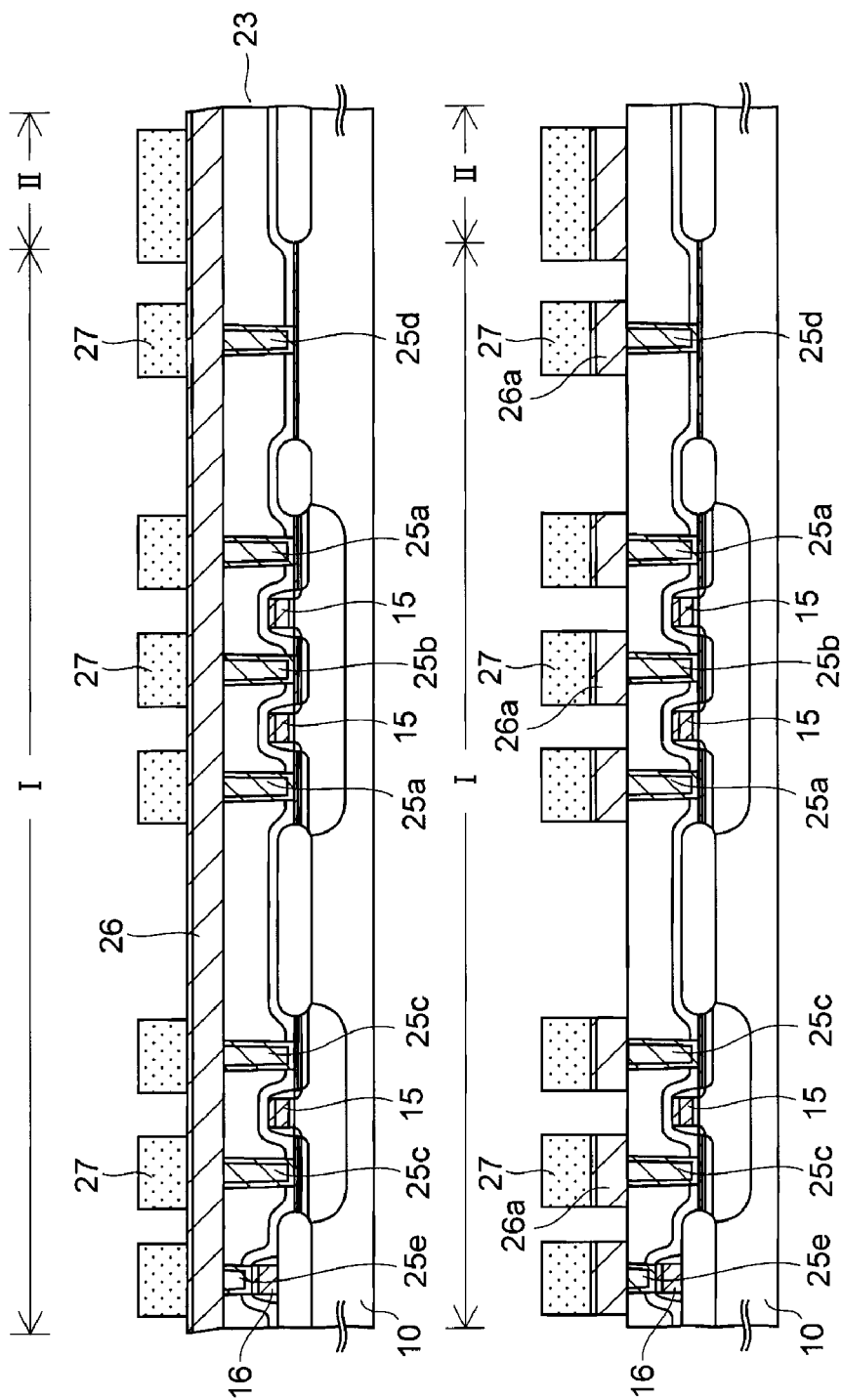

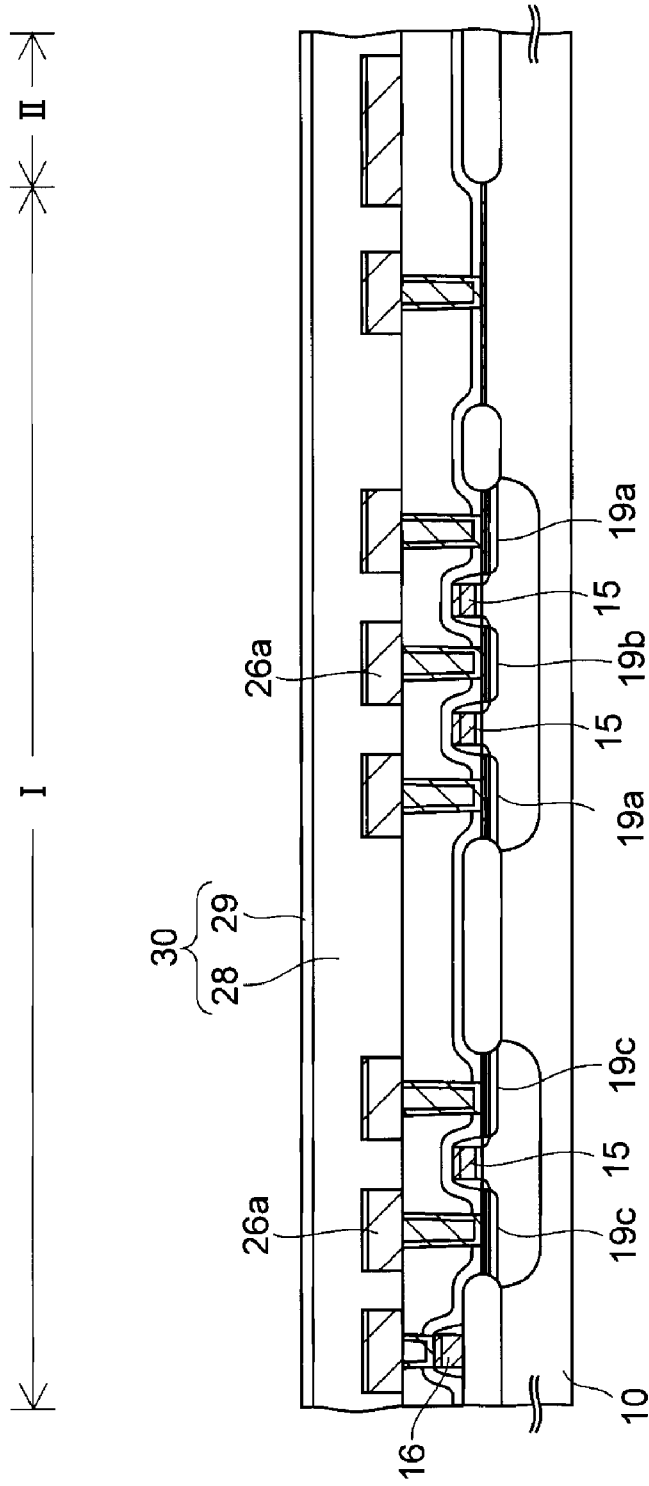

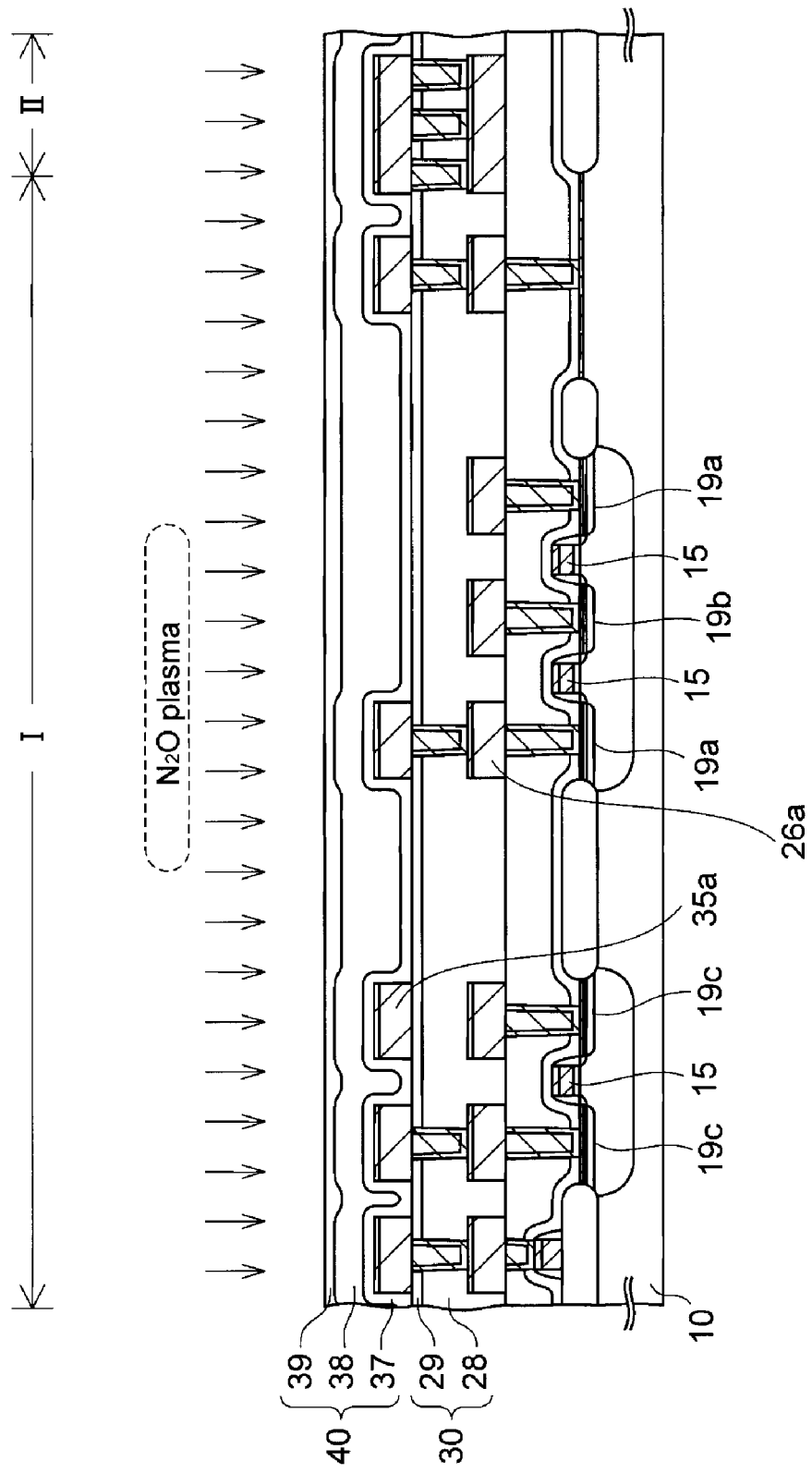

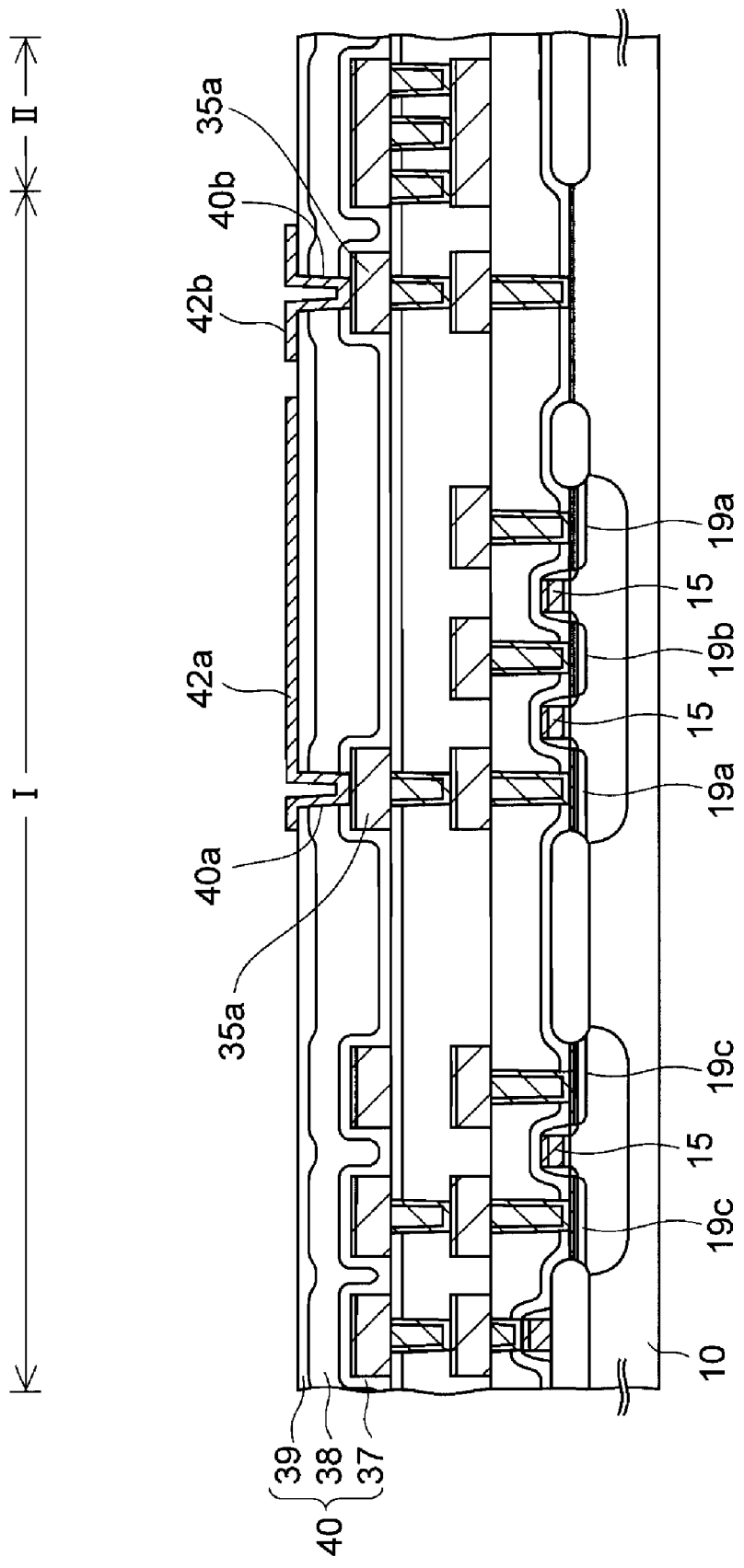

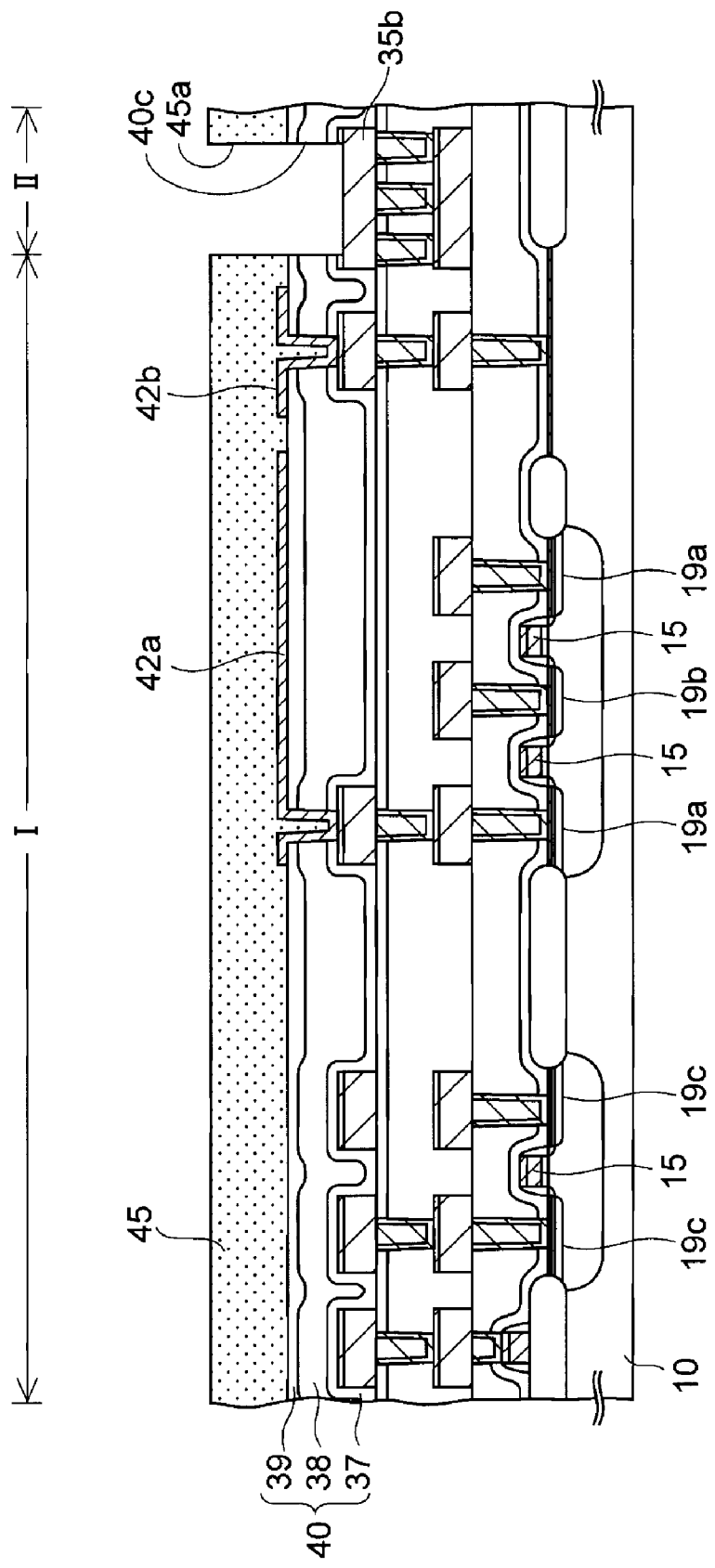

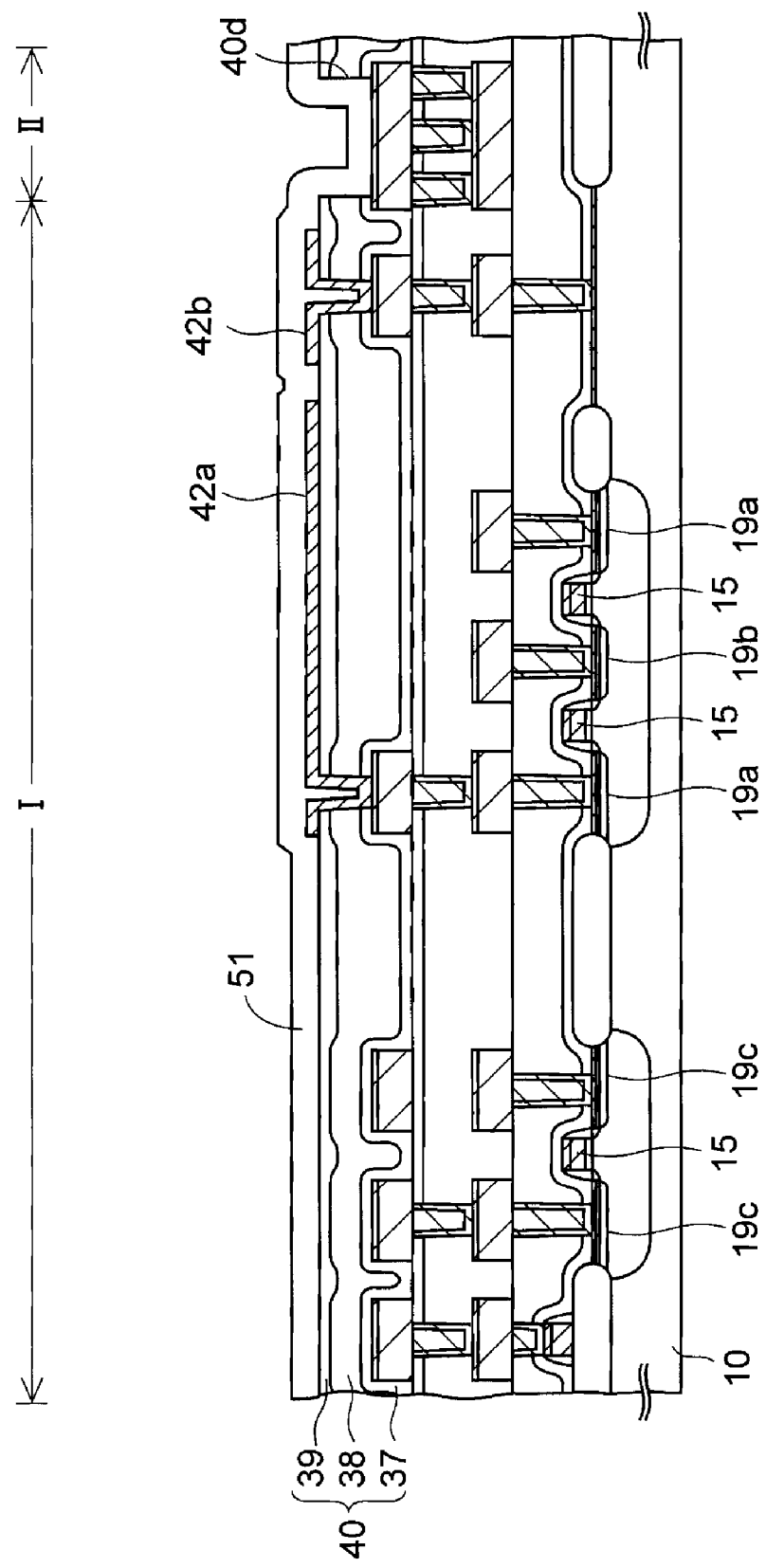

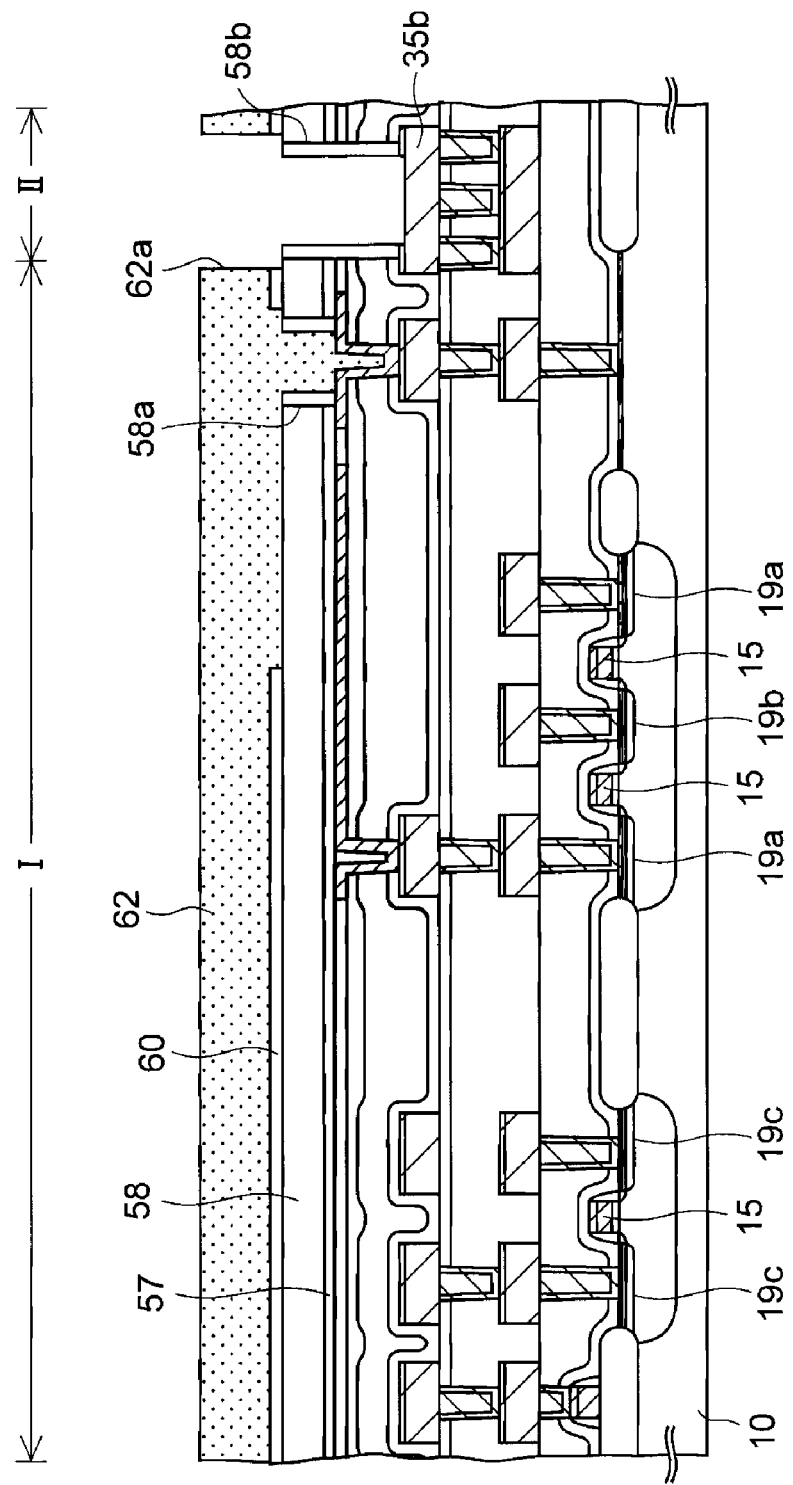

SURFACE PROFILE SENSOR AND METHOD FOR MANUFACTURING THE SAME

CROSS-REFERENCE TO RELATED APPLICATION

This application is a continuation of prior International Patent Application No. PCT/JP2007/057670 filed on Apr. 5, 2007, the entire contents of which are incorporated herein by reference.

FIELD

It is related to a surface profile sensor and a method for manufacturing the same.

BACKGROUND

In recent years, with progress of the information society, biometric technologies for confirming the personal identity based on personal physical characteristics have been put into practical use as security technologies for preventing illegal use of bank cards and electronic money. Among biometric technologies such as those utilizing palmar veins and voiceprints, a fingerprint authentification technology using fingerprints has been considerably studied so far.

For example, in Japanese Laid-open Patent Publication No. 61-221883, a fingerprint is irradiated with light and optically checked by light reflected from the fingerprint.

In Japanese Laid-open Patent Publication No. 05-61965, a pressure difference caused by irregularities of a fingerprint is read by a piezoelectric thin film, whereby checking is performed.

In Japanese Laid-open Patent Publication No. 07-168930, checking is performed based on change in resistance or capacitance of a pressure-sensitive sheet, the change being caused when a skin is contacted with the pressure-sensitive sheet.

However, among these techniques, the technique in Japanese Laid-open Patent Publication No. 61-221883 which uses the optical method has disadvantages that the technique is not suitable for reduction in size, and is not possible to be used for general purpose, thereby being limited in usage. The technique in Japanese Laid-open Patent Publication No. 07-168930 has difficulty in practical use, because of use of the pressure-sensitive sheet that is made of a special material and is unworkable.

As a technique for solving these problems, Japanese Laid-open Patent Publication No. 2003-269907 discloses a capacitance type fingerprint sensor (surface profile sensor) formed on a semiconductor substrate. In the fingerprint sensor, a plurality of detection electrode films formed on the semiconductor substrate in an array face a skin, and each of the detection electrode films and the skin function as electrodes in a capacitor. The distance between the electrodes in the capacitor varies depending on the irregularities on a fingerprint. Accordingly, an image of the fingerprint is obtained by allowing each of the detection electrode films to act as one pixel, and sensing and visualizing the capacitance of each capacitor. Compared to the sensor according to the optical method, the fingerprint sensor according to this method requires no special interface and can be reduced in size.

In addition to those described above, Japanese Patent Translation Publications Nos. 2000-512053, 2002-544380, 2001-506319 and 2003-534223; Japanese Laid-open Patent Publications Nos. 2004-218087, 2004-256837, 2003-58872, 2002-294470, 2002-194123, and 2003-301257; Japanese Patents Nos. 3624843 and 3658342; and U.S. Pat. Nos. 6,261, 693, 5,858,477 and 6143142 also disclose techniques relating to the embodiments.

SUMMARY

According to one aspect discussed herein, a surface profile sensor includes an interlayer insulating film formed above a semiconductor substrate, the interlayer insulating film having a flat upper surface, a detection electrode film formed on the interlayer insulating film, an upper insulating film formed on the detection electrode film and the interlayer insulating film, the upper insulating film having a surface on which a silicon nitride film is exposed, and a protection insulating film formed on the upper insulating film, the protection insulating film made of a tetrahedral amorphous carbon (ta-C) film having a window which is formed above the detection electrode film.

According to another aspect discussed herein, a method for manufacturing the surface profile sensor includes forming an interlayer insulating film above a semiconductor substrate, forming a detection electrode film on the interlayer insulating film, forming an upper insulating film on the detection electrode film and the interlayer insulating film, the upper insulating film having a surface on which a silicon nitride film is exposed; and forming a protection insulating film on the upper insulating film, the protection insulating film formed of a tetrahedral amorphous carbon (ta-C) film having a window which is formed above the detection electrode film.

BRIEF DESCRIPTION OF THE DRAWINGS

FIGS. 5A to 5I are sectional views illustrating a manufacturing process of a surface profile sensor according to the first embodiment;

FIGS. 8A to 8H are sectional views illustrating a manufacturing process of a surface profile sensor according to the second embodiment;

DESCRIPTION OF EMBODIMENTS

A capacitance type surface profile sensor in accordance with embodiments is described below in detail with reference to appended drawings.

First, description is provided of a Course leading to the embodiments.

Figure 1H:
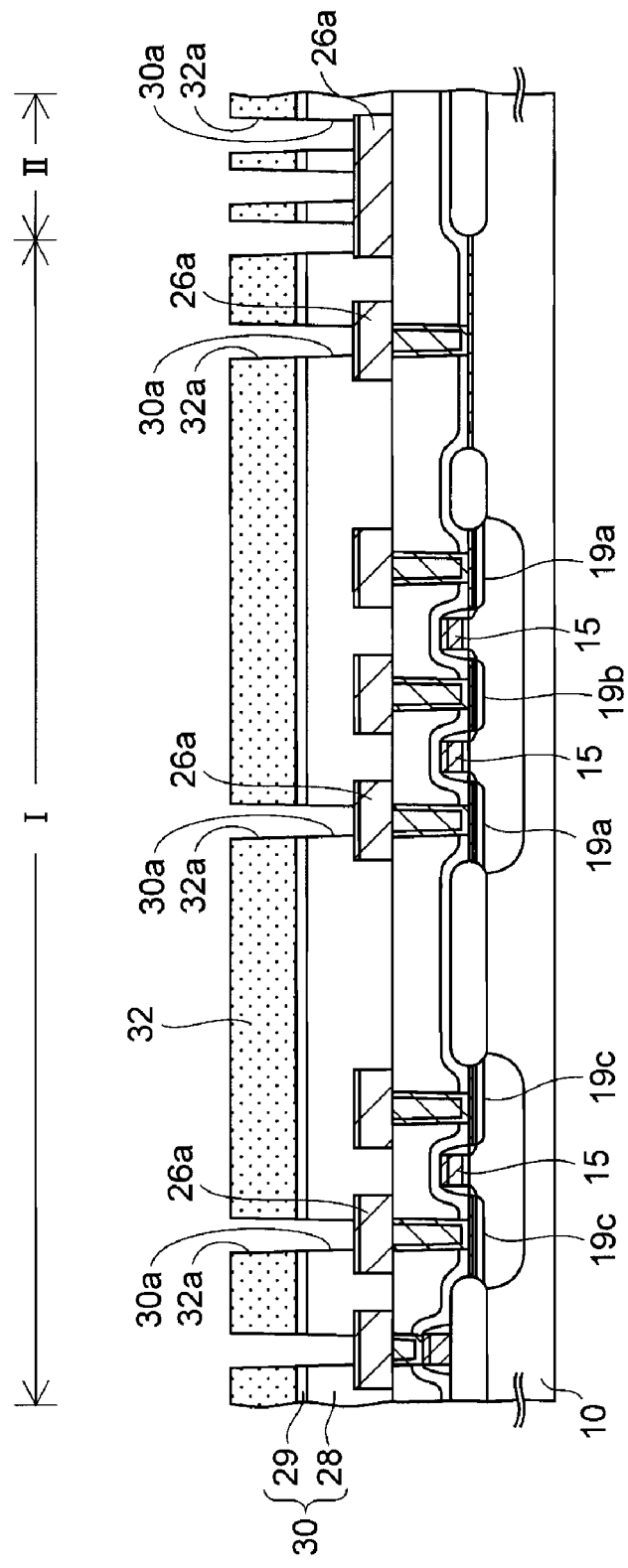
FIGS. 1A to 1X are sectional views illustrating a manufacturing process for a surface profile sensor during a course which leads to the embodiments.
Figure 1I:
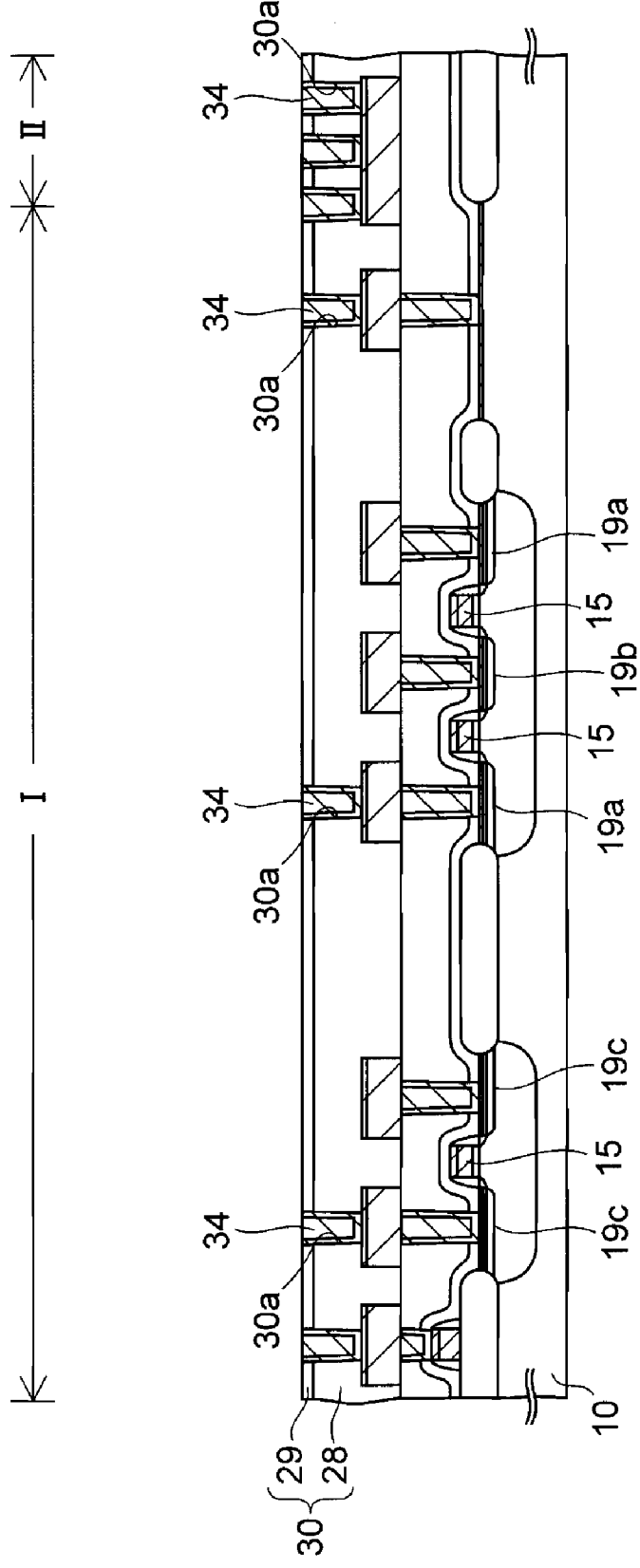
Figure 1J:
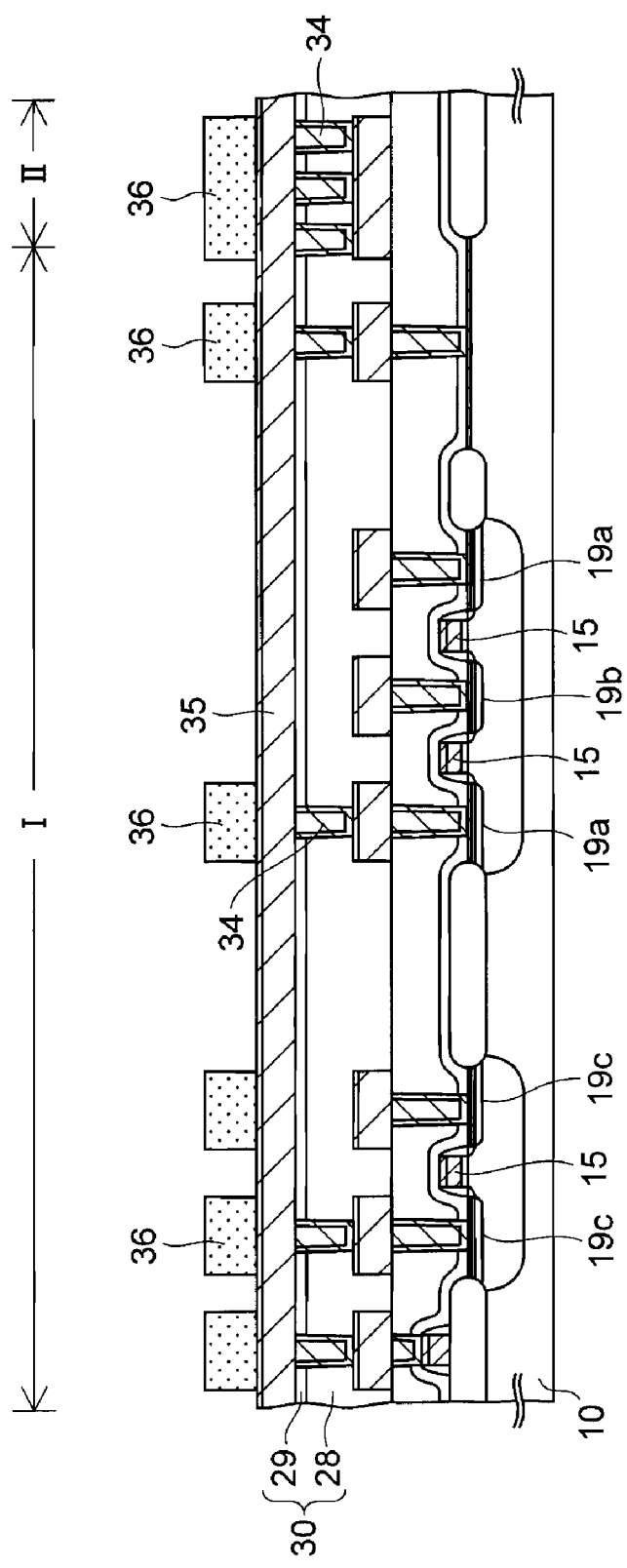
Figure 1K:
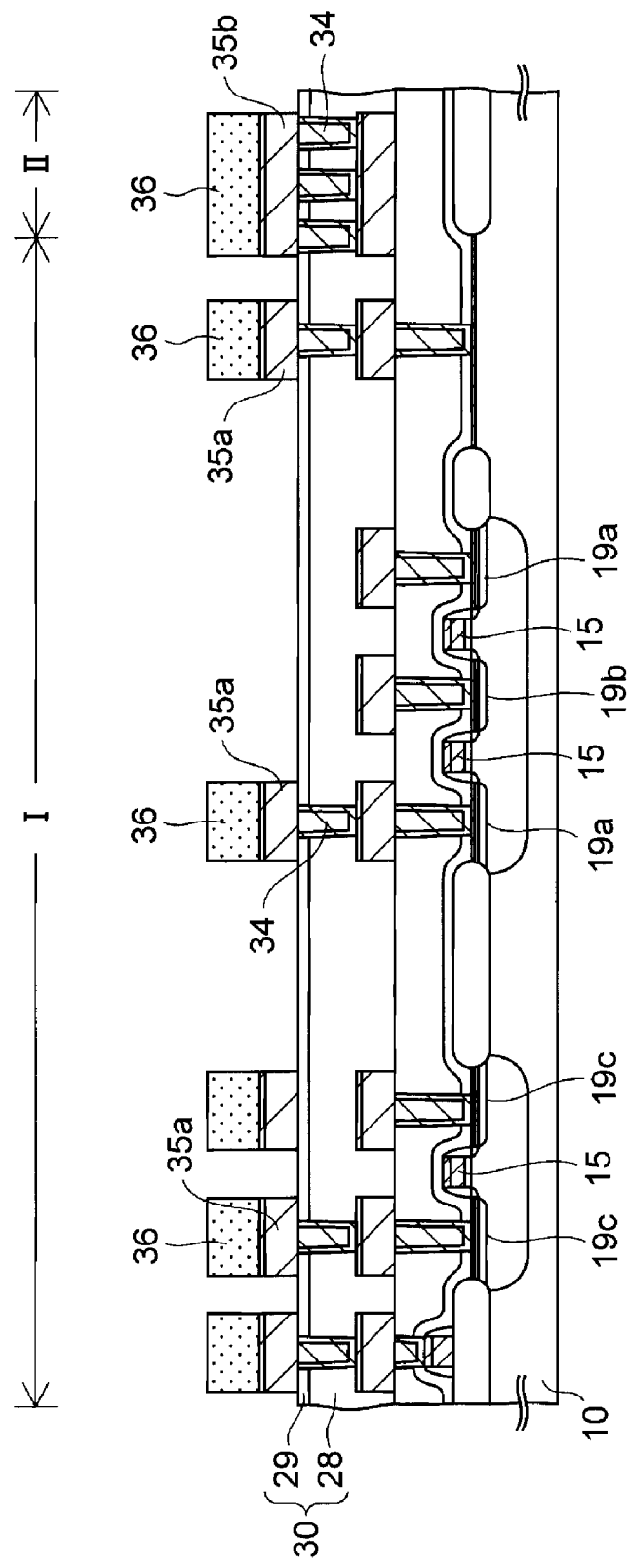
Figure 1L:
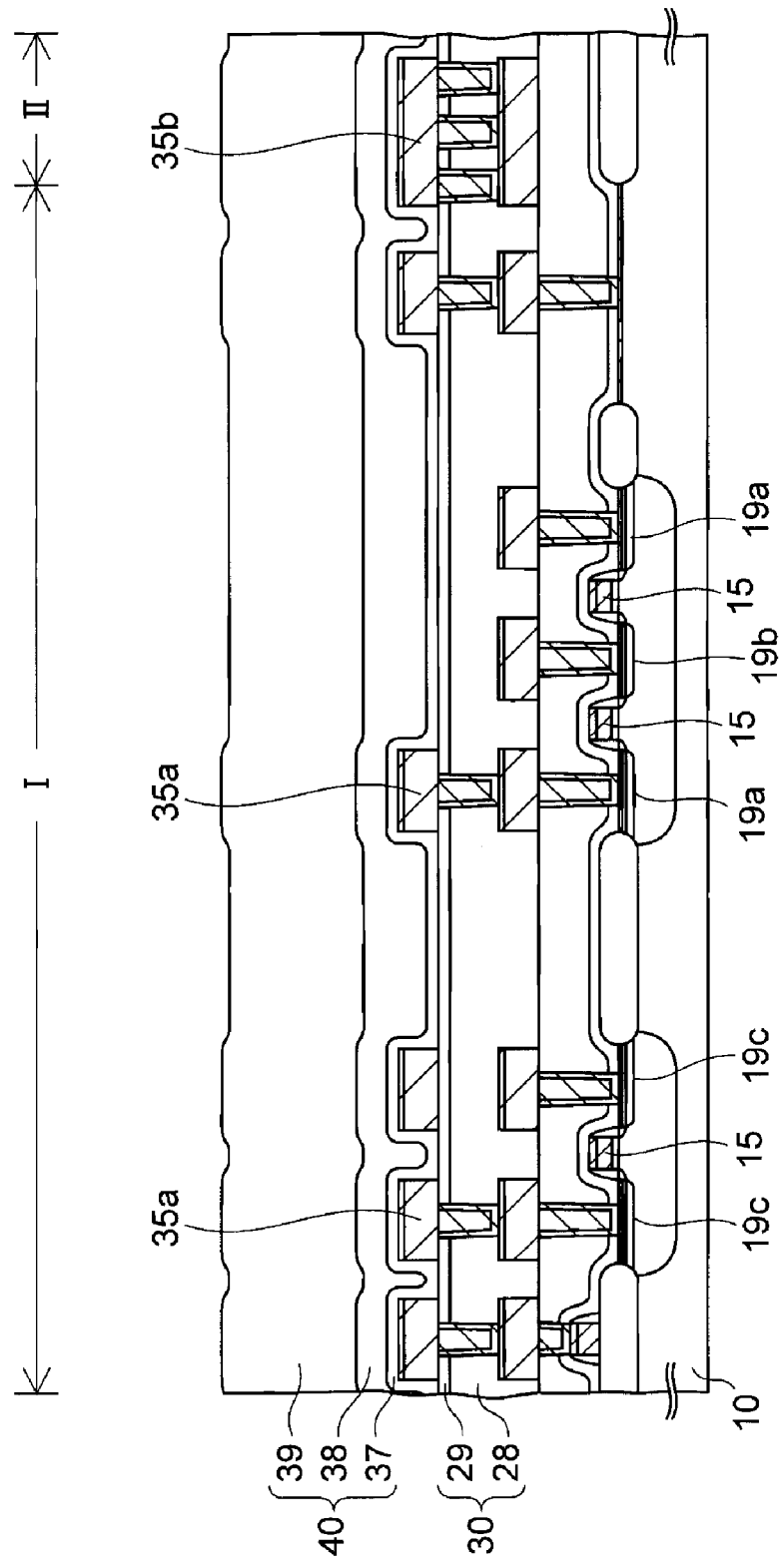
Figure 1M:
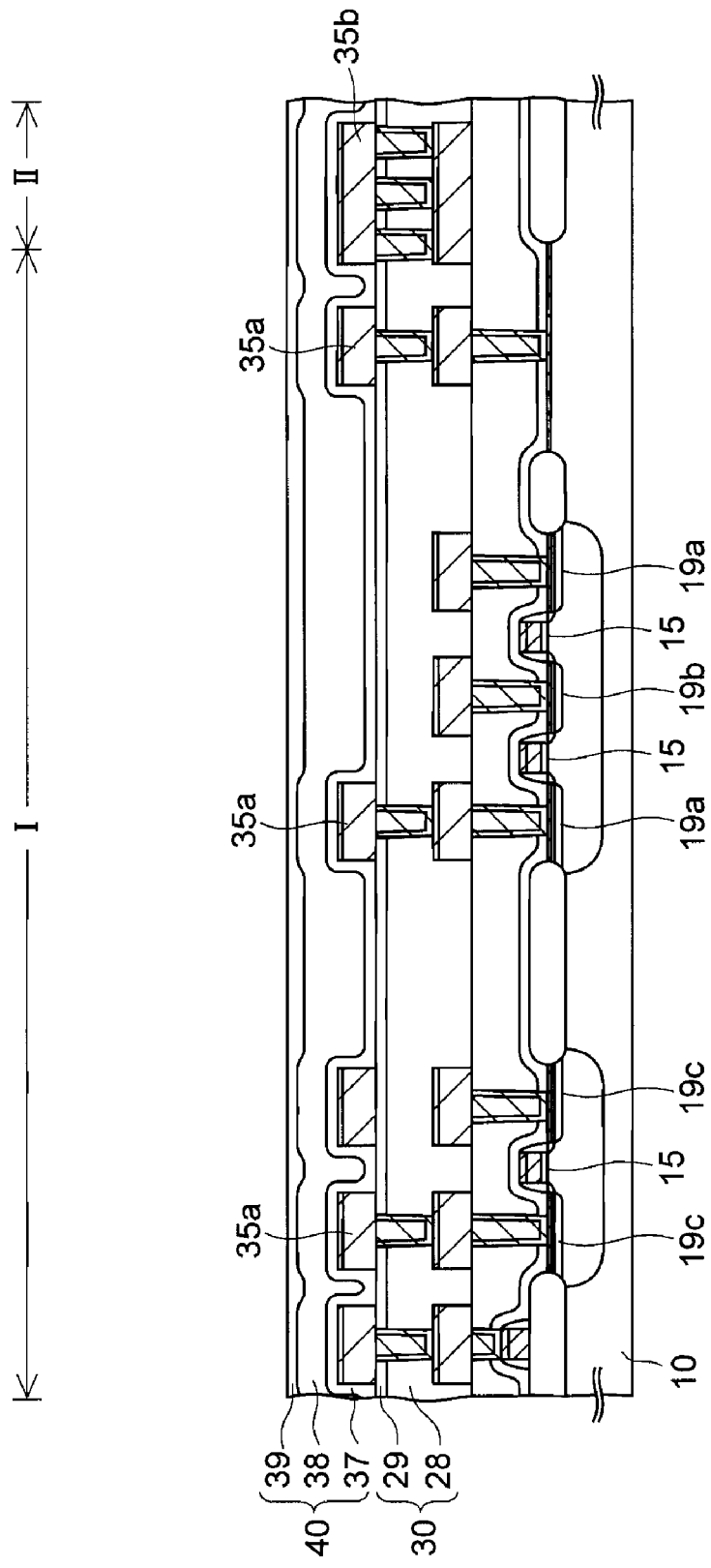
Figure 10:
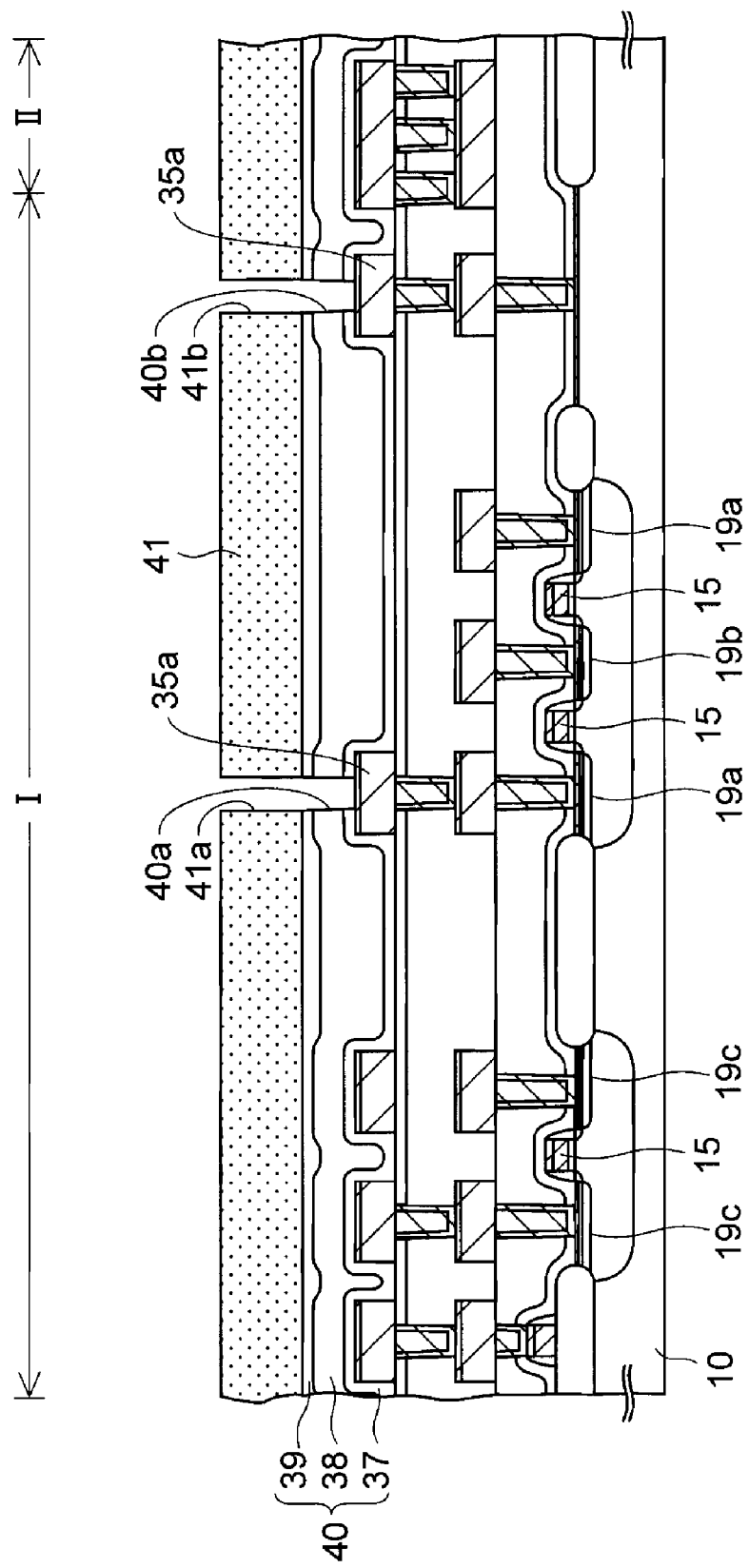
FIGS. 10A to 10H are sectional views illustrating a manufacturing process of a surface profile sensor according to the third embodiment.
Figure 1P:
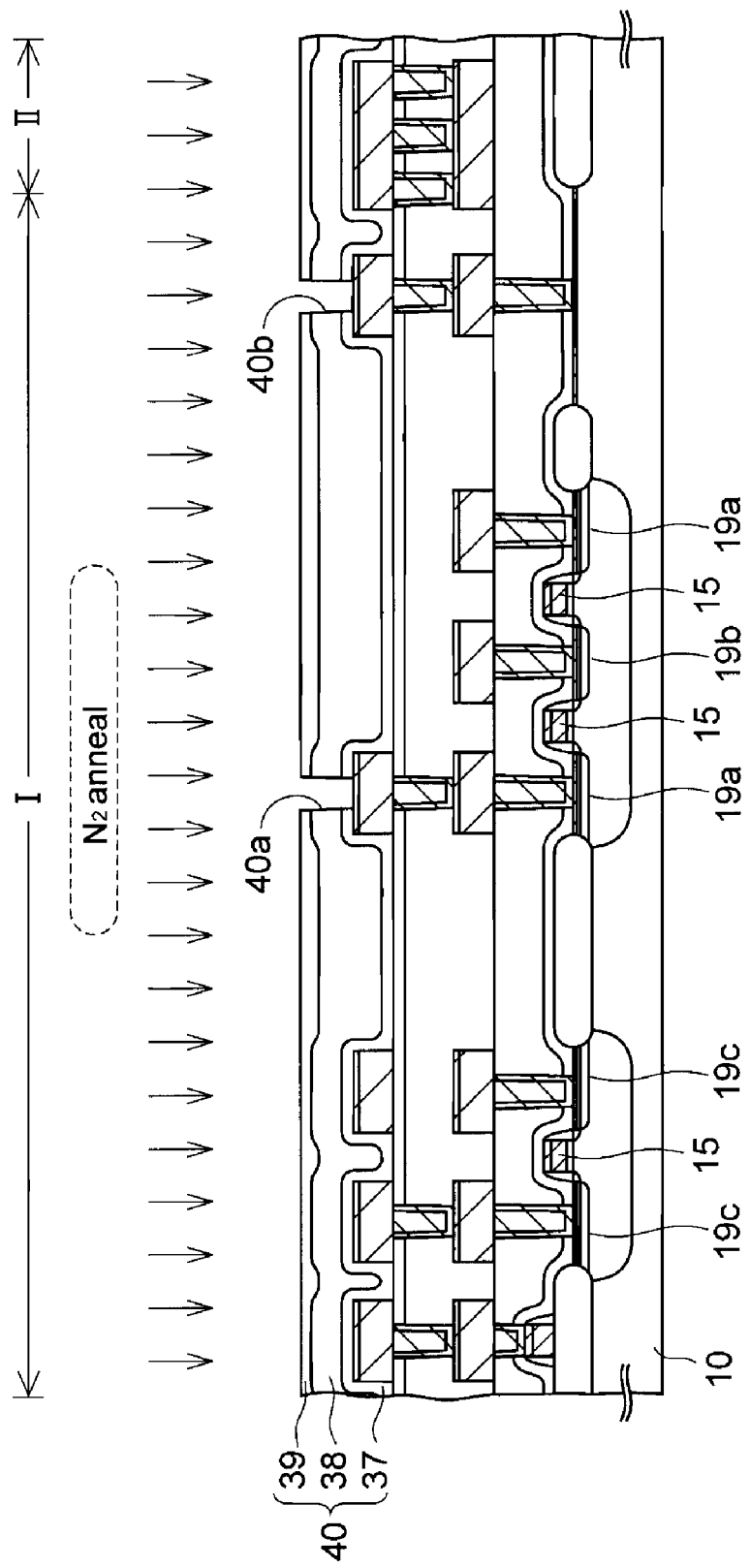
Figure 1Q:
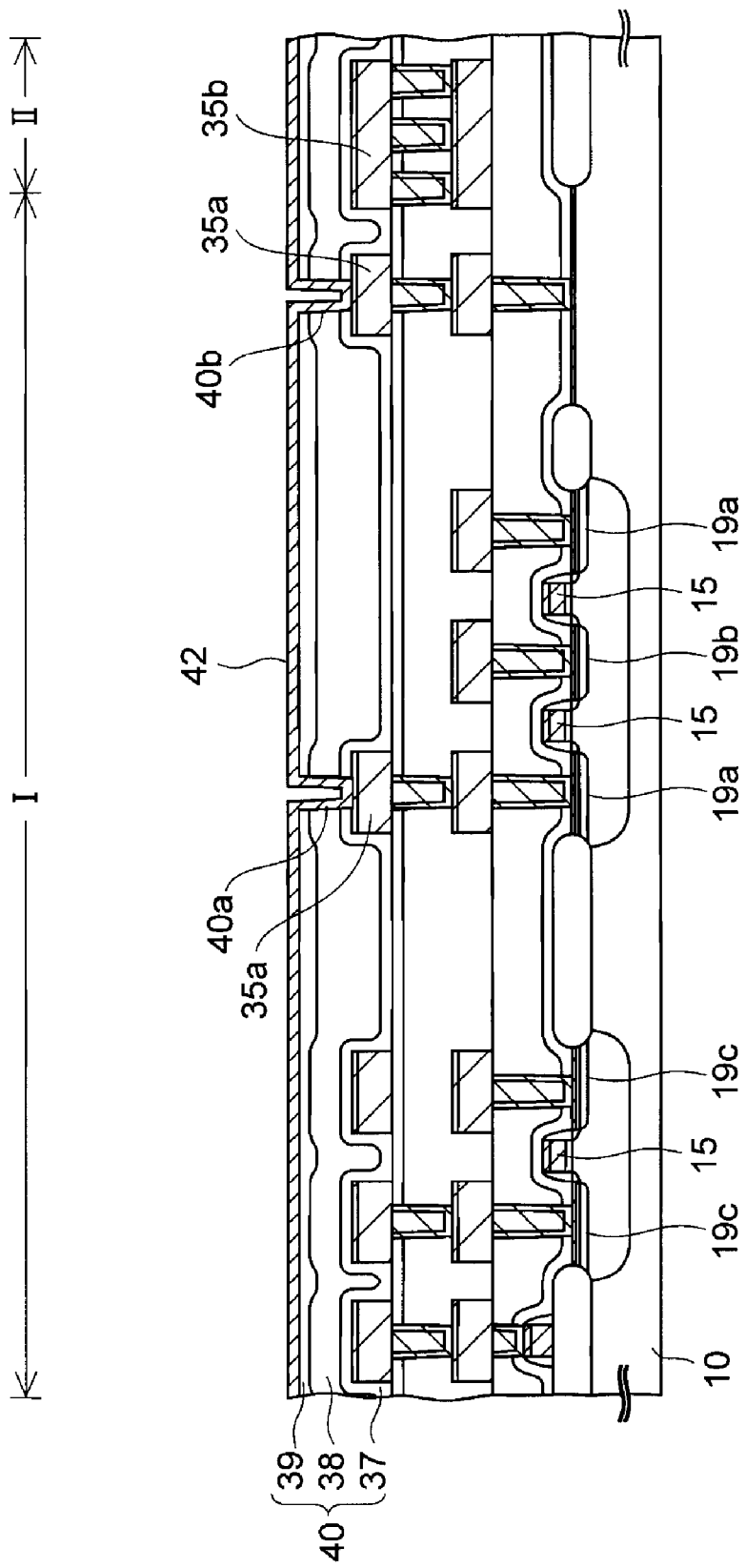
Figure 1R:
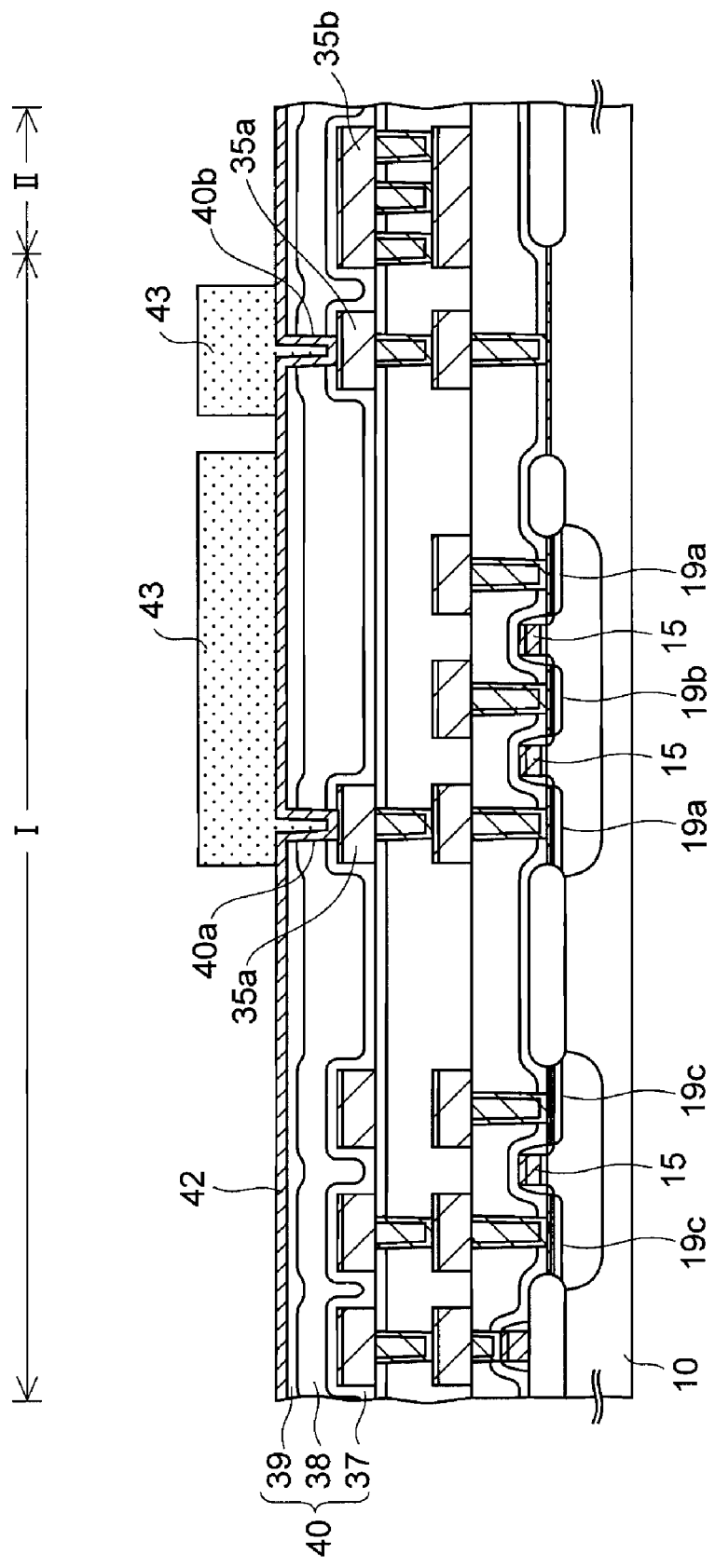
Figure 1S:
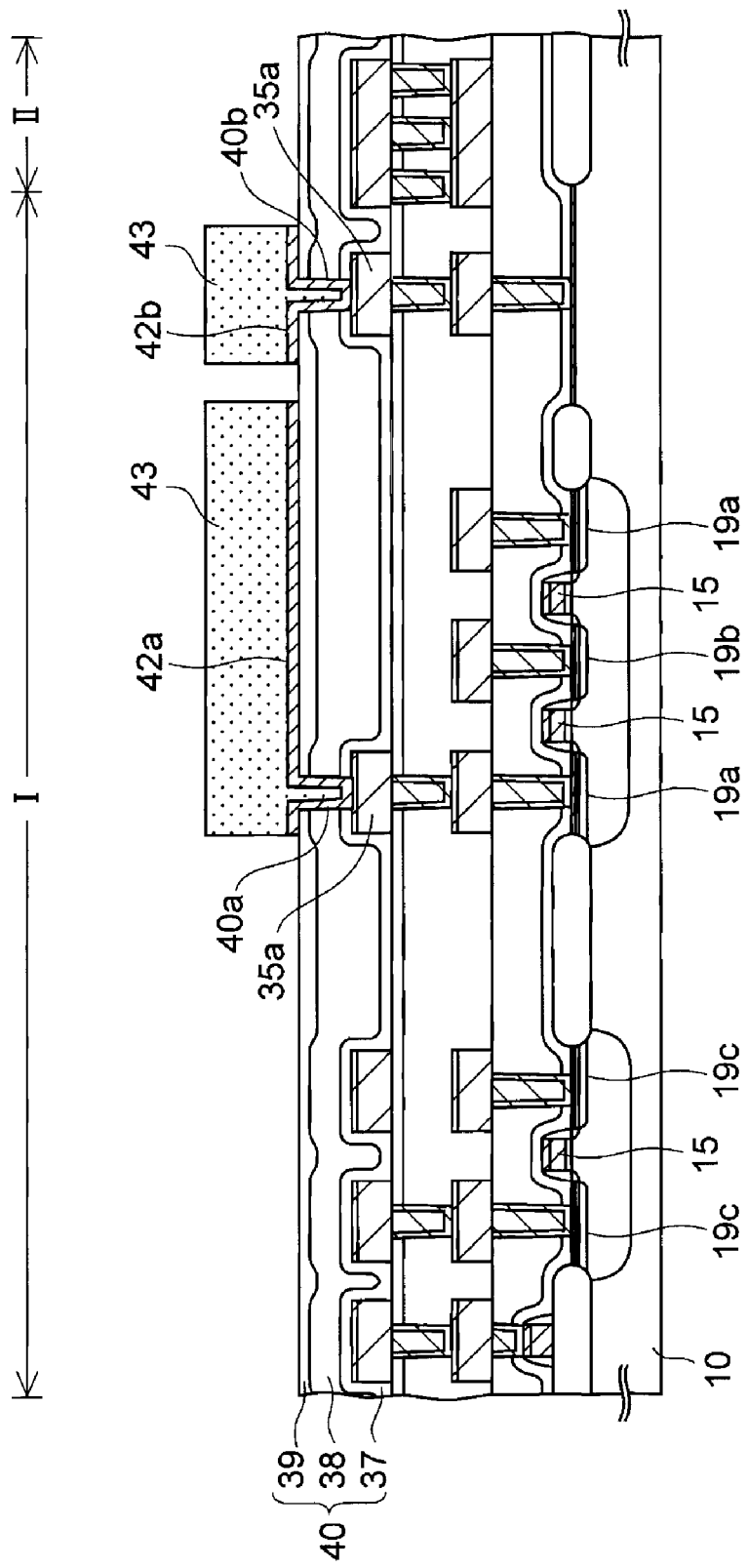
Figure 1V:
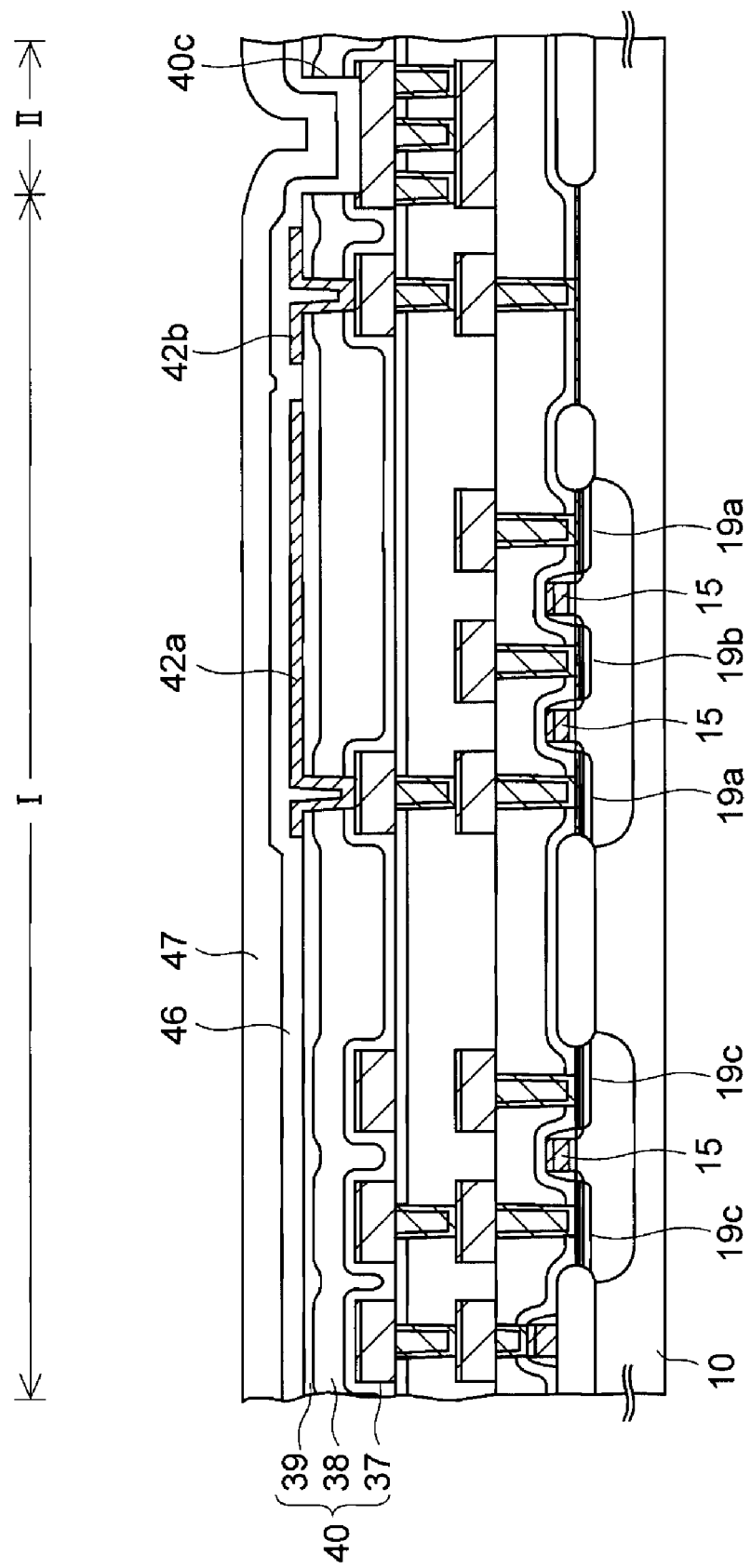
Figure 1W:
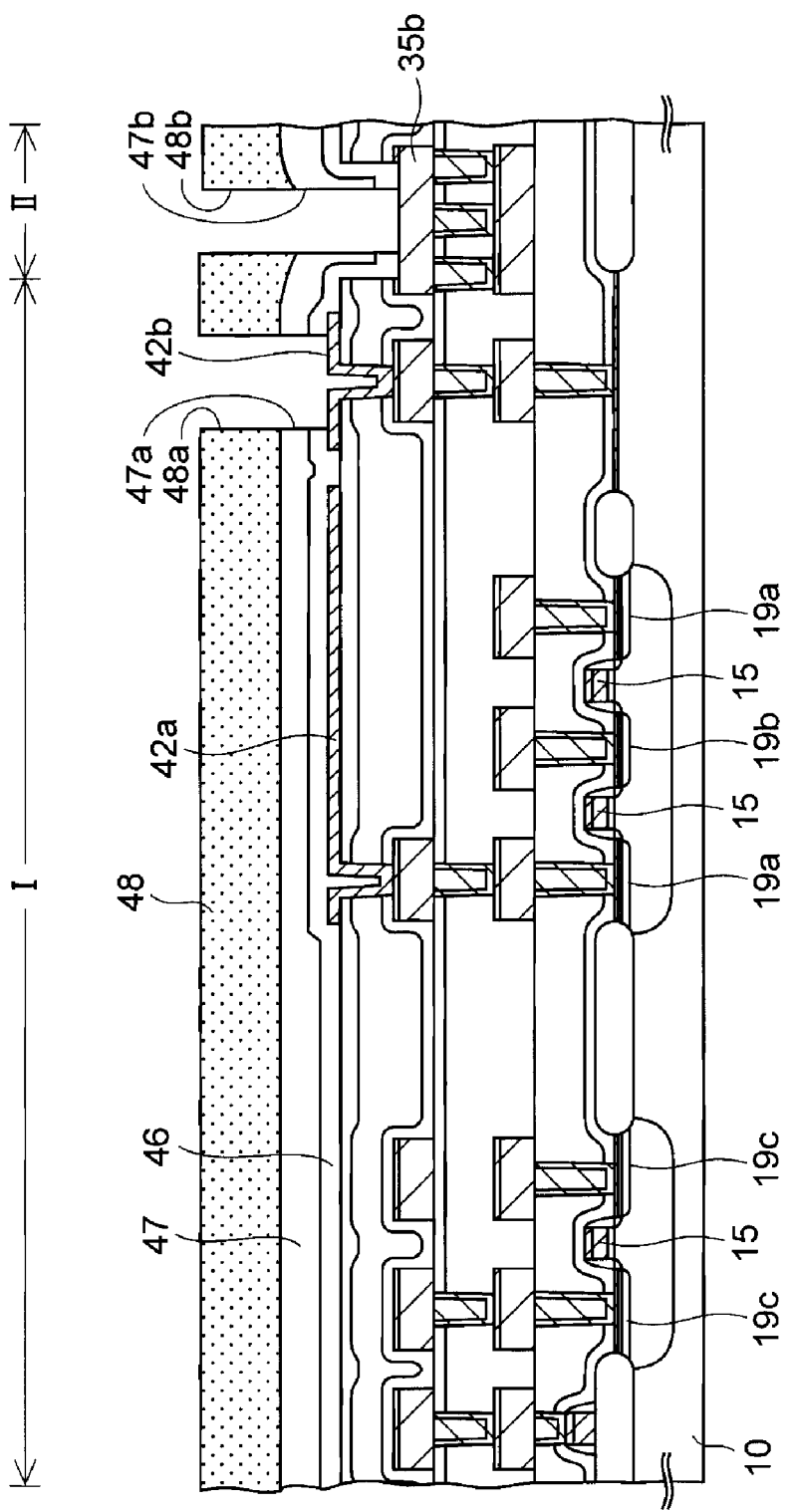
Figure 1X:
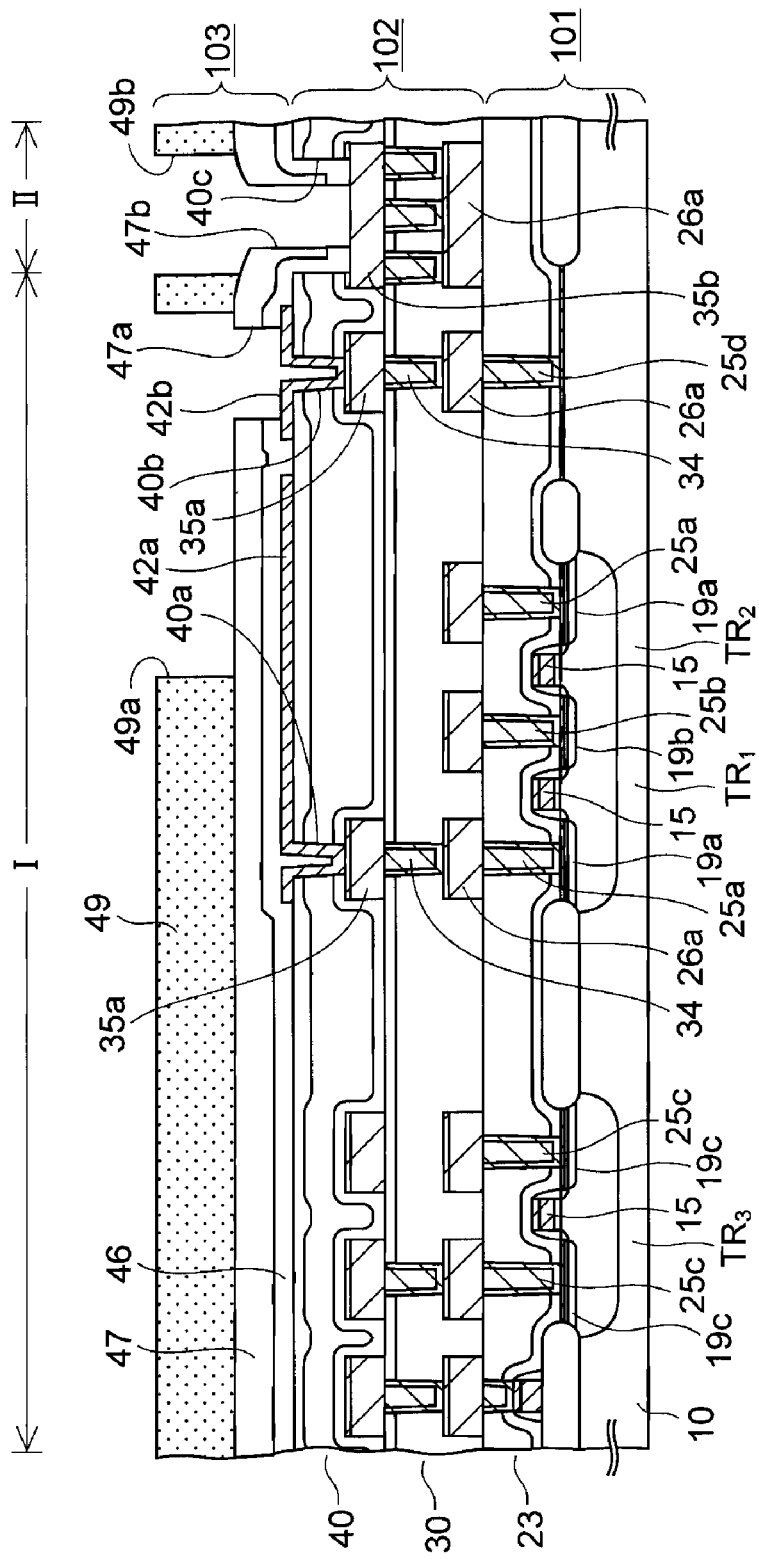

FIG. 1X is a sectional view illustrating one sensor region I and one pad region II of a C-MOS type surface profile sensor on an electrostatic capacitance method prior to the embodiments.

As illustrated in FIG. 1X, the surface profile sensor is formed by laminating a transistor layer portion 101, a wiring layer portion 102 and a fingerprint sensor layer portion 103 in this order from a lower layer to a upper layer.

The transistor layer portion 101 includes MOS transistors $TR_1$ to $TR_3$ forming an SRAM and the like formed on the semiconductor substrate 1, a first interlayer insulating film 23 covering the transistors and including a planarized (flat) surface, and plugs 25a to 25c connecting source/drain regions 19a to 19c of the MOS transistor $TR_1$ to $TR_3$ to first layer wirings 26a in an upper layer and a plug 25d connecting the semiconductor substrate 10 to the first layer wiring 26a in the upper layer, the plugs 25a to 25d being embedded in the first interlayer insulating film 23.

The wiring layer portion 102 includes the plurality of first layer wirings 26a on the first interlayer insulating film 23, a second interlayer insulating film 30 which covers the first layer wirings 26a and includes a planarized surface, plugs 34 which are embedded in the second interlayer insulating film 30 and connect the first layer wirings 26a to second layer wirings 35a in an upper layer, the plurality of second layer wirings 35a and a bonding pad 35b on the second interlayer insulating film 30 and a third interlayer insulating film 40 which covers the second layer wirings 35a and the bonding pad 35b and has a flat surface.

The fingerprint sensor layer portion 103 includes a detection electrode film 42a and a ground electrode film (electrostatic discharge electrode) 42b on the third interlayer insulating film 40, a cover insulating film 46 and a moisture barrier insulating film 47 which cover the detection electrode film 42a and the ground electrode film 42b, and a protection insulating film 49 which is formed on the moisture barrier insulating film 47 and covers a protection portion except for a sensor portion, an electrostatic discharge (ESD) portion and a pad portion. A polyimide film is used as the protection insulating film 49.

One sensor region I includes the sensor portion, the ESD (Electro Static Discharge) portion and the protection portion, and recognize a fingerprint of a finger contacted therewith. The sensor portion is formed by covering the detection electrode film 42a with the cover insulating film 46 and the moisture barrier insulating film 47 in a region within a first window (sensor window) 49a formed in the protection insulating film 49. The ESD portion is adjacent to the sensor portion in the first window 49a and is formed by exposing the ground electrode film 42b in an ESD hole (first hole) 47a which is formed on the cover insulating film 46 and the moisture barrier insulating film 47. To prevent electrostatic breakdown of the sensor, electric charges stored in a human body are escaped to the semiconductor substrate 10 through the ground electrode film 42b. The protection portion is formed by providing the protection insulating film 49 on the cover insulating film 46 and the moisture barrier insulating film 47 which are adjacent to the sensor portion, and protects the inside of the sensor against mechanical shock due to contact with a finger and the like by the protection insulating film 49.

One pad region II is formed by exposing the bonding pad 35b in an electrode drawing window (second hole) 47b which is formed in the third interlayer insulating film 40, the cover insulating film 46 and the moisture barrier insulating film 47. When mounting a sensor chip to a package, a bonding wire is bonded to the bonding pad 35b.

Next, a method for manufacturing the C-MOS type surface profile sensor on the electrostatic capacitance method is described.

FIGS. 1A to 1X are sectional views of the above-mentioned surface profile sensor during manufacturing. Both the sensor region I and the pad region II are illustrated in these drawings.

First, a process until a cross-sectional structure illustrated in FIG. 1A is obtained is described.

First, element isolation insulating film 11 is formed by thermally oxidizing a surface of an n-type or p-type silicon (semiconductor) substrate 10 and the element isolation insulating film 11 defines active regions of the transistors. A height from the surface of the silicon substrate 10 to the upper surfaces of the element isolation insulating film 11 is about 100 nm. Such element isolation structure is called Local Oxidation of Silicon (LOCOS), but instead, Shallow Trench Isolation (STI) may be adopted.

Subsequently, by introducing a p-type impurity such as boron into the active regions of the silicon substrate 10, first and second p wells 12, 13 are formed. Thereafter, the surface of the active regions are thermally oxidized, and thermal oxidation films to be gate insulating films 14 are formed to have a thickness of about 6 to 7 nm.

Subsequently, an amorphous silicon film having a thickness of 50 nm and a tungsten silicide film having a thickness of 150 nm are formed on the whole of the upper surface of the silicon substrate 10 in this order. A polycrystalline silicon film may be used in place of the amorphous silicon film. Afterward, by patterning these films by photolithography, gate electrodes 15 are formed on the silicon substrate 10 and a wiring 16 is formed on the element isolation insulating film 11.

Furthermore, phosphorus as an n-type impurity is introduced into the silicon substrate 10 in lateral regions next to the gate electrodes 15 by ion implantation of using the gate electrodes 15 as masks to form first to third source/drain extensions 17a to 17c.

Afterward, an insulating film is formed on the whole of the upper surface of the silicon substrate 10 and the insulating film is etched back so as to leave it as insulating spacers 18 on side surfaces of the gate electrodes 15 and the wiring 16. A silicon oxide film is formed as the insulating film according to, for example, the Chemical Vapor Deposition (CVD) method.

Subsequently, an n-type impurity such as arsenic is ion-implanted into the silicon substrate 10 again by using the insulating spacers 18 and the gate electrodes 15 as masks. Thereby, first to third source/drain regions 19a to 19c are formed on the silicon substrate 10 next to the gate electrodes 15.

Furthermore, a refractory metal film such as a cobalt film is formed on the whole upper surface of the silicon substrate 10 according to the sputtering method. Then, by heating the refractory metal film and allowing the film to react with silicon, refractory silicide layers 20 such as cobalt silicide layers are formed on the first to third source/drain regions 19a to 19c of the silicon substrate 10 to reduce resistance of each source/drain regions 19a to 19c.

Such refractory metal silicide layers are formed on the surface of the silicon substrate 10 in regions where the element isolation insulating film 11 is not formed.

Afterward, the refractory metal layers which are unreacted on the surface of the element isolation insulating film 11 and the like are removed by wet-etching.

By the process so far, the first to third MOS transistors $TR_1$ to $TR_3$ including the gate insulating films 14, the gate electrodes 15, the first to third source/drain regions 19a to 19c and the like are formed in the active regions of the silicon substrate 10.

Next, as illustrated in FIG. 1B, a silicon oxy-nitride (SiON) film is formed on the whole upper surface of the silicon substrate 10 so as to have a thickness of about 200 nm according to the plasma-enhanced CVD method. The silicon oxy-nitride film serves as a cover insulating film 21.

Subsequently, a silicon oxide film as a first insulating film 22 is formed at a thickness of about 1000 nm on the cover insulating film 21 according to the plasma-enhanced CVD method using Tetra Ethoxy Silane (TEOS) gas. Afterward, the upper surface of the first insulating film 22 is made flat by polishing the first insulating film 22 by about 200 nm according to the Chemical Mechanical Polishing (CMP) method.

According to this manufacturing method, the cover insulating film 21 and the first insulating film 22 thus formed serve as the first interlayer insulating film 23.

Subsequently, as illustrated in FIG. 1C, by applying a photoresist on the first interlayer insulating film 23 and exposing and developing the photoresist, a first resist pattern 24 having windows 24a to 24e is formed.

Then, the first interlayer insulating film 23 is dry-etched using the first resist pattern 24 as a mask to form first to fifth contact holes 23a to 23e as illustrated in FIG. 1C. Thereafter, the first resist pattern 24 is removed.

Next, a process until a cross-sectional structure illustrated in FIG. 1D is obtained is described.

First, a titanium (Ti) film having a thickness of about 20 nm and a titanium nitride (TiN) film having a thickness of about 50 nm are formed as a glue film in this order on inner surfaces of the first to fifth contact holes 23a to 23e and the upper surface of the first interlayer insulating film 23 according to the sputtering method.

Subsequently, a tungsten (W) film is formed on the glue film according to the CVD method and the first to fifth contact holes 23a to 23e are completely embedded with the tungsten film.

Then, excessive glue film and tungsten film on the first interlayer insulating film 23 are polished according to the CMP method and these films are left in the first to fifth contact holes 23a to 23e as first to fifth conductive plugs 25a to 25e.

Subsequently, as illustrated in FIG. 1E, a first metal laminated film 26 is formed on upper surfaces of the first to fifth conductive plugs 25a to 25e and the first interlayer insulating film 23. The metal laminated film 26 is formed by laminating a copper-containing aluminum film having a thickness of about 500 nm, a titanium film having a thickness of about 5 nm and a titanium nitride film having a thickness of about 150 nm in this order from the bottom according to the sputtering method.

Afterward, a photoresist is coated on the first metal laminated film 26 and then is exposed and developed to form a second resist pattern 27.

Subsequently, as illustrated in FIG. 1F, the first metal laminated film 26 is dry-etched using the second resist pattern 27 as a mask to form the first layer wirings 26a. After completion of the etching, the second resist pattern 27 is removed.

Next, a process until a cross-sectional structure illustrated in FIG. 1G is obtained is described.

First, a silicon oxide film is formed at a thickness of about 2200 nm on the whole of the upper surface of the silicon substrate 10 according to the plasma-enhanced CVD method using TEOS gas. The silicon oxide film serves as a second insulating film 28.

Although not illustrated, the second insulating film 28 formed using the TEOS gas is inclined to generate a "void" at a boundary adjacent to first layer wirings 26a. When the "void" still exists, moisture and impurities remain in the "void" and stress migration tends to occur at the first layer wirings 26a.

Thus, after the second insulating film 28 is formed, the upper surface of the second insulating film 28 is polished according to the CMP method, thereby allowing the "void" to appear on the surface of the second insulating film 28. The amount of polishing by the CMP method is typically about 1000 nm.

Afterward, a silicon oxide film as a first cap insulating film 29 is formed on the upper surface of the second insulating film 28 according to the plasma-enhanced CVD method using the TEOS gas again to completely fill the "void" with the cap insulting film 29.

The first cap insulating film 29 along with the underlying second insulating film 28 serves as the second interlayer insulating film (base insulating film) 30.

Subsequently, as illustrated in FIG. 1H, a third resist pattern 32 is formed on the second interlayer insulating film 30. Then, the second interlayer insulating film 30 is dry-etched through windows 32a of the third resist pattern 32 to form first holes 30a reaching the first layer wirings 26a.

Thereafter, the third resist pattern 32 is removed.

Next, a process until a cross-sectional structure illustrated in FIG. 1I is obtained is described.

First, a titanium nitride film as a glue film is formed at a thickness of about 50 nm on the inner surfaces of the first holes 30a and the upper surface of the second interlayer insulating film 30 according to the sputtering method.

Subsequently, a tungsten film is formed at a thickness of about 700 nm on the glue film according to the CVD method to completely embed the first holes 30a with the tungsten film.

Then, excessive glue film and tungsten film on the second interlayer insulating film 30 is polished according to the CMP method to leave these films as sixth conductive plugs 34 in the first holes 30a.

Subsequently, as illustrated in FIG. 1J, a copper-containing aluminum film and a titanium nitride film are formed in this order on the second interlayer insulating film 30 and the sixth conductive plugs 34 according to the sputtering method. These films serve as a second metal laminated film 35. Although the thickness of the second metal laminated film 35 is not limited, the thickness of the copper-containing aluminum film is about 500 nm and the thickness of the titanium nitride film is about 120 nm.

Afterward, a fourth resist pattern 36 is formed on the second metal laminated film 35.

Subsequently, as illustrated in FIG. 1K, the second metal laminated film 35 is dry-etched using the fourth resist pattern 36 as a mask. The unetched and remaining second metal laminated film 35 are used as the second layer wirings 35a and the bonding pad 35b.

Thereafter, the fourth resist pattern 36 is removed.

Next, a process until a cross-sectional structure illustrated in FIG. 1L is obtained is described.

First, a silicon oxide film is formed at a thickness of about 400 nm on the second layer wirings 35a, the bonding pad 35b and the second interlayer insulating film 30 according to the plasma-enhanced CVD method using the TEOS gas. The silicon oxide film serves as a cover insulating film 37.

Irregularities reflecting the second layer wirings 35a are formed on the surface of the cover insulating film 37. Thus, at the following process, to embed the irregularities, a silicon oxide film as a third insulating film 38 is formed on the cover insulating film 37.

In this embodiment, Spin On Glass (SOG) with a good embedding property is adopted as a method of forming the third insulating film 38. The thickness of the third insulating film 38 on the flat surface of the cover insulating film 37 is set to about 500 nm.

Afterward, a silicon oxide film as a sacrificial insulating film 39 is formed at a thickness of about 2000 nm on the third insulating film 38 according to the plasma-enhanced CVD method using the TEOS gas.

The insulating films 37 to 39 thus formed serve as the third interlayer insulating film 40.

Even when the third insulating film 38 is formed according to SOG with a good embedding property, small irregularities reflecting the second layer wirings 35a still remains on the third interlayer insulating film 40.

Thus, next, as illustrated in FIG. 1M, the upper surface of the sacrificial insulating film 39 is polished and made flat according to the CMP method. The amount of polishing by the CMP method is typically about 1000 nm.

Subsequently, as illustrated in FIG. 1N, in order to remove moisture taken into the third interlayer insulating film 40 at formation of each of the insulating films 37 to 39 and at CMP illustrated in FIG. 1M, the third interlayer insulating film 40 is annealed in an nitrogen-containing atmosphere such as $N_2O$ plasma atmosphere. Thus, the third interlayer insulating film 40 is dehydrated, and the surface thereof is nitrided to prevent readsorption of moisture.

Although conditions for the $N_2O$ plasma annealing are not specifically limited, in this embodiment, a CVD apparatus is used for an annealing apparatus, and $N_2O$ plasma annealing is performed under the following conditions: a substrate temperature of 350° C.; processing time of 2 to 4 minutes. A high-frequency electric power of 500 W with a frequency of 13.56 MHz as a power for generating plasma is applied to the CVD apparatus.

The $N_2O$ plasma annealing is especially effective in the case where the third insulating film 38 is formed according to the SOG in the film of which much moisture can be contained.

Next, a process until a cross-sectional structure illustrated in FIG. 1O is obtained is described.

First, a fifth resist pattern 41 is formed on the third interlayer insulating film 40.

Subsequently, by dry-etching the third interlayer insulating film 40 through the windows 41a, 41b of the fifth resist pattern 41, second and third holes 40a, 40b are formed in the insulating films on the second layer wirings 35a.

Then, the fifth resist pattern 41 is removed.

Subsequently, as illustrated in FIG. 1P, the third interlayer insulating film 40 is annealed in an $N_2$ atmosphere to discharge moisture still contained in the third interlayer insulating film 40 to the outside through the holes 40a, 40b.

The $N_2$ annealing is performed under the following conditions: a substrate temperature of 350° C.; $N_2$ flow rate of 20 l/minute; and processing time of 30 minutes.

Next, as illustrated in FIG. 1Q, a titanium nitride film as a conductive film 42 are formed at a thickness of about 200 nm on the upper surface of the third interlayer insulating film 40 and the inner surfaces of the second and third holes 40a, 40b according to the sputtering method.

The conductive film 42 is not limited to the titanium nitride film and may be a titanium film or a titanium nitride aluminum film. As described later, the conductive film 42 is to serve as a detection electrode film to which a finger comes close. Corrosion resistance of the detection electrode film is improved by the conductive film 42 of the material containing titanium as described above.

Also, if the conductive film 42 is made of a noble metal such as Au, Ag, Pt, Pd, Rh, Ir, Ru or Os, the detection electrode film having high corrosion resistance can be obtained.

Here, since moisture in the third interlayer insulating film 40 are sufficiently discharged through the holes 40a, 40b at the process illustrated in FIG. 1P before formation of the conductive film 42, degassing from the holes 40a, 40b at formation of the conductive film 42 is reduced. Accordingly, the conductive film 42 is prevented from not being formed in the holes 40a, 40b.

If the conductive film 42 is formed after a lapse of long time from the annealing process illustrated in FIG. 1P, moisture is absorbed in the holes 40a, 40b, so that the conductive film 42 may not be formed in the holes 40a, 40b. Thus, it is preferred that the conductive film 42 is formed within one hour after the above-mentioned annealing process.

Furthermore, the third interlayer insulating film 40 is dehydrated also at the process illustrated in FIG. 1N. Thus, even when the third interlayer insulating film 40 is heated at formation of the conductive film 42, the second layer wirings 35a in the third interlayer insulating film 40 can be prevented from being steamed and baked.

Next, as illustrated in FIG. 1R, the photoresist is coated on the conductive film 42, and then is exposed and developed to form a sixth resist pattern 43.

Subsequently, as illustrated in FIG. 1S, the conductive film 42 is dry-etched using the sixth resist pattern 43 as a mask. The conductive film 42 is left as the detection electrode film 42a and the ground electrode film 42b only in the second and third holes 40a, 40b and their vicinities.

The electrode films 42a, 42b are separated from each other and electrically connected to the second layer wirings 35a through the second and third holes 40a, 40b, respectively. The ground electrode film 42b is electrically connected to the silicon substrate 10 maintained at the ground potential through the plugs 34, 25d and the first layer wirings 26a in the lower layers.

Thereafter, the sixth resist pattern 43 is removed. FIG. 1T shows the state after the sixth resist pattern 43 is removed.

Subsequently, as illustrated in FIG. 1U, a seventh resist pattern 45 having a window 45a in the pad region II is formed on the whole of the upper surface of the silicon substrate 10.

Then, the third interlayer insulating film 40 is etched through the window 45a of the seventh resist pattern 45 to form a hole 40c on the bonding pad 35b.

Subsequently, the titanium nitride film on the surface of the bonding pad 35b is removed by etching. Thereby, the copper-containing aluminum film of the bonding pad 35b appears in the hole 40c.

After the etching, the seventh resist pattern 45 is removed.

Subsequently, as illustrated in FIG. 1V, a silicon oxide film is formed at a thickness of about 100 nm on the third interlayer insulating film 40 and the electrode films 42a, 42b. The silicon oxide film serve as a cover insulating film 46. The cover insulating film 46 is formed according to, for example, the plasma-enhanced CVD method using the TEOS gas.

Next, a silicon nitride film as a moisture barrier insulating film 47 is formed at a thickness of about 700 nm on the cover insulating film 46 according to the plasma-enhanced CVD method. The moisture barrier insulating film 47 is formed according to, for example, the plasma-enhanced CVD method using the TEOS gas. The cover insulating film 46 and the moisture barrier insulating film 47 serve as an upper insulating film.

In this case, even when a silicon nitride film having relatively large stress is formed as the moisture barrier insulating film 47, since the cover insulating film 46 formed of the silicon oxide film acts to reduce the stress, film peeling caused by the moisture barrier insulating film 47 is prevented.

Next, as illustrated in FIG. 1W, a photoresist is coated on the moisture barrier insulating film 47, and then is exposed and developed to form an eighth resist pattern 48.

Then, the moisture barrier insulating film 47 and the cover insulating film 46 are dry-etched through windows 48a, 48b of the eighth resist pattern 48.

Thereby, an ESD hole (first hole) 47a is formed in the cover insulating film 46 and the moisture barrier insulating film 47 on the ground electrode film 42b, and the ground electrode film 42b is exposed through the ESD hole 47a.

In the pad region II, an electrode drawing window (second hole) 47b through which the bonding pad 35b is exposed is formed in the hole 40c.

Then, after the eighth resist pattern 48 is removed, dehydration treatment is performed in an $N_2$ atmosphere at a substrate temperature of 430° C. for 30 minutes.

Next, a process is described until a cross-sectional structure illustrated in FIG. 1X is obtained.

First, an coating film made of non-photosensitive polyimide is applied at a thickness of about 1200 nm on the moisture barrier insulating film 47, and then, the coating film is baked.

Subsequently, a resist pattern (not shown) is formed on the coating film and the coating film is etched with an etching liquid for polyimide by using the resist pattern as a mask. As a result, an uppermost protection insulating film 49 having a first window (sensor window) 49a and a second window 49b is formed. The protection insulating film 49 functions as a cushioning material for protecting circuits in the lower layers against physical shock.

Furthermore, after the resist pattern is removed by a rinse liquid, the protection insulating film 49 is cured at a substrate temperature of 350° C. and $N_2$ flow rate of 18 l/minute to be hardened.

Since impurities may adhere to the surface of the protection insulating film 49 at curing, the upper surface of the protection insulating film 49 is cut by about 200 nm by means of plasma ashing to remove the impurities. Such plasma ashing results in the final thickness of the protection insulating film 49 of about 800 nm to 1000 nm.

When the thickness of the protection insulating film 49 falls below 800 nm, the strength of the film lowers, and the effect of the cushioning material is impaired. For this reason, the thickness of the protection insulating film 49 must be 800 nm or greater.

Here, the protection insulating film 49 may be made of photosensitive polyimide in place of non-photosensitive polyimide. However, photosensitive polyimide contains a photosensitizer and a crosslinker, thereby having a problem that the photosensitive polyimide is softer than non-photosensitive polyimide and is easily damaged when it is used as the protection insulating film 49 directly touched with the finger.

On the contrary, when the protection insulating film 49 is made of non-photosensitive polyimide as in this embodiment, the hardness of the protection insulating film 49 can be increased as compared to the case where photosensitive polyimide is used. Thus, the thickness of the protection insulating film 49 can be minimized while keeping hardness required to protect the device.

In this manner, a basic structure of the surface profile sensor in accordance with this embodiment is completed.

Figure 2:
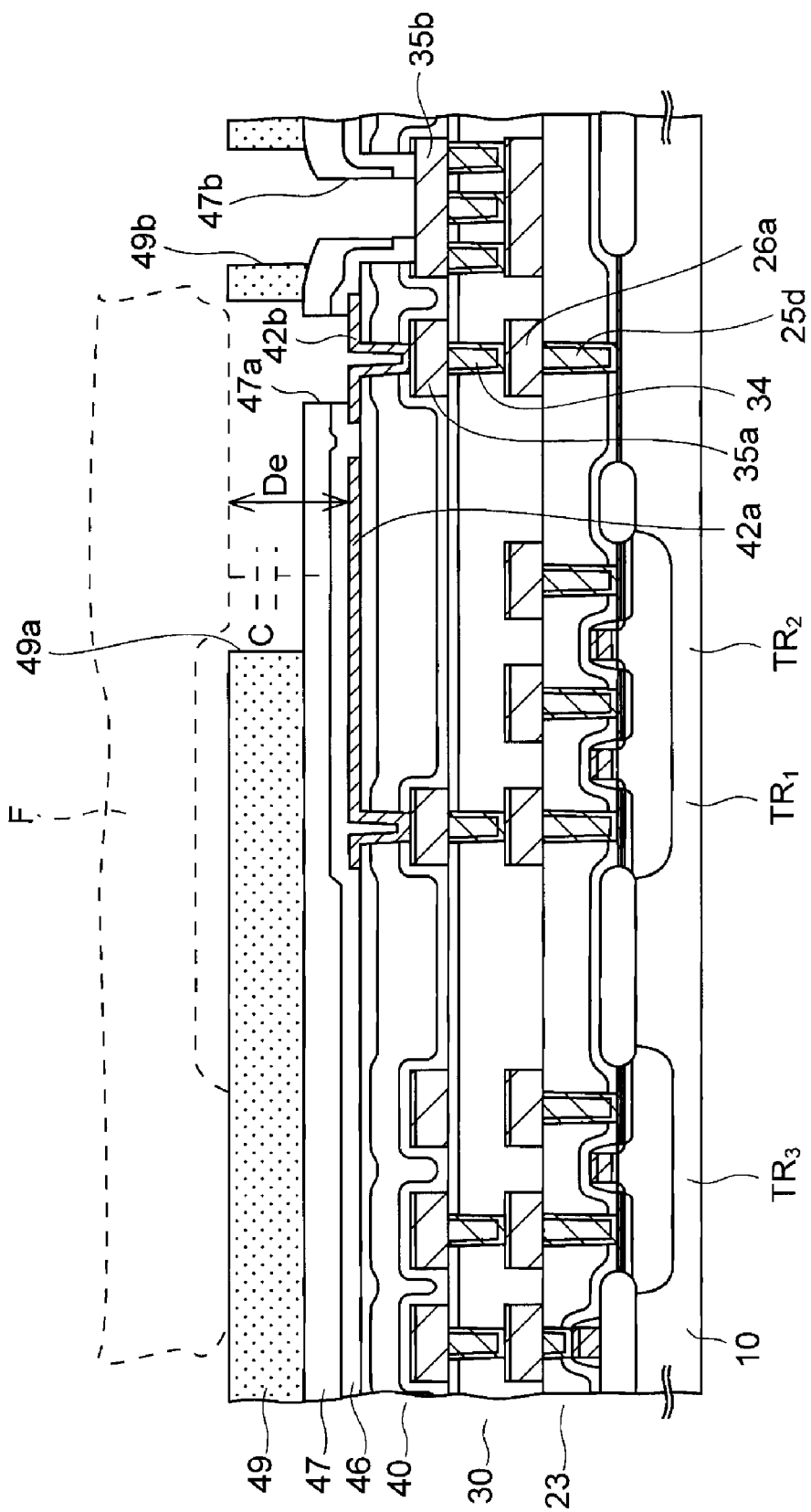
FIG. 2 is a sectional view for describing operations of the surface profile sensor during a course which leads to the embodiments.
Figure 3:
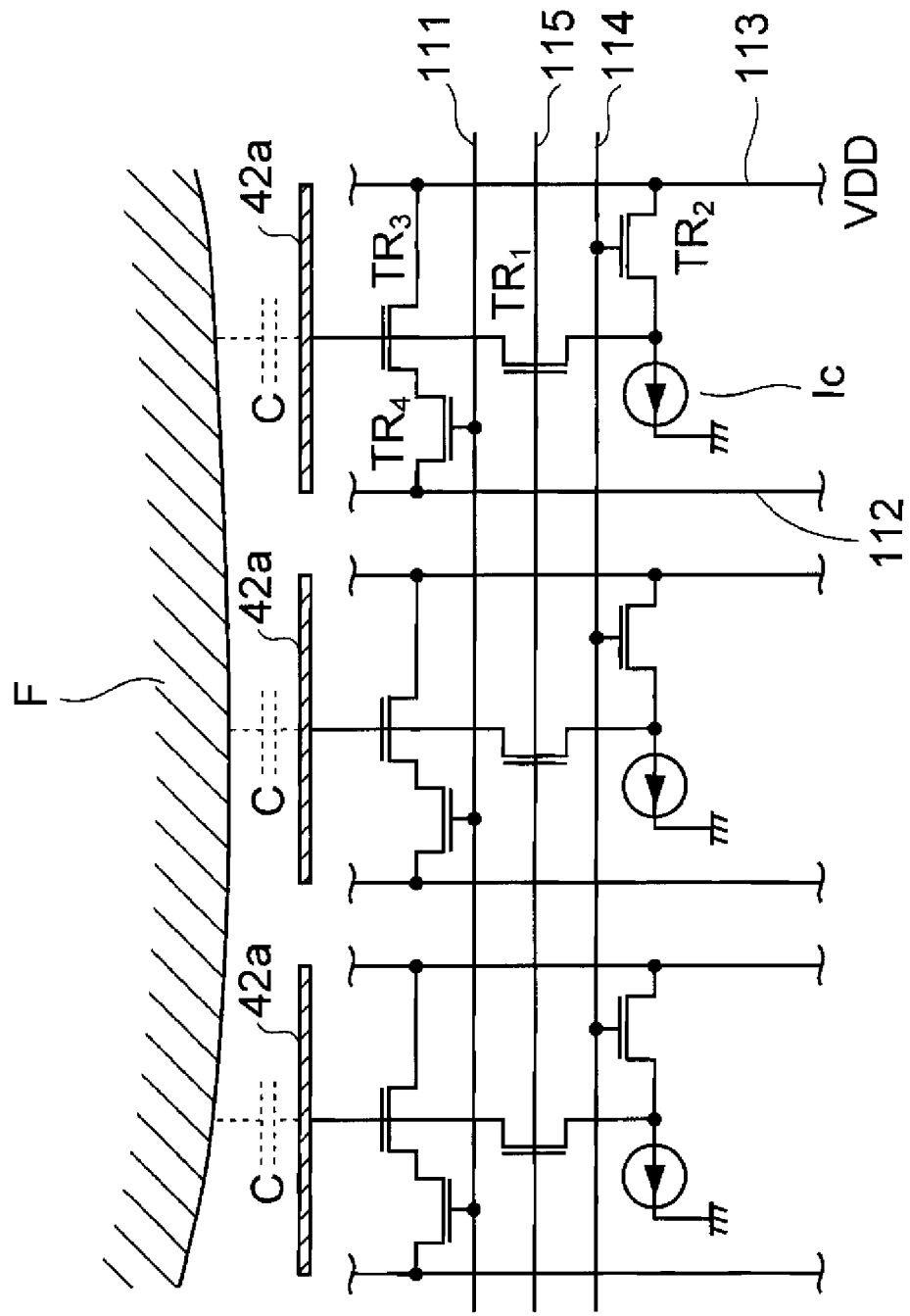
FIG. 3 is an equivalent circuit diagram for describing operations of the surface profile sensor during a course which leads to the embodiments.

Next, with reference to FIG. 2 and FIG. 3, operations of the surface profile sensor is described.

In this surface profile sensor, as illustrated in FIG. 2, when a finger (subject) F touches the protection insulating film 49, a capacitor C is formed between the finger F and the detection electrode film 42a. FIG. 3 shows an equivalent circuit. According to the equivalent circuit, the surface profile sensor further includes a fourth MOS transistor $TR_4$ in addition to the first to third MOS transistors $TR_1$ to $TR_3$ illustrated in FIG. 2. Each of the transistors $TR_1$ to $TR_4$ is connected to a row drive line 111, a column sense line 112, a power source line 113, a reset line 114, a charge control line 115 and a charge current source Ic as illustrated in FIG. 3 and the surface profile sensor is driven according to a so-called current charge method.

As illustrated in FIG. 2, since capacitance of the capacitor C varies depending on irregularities (fingerprint) on the surface of the finger F, an image of the fingerprint is obtained by reading the variation in capacitances on the detection electrode film 42a. Static electricity charged to the finger F escapes from the ground electrode film 42b to the silicon substrate 10. Accordingly, the circuit formed on the silicon substrate 10 is prevented from being broken by the static electricity.

A distance De between the finger F and the detection electrode film 42a is restricted by the cover insulating film 46, the moisture barrier insulating film 47 and the protection insulating film 49. As the thickness of the films becomes smaller, the distance De becomes smaller and the capacitance of the capacitor C becomes larger. Since the detection sensitivity of the fingerprint is improved as the capacitance of the capacitor C becomes larger, it is preferred that the thickness of the cover insulating film 46, the moisture barrier insulating film 47 and the protection insulating film 49 is as thin as possible.

However, in the surface profile sensor with above-described structure, to improve reliability in various practical uses, the cover insulating film 46 and the moisture barrier insulating film 47 are formed after forming the detection electrode film 42a, and then, the protection insulating film 49 made of polyimide film is formed as the cushioning material. When many insulating films are laminated in this manner, the distance between the detection electrode film 42a and the finger becomes large, possibly lowering the sensitivity. For this reason, in the surface profile sensor in this embodiment, the thickness of the polyimide film is set to 800 nm or more so as to reduce the distance between the detection electrode film 42a and the finger as much as possible. Preferably, the thickness should be further decreased in order to further improve the sensitivity. However, when the thickness is further decreased, the problem occurs that a pin hole and peeling and loss of the film are generated in the polyimide film, thereby impairing reliability. Meanwhile, with the current structure, the thickness of the cover insulating film 46 and the moisture barrier insulating film 47 approaches the limit to keep reliability. Therefore, the other solving means are demanded.

Under such circumstances, the above-mentioned Japanese Patent Application Publication No. 2003-58872 discloses an example in which a diamond-like carbon (DLC) film is used as the protection insulating film of the fingerprint sensor. Diamond-like carbon (DLC) can be formed into a film at a low temperature of 300° C. or lower and is a suitable material for the structure using an aluminum wiring. In addition, the diamond-like carbon can be made extremely thin as 0.2 μm at minimum to function as the protection insulating film. However, the protection insulating film is expected to be used in much severe environment in the future and further improvement of sensitivity is demanded. Thus, it is desired that the protection insulating film of the fingerprint sensor is made of a material which is strong and has sufficient mechanical strength even if its thickness is further reduced and which conforms to the semiconductor manufacturing process specific to the surface profile sensor.

Then, the inventors performed various researches and found tetrahedral amorphous carbon (ta-C) as a suitable material for the protection insulating film of the fingerprint sensor which has a possibility of satisfying the above-mentioned requirements. Tetrahedral amorphous carbon is also used in the above-mentioned patent documents. For example, disclosed are: examples as used as a protection film for a magnetic head or a magnetic recording medium (Japanese Patent Translation Publication No. 2000-512053, Japanese Laid-open Patent Publication No. 2004-256837, Japanese Patent No. 3624843, U.S. Pat. No. 5,858,477, Japanese Laid-open Patent Publication No. 2003-301257); an example as used as an etching mask (Japanese Laid-open Patent Publication No. 2002-194123); an example as used as an electron discharge element material (Japanese Patent No. 3658342); examples relating to a film-forming method (Japanese Laid-open Patent Publication No. 2004-218087, U.S. Pat. No. 6,143,142); examples relating to an etching method (Japanese Laid-open Patent Publications Nos. 2002-294470, 2002-194123) and the others (Japanese Patent Translation Publication No. 2002-544380, U.S. Pat. No. 6,261,693). However, in any of these documents, there is no example as used as the protection insulating film of the fingerprint sensor.

Thus, Inventors researched whether or not the tetrahedral amorphous carbon can conform to the manufacturing process specific to the surface profile sensor and what conditions are needed for conformity.

First, a tetrahedral amorphous carbon film (ta-C film) is formed at about 800 nm of same thickness as in the current polyimide film on the moisture barrier insulating film 47 according to the Filtered Cathodic Vacuum Arc (FCVA) method.

According to the FCVA method, the surface of a cathode target made of pure graphite to which a DC voltage is applied is hit with a striker (anode). As a result, an arc discharge occurs between the cathode target and the striker, thereby generating carbon ions, electrons and the like from the cathode target. Thereby, a plasma state including neutral particles and charged particles of a few μm to several tens of μm are generated. In the plasma state, only ionized carbons having high energy are taken out by an electromagnetic spatial filter. The carbon ion particles are scanned to form a ta-C film on the substrate. At this time, energy of the carbon ion particles can be varied by applying a negative bias voltage to the substrate. An example of film-forming conditions is as follows.

(Film-Forming Conditions)
Film-forming temperature (substrate temperature): 80° C. or lower
Film-forming pressure: about $1 \times 10^{-6}$ Torr The ta-C film may be also formed according to the Physical Vapor Deposition (PVD) method including the evaporation method and the sputtering method, or the Plasma Enhanced Chemical Vapor Deposition (PECVD) method. An example of film-forming conditions of the PVD method is as follows.

(Film-Forming Conditions)
Film-forming temperature (substrate temperature): 400° C. or lower
Film-forming pressure: about $1 \times 10^{-3}$ Torr An example of film-forming conditions of the PECVD method is as follows.

(Film-Forming Conditions)
Film-forming gas: mixed gas of $CH_4$ and $H_2$ or only $CH_4$ gas
Power for plasmatization: 1 kW at maximum
Film-forming temperature (substrate temperature): 200° C. or lower
Film-forming pressure: about $1 \times 10^{-3}$ Torr Film quality, adhesiveness, and uniformity and reproducibility of film formation are the highest according to the FCVA method, followed by the PECVD method and the PVD method in this order. The order of film density from highest to lowest is the FCVA method, the PECVD method and the PVD method.

After forming the ta-C film, a resist pattern having a thickness of about 10 μm is formed thereon as a mask for etching the tetrahedral amorphous carbon film. When the structure is etched under the following conditions, an etching selection ratio of the resist film to the tetrahedral amorphous carbon film cannot be secured and thus, etching of the tetrahedral amorphous carbon film is difficult.

Figure 4:
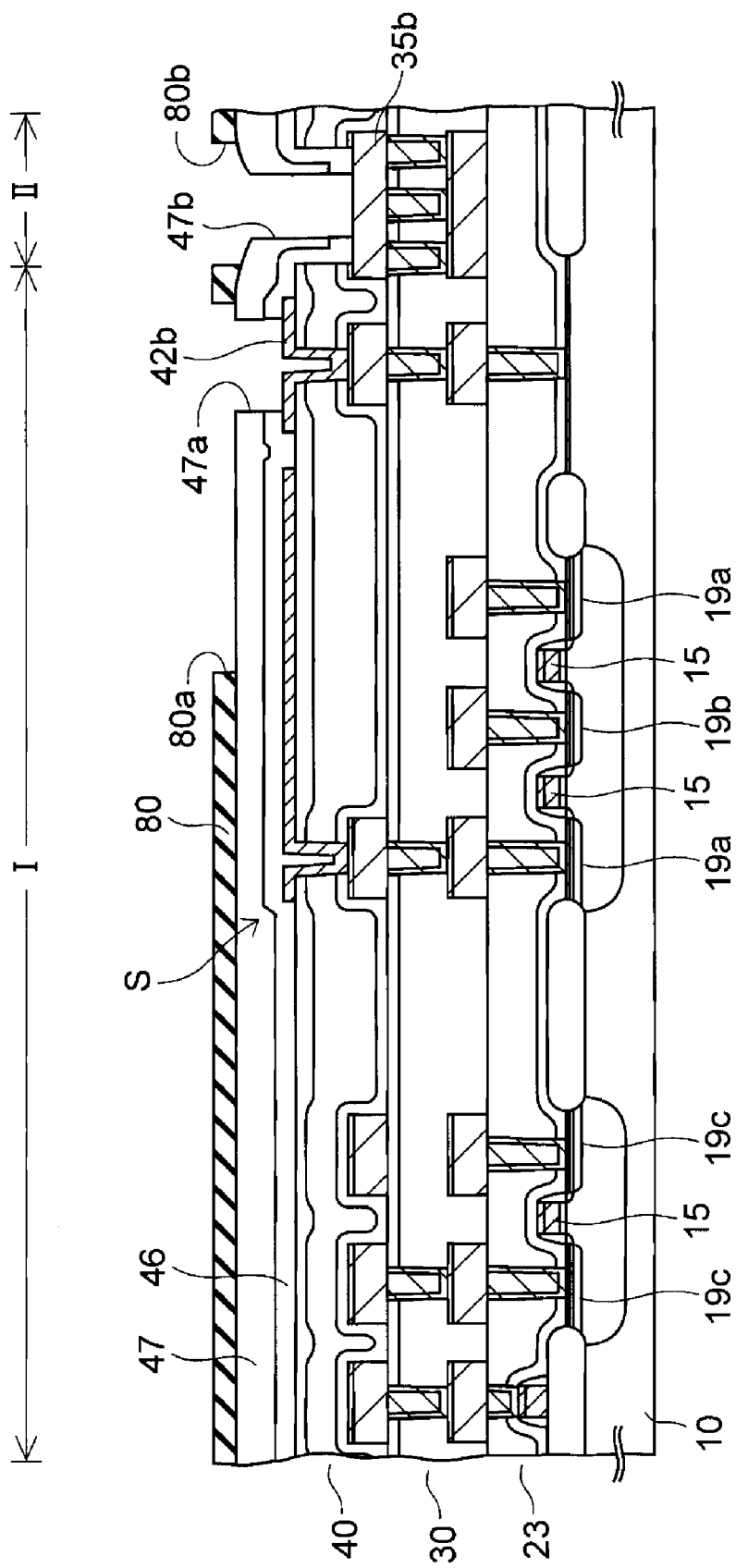
FIG. 4 is a sectional view of the surface profile sensor during a course which leads to the embodiments.

(Etching Conditions)
Etching gas: $O_2$ 24 ml/min
$CHF_3$ 65 ml/min
Degree of vacuum: 10.64 Pa (80 mTorr)
Power for plasmatization of etching gas: 1600 W Next, as illustrated in FIG. 4, when the tetrahedral amorphous carbon film 80 is formed on the moisture barrier insulating film 47 so as to have a thin thickness as about 100 nm and etched under the same conditions as the above-mentioned conditions, etching can be achieved. However, two other problems occur.

The first problem is that a crack occurs on the cover insulating film 46 under the moisture barrier insulating film 47. The second problem is that since oxygen-containing gas is used as the etching gas, it leads to oxidation of the surface of the bonding pad 35b from which the copper-containing aluminum film is exposed through the electrode drawing window 47b.

As a result of research on the first problem, it is found out that the crack occurs at a bent portion S of a stepped portion of the cover insulating film 46. This may be due to reason that the tetrahedral amorphous carbon film 80 has very high film strength thereby having large film stress, and the stress concentrates on the bent portion S of a stepped portion of the cover insulating film 46. Concerning relaxation of the stress of the tetrahedral amorphous carbon film 80, the stress can be relaxed by removing a portion of the film 80 or dividing the film 80 without covering the whole of the upper surface of the moisture barrier insulating film 47 with the film 80. In applying the film 80 to the surface profile sensor, since openings of the tetrahedral amorphous carbon film 80 need to be formed in the sensor portion and the pad portion, it is originally advantageous in terms of stress relaxation. However, it is found out that the stress needs to be further relaxed. Thus, for the first problem, it is found to be effective that the number of openings in the tetrahedral amorphous carbon film 80 is increased, that the tetrahedral amorphous carbon film 80 is further divided and that no bent portion S is generated on the surface which is covered with the tetrahedral amorphous carbon film 80.

The second problem can be solved by leaving the titanium nitride film on the surface of the bonding pad 35b until etching of the tetrahedral amorphous carbon film is finished in the manufacturing process. At etching, the titanium nitride film is used as an antioxidant film of the copper-containing aluminum film, and the titanium nitride film is etched after etching the tetrahedral amorphous carbon film.

Various embodiments adopting the above-mentioned ideas are described below.

First Embodiment

With reference to FIG. 5A to FIG. 7, a C-MOS type surface profile sensor on an electrostatic capacitance method device in accordance with a first embodiment and a manufacturing method thereof are described.

First, with reference to FIG. 5I to FIG. 6B, the surface profile sensor device is described.

Figure 5A:
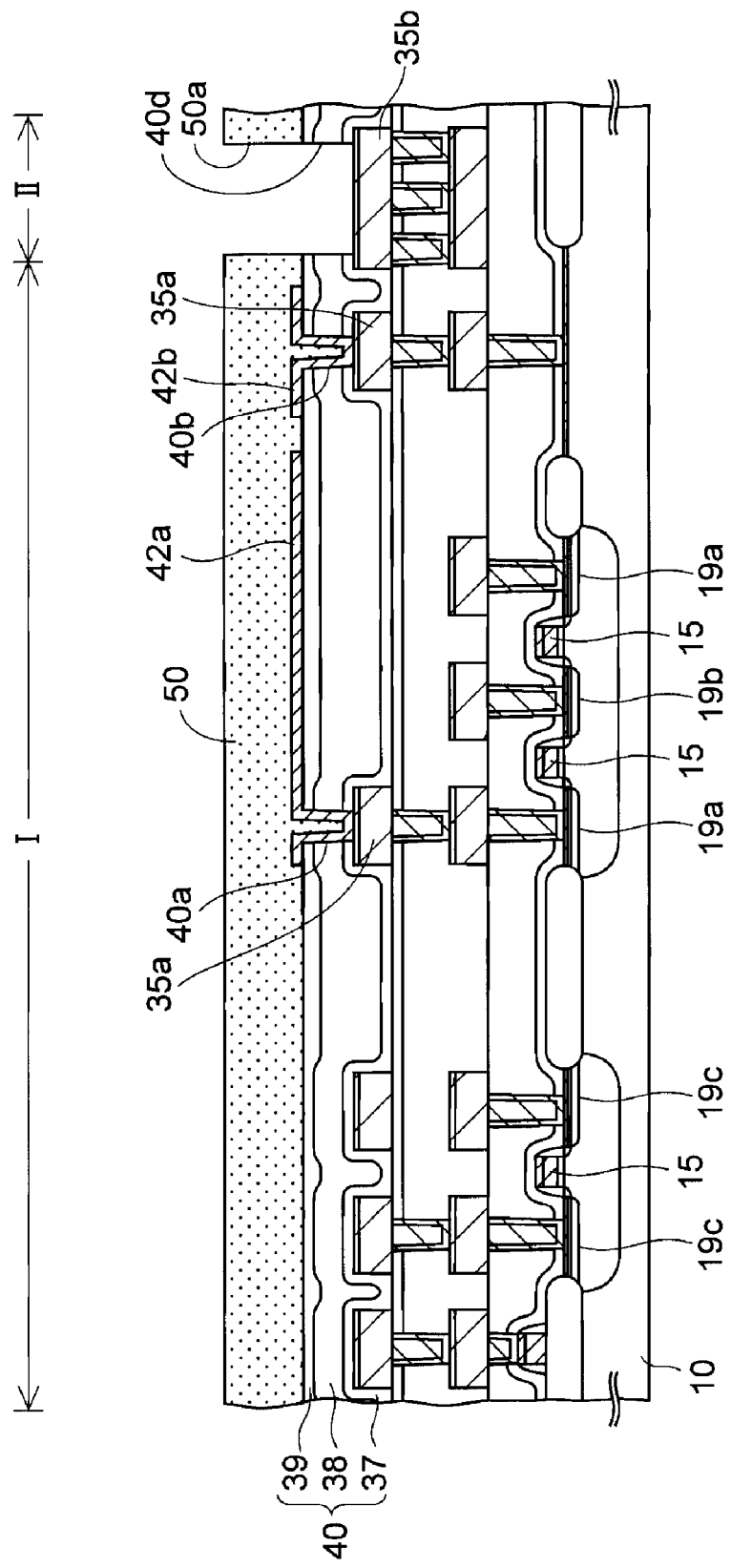
Figure 5C:
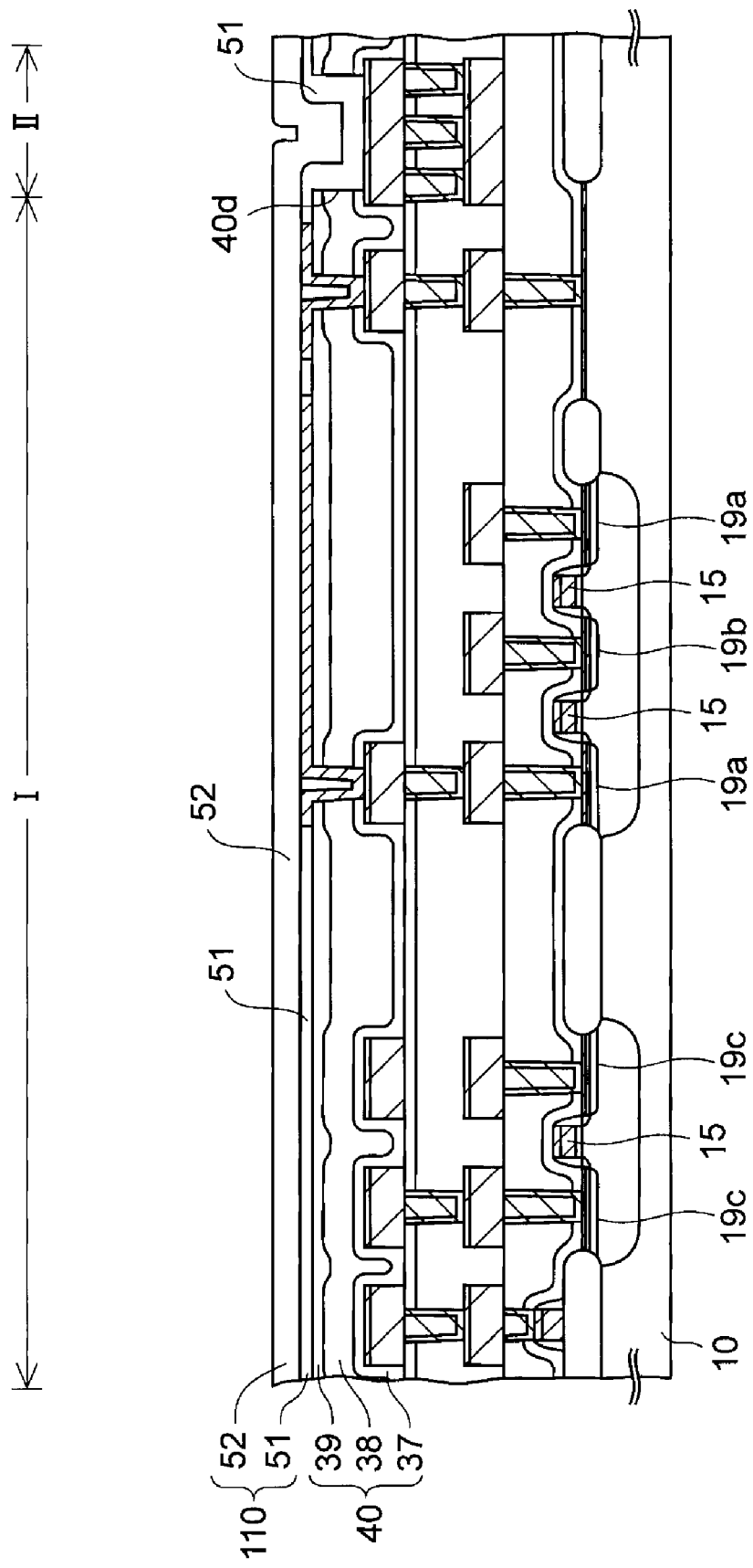
Figure 5D:
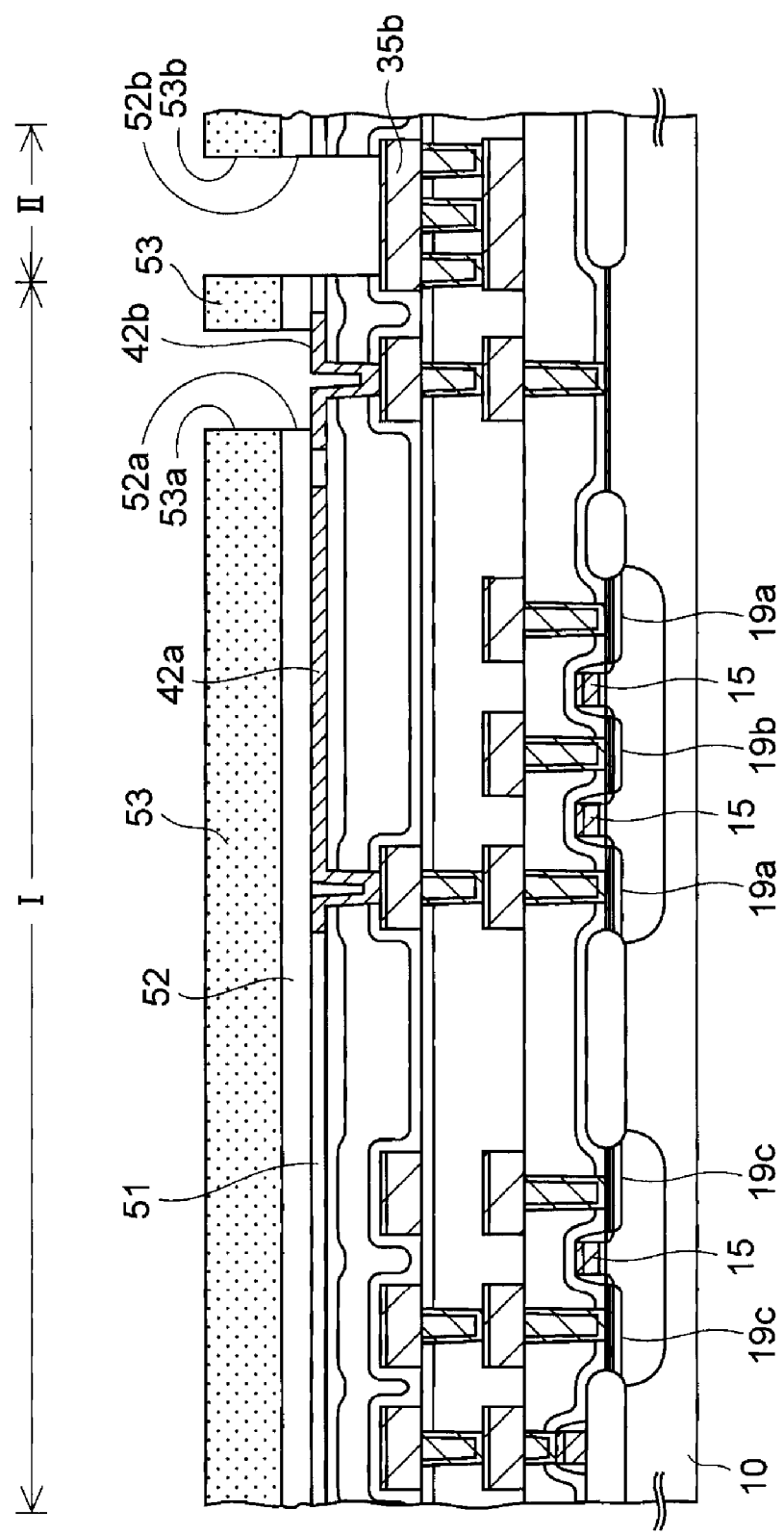
Figure 5E:
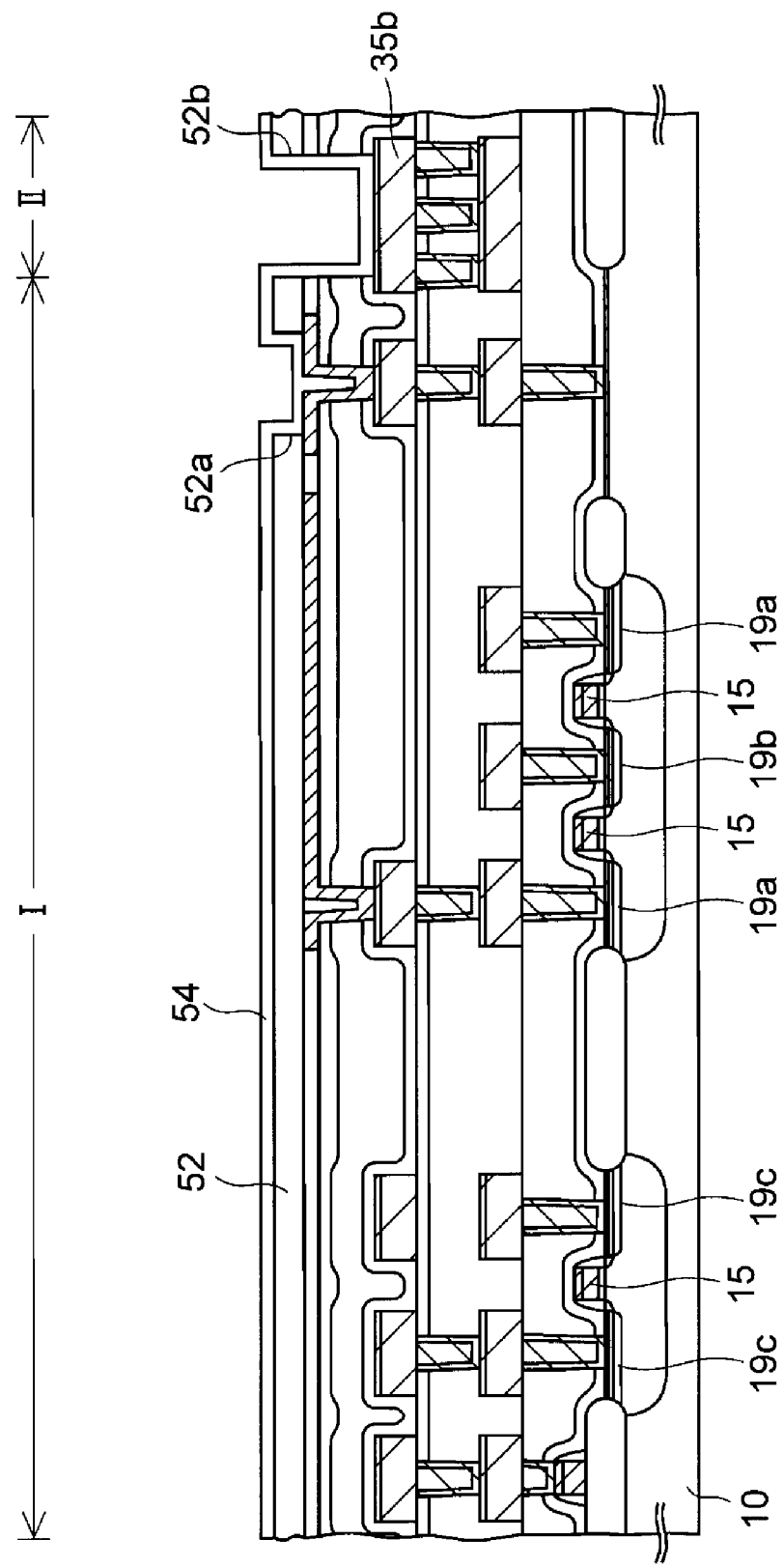
Figure 5F:
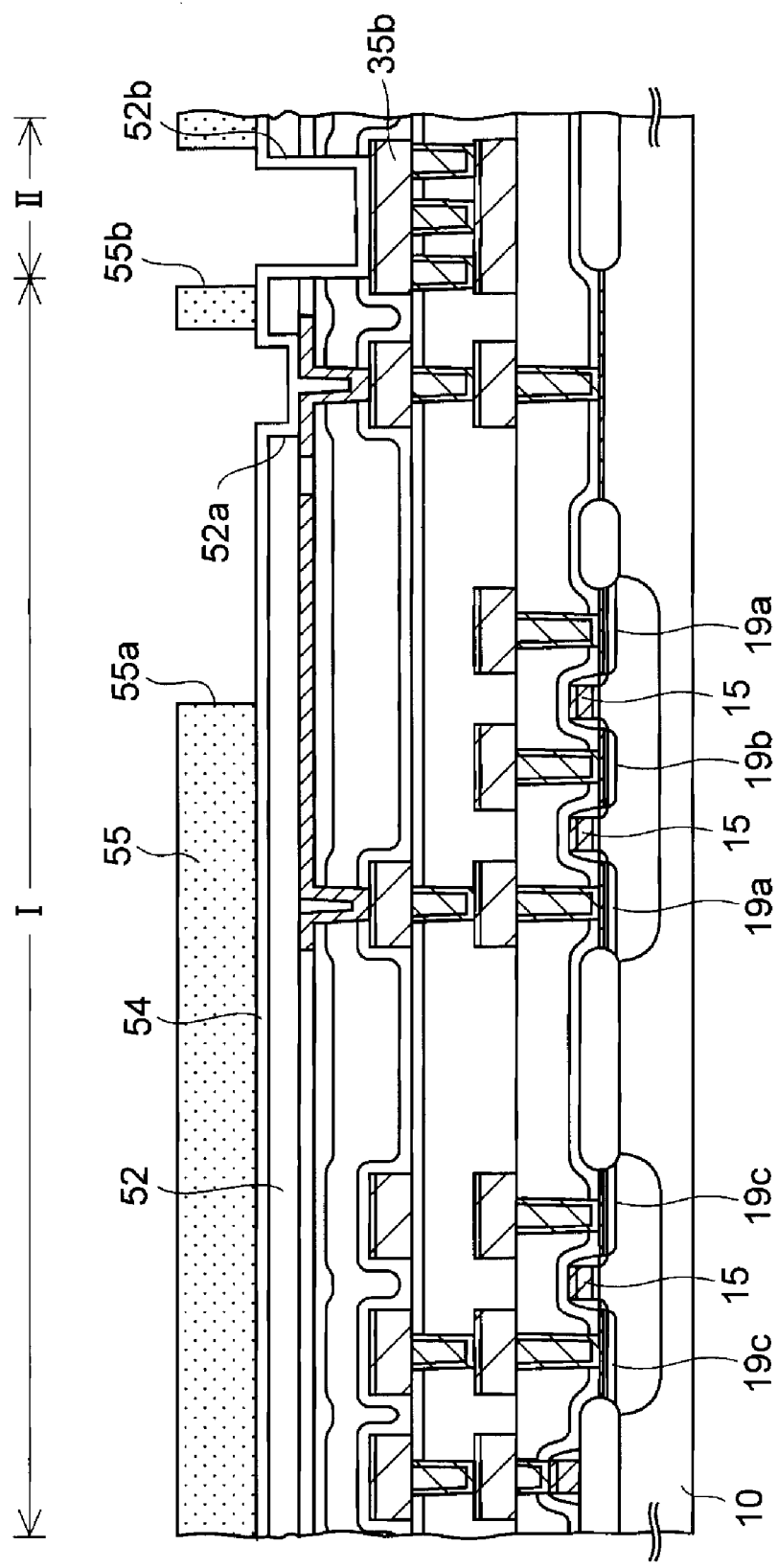
Figure 5G:
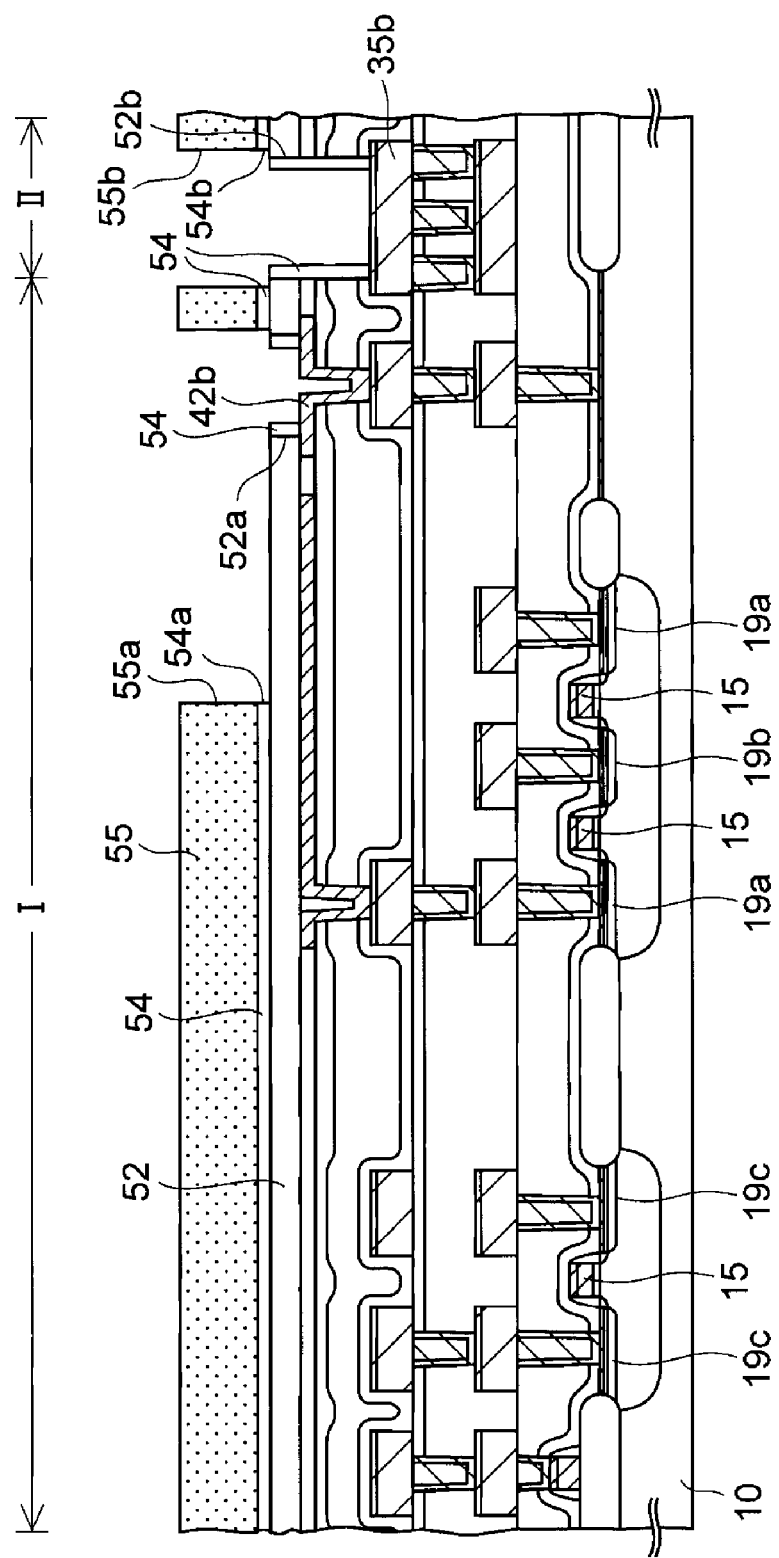
Figure 5H:
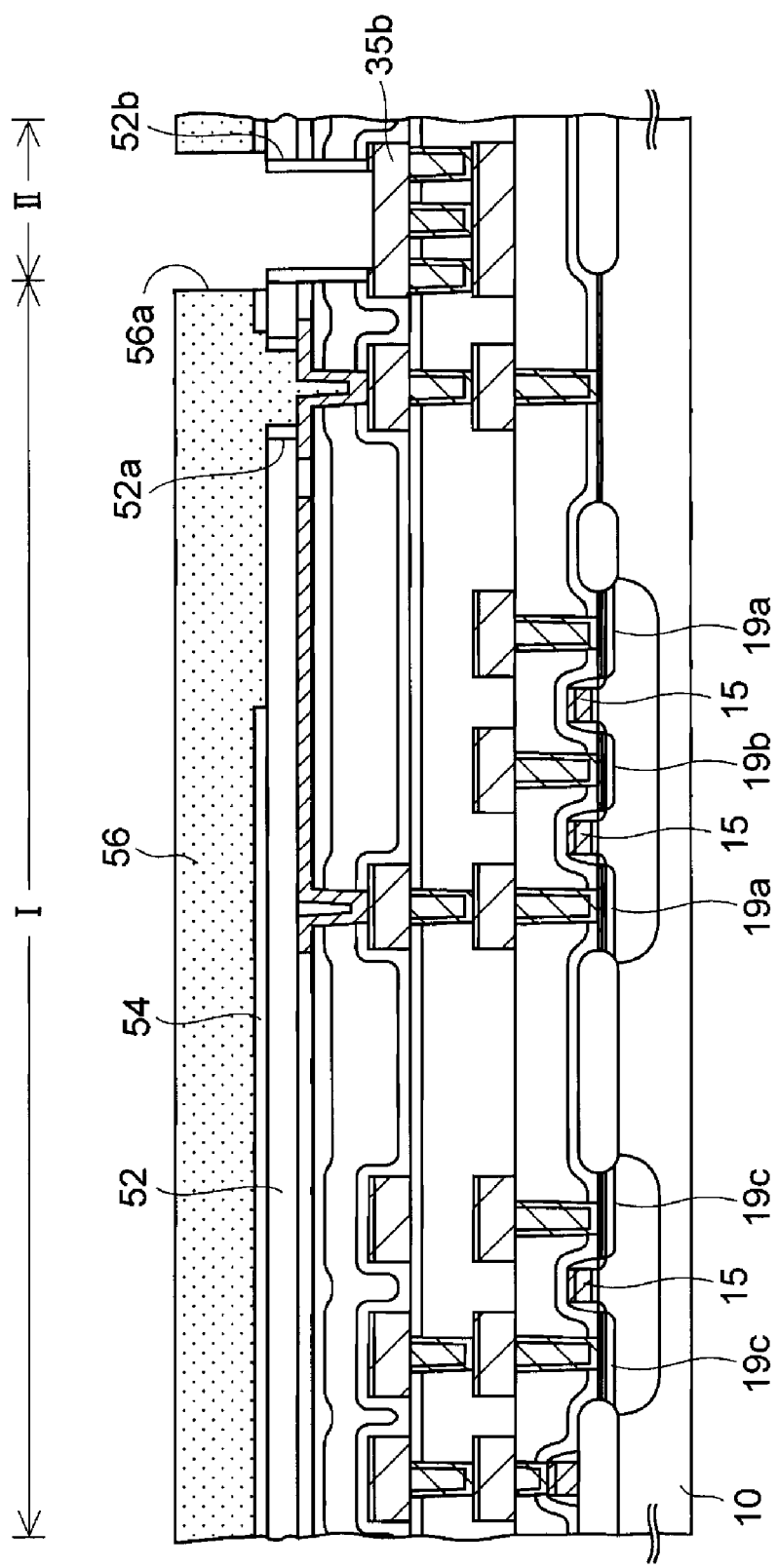
Figure 5I:
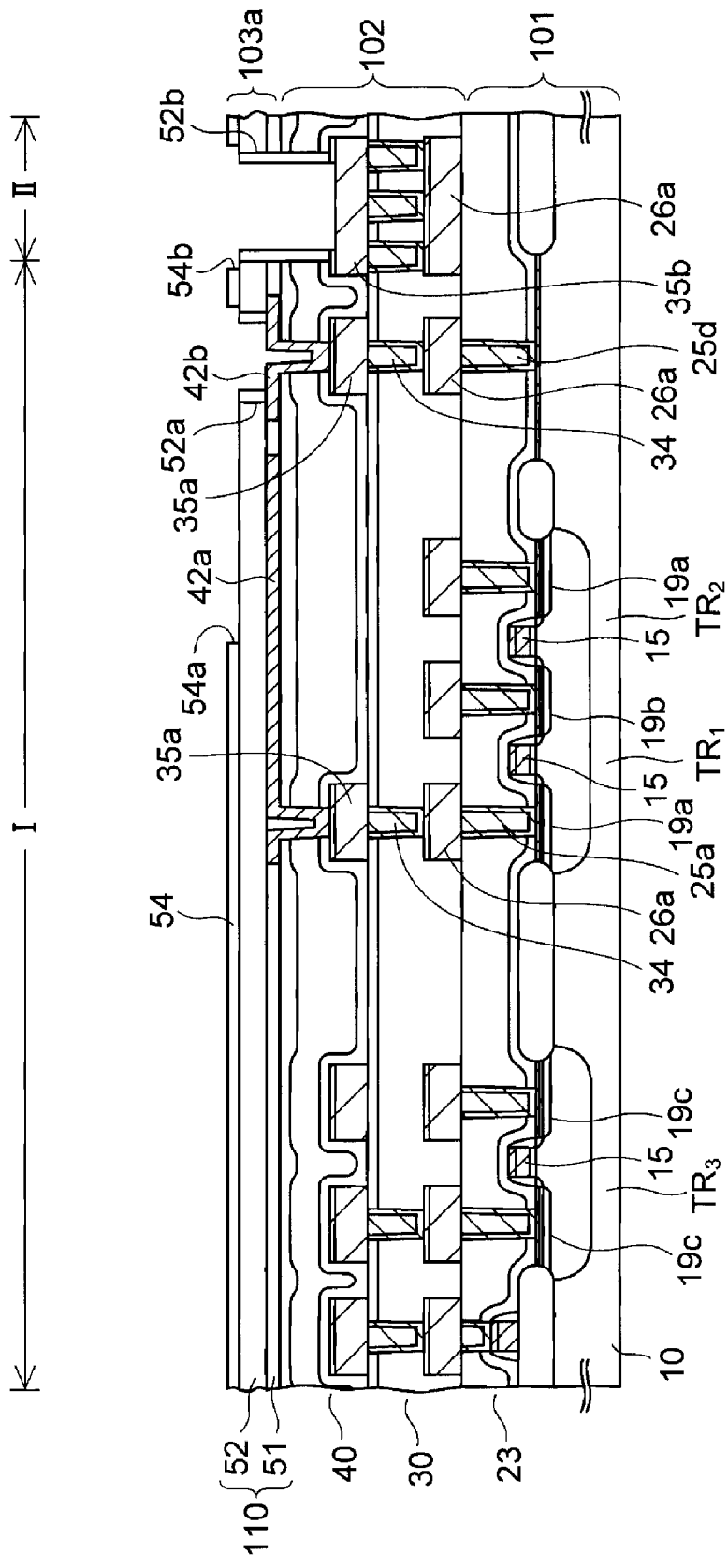
Figure 6A:
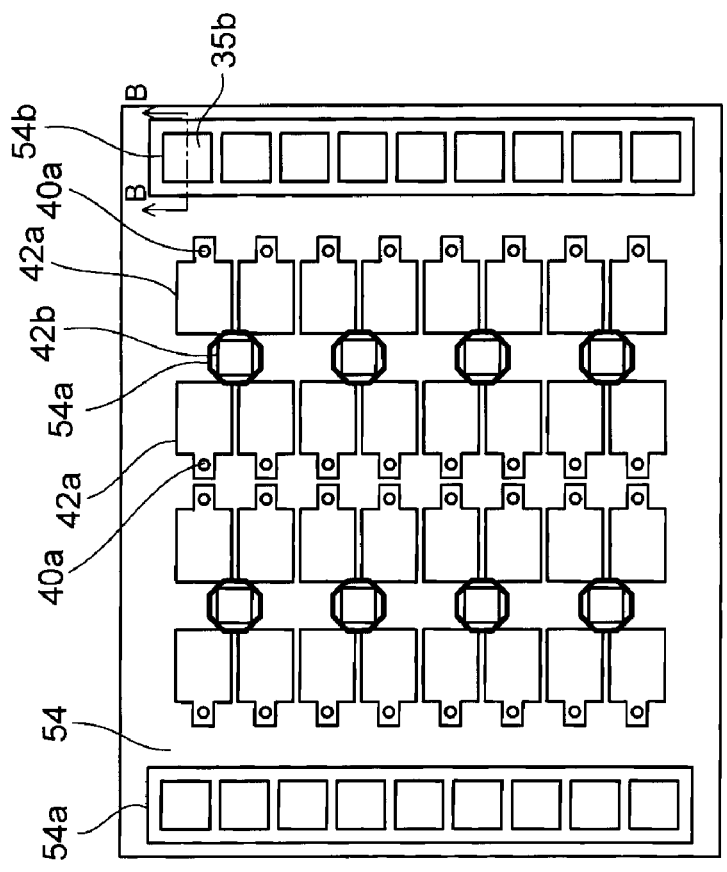
FIG. 6A is a plan view illustrating planar configuration of the surface profile sensor according to the first embodiment and FIG. 6B is an enlarged plan view of a sensor portion and an ESD portion of the sensor.
Figure 6B:
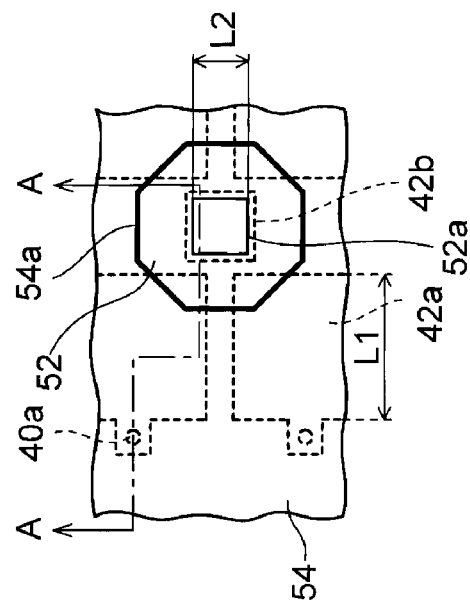

FIG. 5I is a sectional view illustrating the structure of one sensor region I and one pad region II of the surface profile sensor device. FIG. 6A is a plan view illustrating planar arrangement of the sensor region I and the pad region II in the C-MOS surface profile sensor device. FIG. 6B is an enlarged view of the sensor portion and the ESD portion in the sensor region I. FIG. 5I is a composite view of a sectional view along a line A-A in FIG. 6B and a sectional view along a line B-B in FIG. 6A.

As illustrated in FIG. 5I, the surface profile sensor device is formed of the transistor layer portion 101, the wiring layer portion 102 and a fingerprint sensor layer portion 103a in this order from the lower layer to the upper layer.

The transistor layer portion 101 and the wiring layer portion 102 have the same layer structure as in FIG. 1X and the structure of the fingerprint sensor layer portion 103a is different from the structure in FIG. 1X as follows.

In other words, the fingerprint sensor layer portion 103a includes the detection electrode film 42a and the ground electrode film (electrostatic discharge electrode) 42b on the third interlayer insulating film 40, a cover insulating film 51 which is formed on the third interlayer insulating film 40 in the vicinity of the detection electrode film 42a and which is made of a silicon oxide film forming a surface flush with the upper surfaces of the detection electrode film 42a and the ground electrode film 42b, a moisture barrier insulating film 52 which is formed on the cover insulating film 51, the detection electrode film 42a and the ground electrode film 42b and which is made of a silicon nitride film having a thickness of about 700 nm, and a protection insulating film 54 which is formed on the moisture barrier insulating film 52 and which has a first window (sensor window) 54a in which the sensor portion and the ESD portion in the sensor region I is included and a second window 54b in the pad portion in the pad region II. The protection insulating film 54 protects a circuit in the lower layers against mechanical shock due to contact with the finger and the like. The cover insulating film 51 and the moisture barrier insulating film 52 serve as an upper insulating film 110.

The protection insulating film 54 is formed of a tetrahedral amorphous carbon film (ta-C film). The thickness of the protection insulating film 54 is selected within the range of 10 to 200 nm, more preferably, the range of 50 to 120 nm. The reason why the lower limit of the thickness is 10 nm is that when the film thickness is less than 10 nm, the effect of absorbing mechanical shock due to contact with the finger and the like cannot be sufficiently obtained. The reason why the upper limit of the film thickness is 200 nm is that when the thickness is more than 200 nm, etching the film becomes difficult.

In the first window 54a of the protection insulating film 54 which is provided in the sensor region I, the ground electrode film 42b is exposed through the ESD hole (first hole) 52a. In the second window 54b of the protection insulating film 54 which is provided in the pad region II, the surface of the copper-containing aluminum film which is a base of the bonding pad 35b is exposed through the electrode drawing window (second hole) 52b. The ESD hole 52a passes through the moisture barrier insulating film 52 and the electrode drawing window 52b passes through the moisture barrier insulating film 52, the cover insulating film 51 and the third interlayer insulating film 40. In mounting a sensor chip to the package, a bonding wire is connected to the bonding pad 35b.

Such sensor region I and pad region II are planarly arranged as illustrated in FIG. 6A. Although FIG. 6A schematically depicts a planar configuration for convenience of description, far more detection electrode films 42a (for example, 1024×1024) are actually arranged in a matrix form and each of them acts as one pixel. The planar size of the detection electrode film 42a and the ground electrode film 42b is not specifically limited, but, in the embodiment, it is assumed that the size of L1 is about 50 μm and the size of L2 is about 6 μm as depicted in these drawings. In this surface profile sensor, a center portion and a peripheral portion are covered with the protection insulating film 54, except for regions where the sensor portion and the ESD portion in the sensor region I and the first window 54a and the second window 54b of the protection insulating film 54 in the pad region II are formed.

Figure 7:
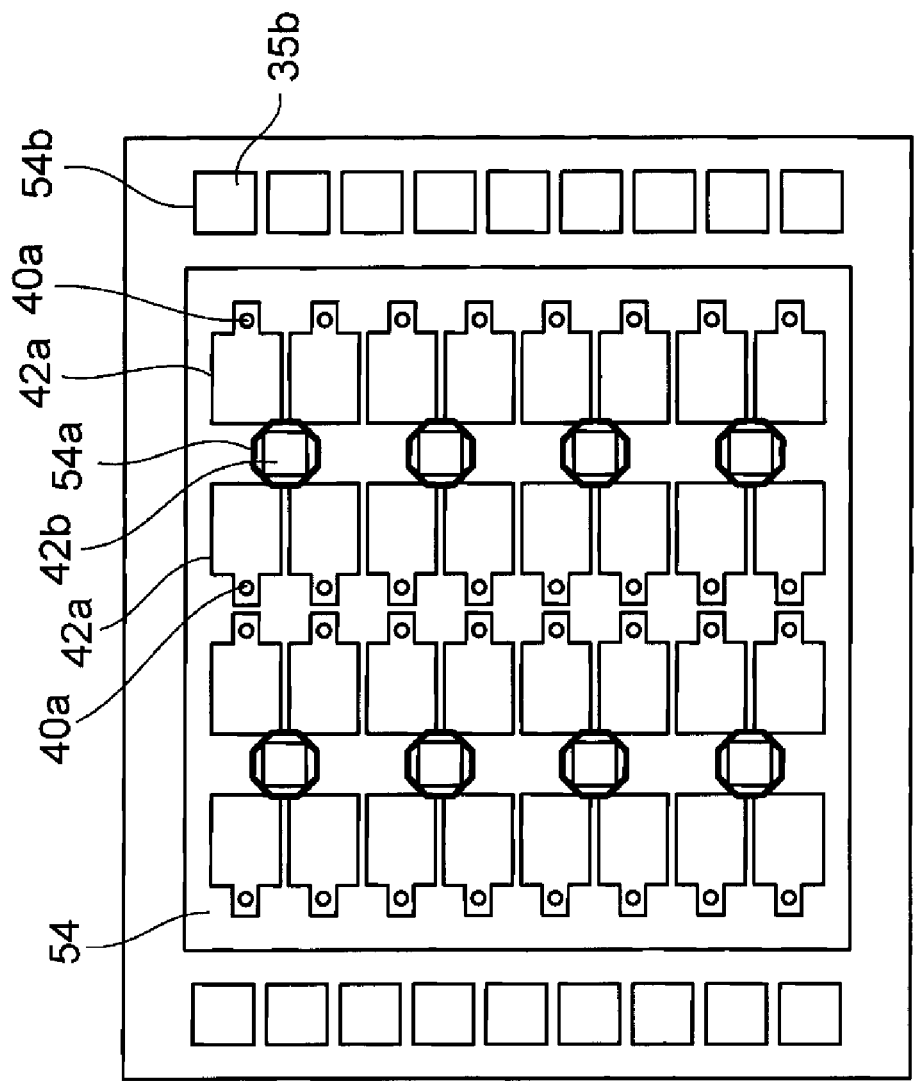
FIG. 7 is a plan view illustrating another planar configuration of the surface profile sensor according to the first embodiment.

Although the center portion and the peripheral portion are covered with the protection insulating film 54 in the above-description, only the sensor region I being the center portion may be covered with the protection insulating film 54 as illustrated in FIG. 7.

As described above, according to the surface profile sensor in accordance with this embodiment, since the tetrahedral amorphous carbon film is used as the protection insulating film 54, as compared to the case where the polyimide film is used, the thickness of the protection insulating film 54 can be greatly reduced to about 100 nm while maintaining mechanical strength. Thereby, detection sensitivity of the fingerprint can be improved while maintaining mechanical strength.

Next, with reference to FIG. 5A to FIG. 5I, the method of manufacturing C-MOS type surface profile sensor of the electrostatic capacitance method in accordance with the first embodiment is described. FIG. 5A to FIG. 5I are sectional views illustrating a manufacturing process of the sensor. The planar arrangement of the completed surface profile sensor is illustrated in FIGS. 6A, 6B.

Since the processes illustrated in FIG. 1A to FIG. 1T are also performed in this manufacturing method, only the subsequent processes are described.

As depicted in FIG. 1T, the detection electrode film 42a and the ground electrode film 42b which are connected to the second layer wirings 35a through the holes 40a, 40b, respectively, and extend on the third interlayer insulating film 40 are formed by patterning. Thereafter, as illustrated in FIG. 5A, a ninth resist pattern 50 having a window 50a above the bonding pad 35b is formed on the third interlayer insulating film 40.

Subsequently, the third interlayer insulating film 40 is removed by etching through the window 50a of the ninth resist pattern 50 to form a hole 40d on the bonding pad 35b.

Etching of the third interlayer insulating film 40 is performed in the following four stages. In the first stage, the substrate 10 is set in a chamber of an etching apparatus, $CF_4$ (909 sccm) and $O_2$ (102 sccm) as etching gas are introduced, the pressure in the chamber is set to 10000 mTorr and treatment is performed for 15 seconds. In the second stage, the pressure is set to 1000 mTorr and treatment is performed for 5 seconds under the same etching gas condition. In the third stage, treatment power (RF power) is set to 1 kW, the pressure is set to 1000 mTorr and treatment is performed for 5 seconds under the same etching gas condition. In the fourth stage, feeding of the etching gas is stopped and exhaustion is performed for 5 seconds. Thereby, etching is stopped at the titanium nitride film on the bonding pad 35b to form the hole 40d. Thus, the titanium nitride film on the surface of the bonding pad 35b is exposed in the hole 40d.

Thereafter, the ninth resist pattern 50 is removed.

Next, as illustrated in FIG. 5B, a silicon oxide film as the cover insulating film 51 is formed at a thickness of about 600 nm on the third interlayer insulating film 40, the detection electrode film 42a and the ground electrode film 42b so that the cover insulating film 51 covers the hole 40d. It is preferred that the thickness of the cover insulating film 51 is 1.5 times or more the thickness of the detection electrode film 42a and the ground electrode film 42b, in other words, 300 nm or greater in this embodiment. The cover insulating film 51 is formed, for example, according to the plasma-enhanced CVD method using TEOS.

Next, a process until a cross-sectional structure depicted in FIG. 5C is obtained is described.

First, the cover insulating film 51 is polished according to the CMP method and a recessed portion between the detection electrode film 42a and the ground electrode film 42b is filled to planarize the surface so as not to generate a step on the surface on which the detection electrode film 42a and the ground electrode film 42b are formed.

Subsequently, a silicon nitride film as the moisture barrier insulating film 52 is formed at a thickness of about 700 nm on the cover insulating film 51, the detection electrode film 42a and the ground electrode film 42b so as to cover the hole 40d. The silicon nitride film is formed in a film-forming temperature of 400° C., for example, according to the plasma-enhanced CVD method using mixed gas of silane and ammonia as reactant gas. The cover insulating film 51 and the moisture barrier insulating film 52 form the upper insulating film 110.

Next, as illustrated in FIG. 5D, a tenth resist pattern 53 having a window 53a and a window 53b above the ground electrode film 42b and the bonding pad 35b, respectively, is formed on the moisture barrier insulating film 52.

Next, the moisture barrier insulating film 52 is etched through the window 53a of the tenth resist pattern 53 to form the ESD hole (first hole) 52a through which the ground electrode film 42b is exposed. In addition, the moisture barrier insulating film 52 and the cover insulating film 51 are etched through the window 53b to form the electrode drawing window (second hole) 52b on the bonding pad 35b. The titanium nitride film on the surface of the bonding pad 35b is exposed through the electrode drawing window 52b.

Afterward, the tenth resist pattern 53 is removed, and then dehydration treatment is performed in an $N_2$ atmosphere in a substrate temperature of 430° C. for 30 minutes.

Next, as illustrated in FIG. 5E, a tetrahedral amorphous carbon film (ta-C film) to be the protection insulating film 54 is formed at a thickness of 100 nm on the moisture barrier insulating film 52 so as to cover the ESD hole 52a and the electrode drawing window 52b according to the PVD method, the CVD method or the FCVA method. Film-forming conditions of the tetrahedral amorphous carbon film are the same as those described in the section (Course leading to the embodiments).

Subsequently, as illustrated in FIG. 5F, an eleventh resist pattern 55 is formed at a thickness of about 10 μm on the protection insulating film 54. The eleventh resist pattern has a window 55a in which the sensor portion and the ESD portion are included and a window 55b in which the pad portion is included.

Next, as illustrated in FIG. 5G, the protection insulating film 54 of the sensor portion and the ESD portion is anisotropically etched and removed through the window 55a of the eleventh resist pattern 55 to form the first window (sensor window) 54a and to leave the protection insulating film 54 in the protection portion. At the same time, the protection insulating film 54 in the pad portion is etched and removed through the window 55b to form the second window 54b. Etching conditions of the tetrahedral amorphous carbon film as the protection insulating film 54 are as follows.

(Etching Conditions)
Etching gas: $O_2$ 24 ml/min $CHF_3$ 65 ml/min
Degree of vacuum: 10.64 Pa (80 mTorr)
Power for plasmatization of etching gas: 1600 W In this case, the titanium nitride films on the surfaces of the ground electrode film 42b and the bonding pad 35b is exposed at the bottoms of the ESD hole 52a and the electrode drawing window 52b, but the protection insulating film 54 remains at the side walls of the inner surfaces of the ESD hole 52a and the electrode drawing window 52b. Since the remaining protection insulating film 54 does not influence the subsequent manufacturing process nor disturb wire bonding and discharge of static electricity, the protection insulating film 54 is left as it is.

Thereafter, the eleventh resist pattern 55 is removed.

Subsequently, as illustrated in FIG. 5H, a twelfth resist pattern 56 which covers the sensor portion, the ESD portion and the protection portion and which has a window 56a in the pad portion is formed.

Next, the titanium nitride film on the surface of the bonding pad 35b is removed by etching through the window 56a of the twelfth resist pattern 56.

Etching of the titanium nitride film is performed as follows. First, $CHF_3$ (300 sccm) and $O_2$ (50 sccm) are used, pressure is set to 80 mTorr, and treatment power (RF power) of 1600 W is applied, and then treatment is performed. Subsequently, etching for compensation is performed. The etching for compensation is performed in the following four stages.

In the first stage, $CF_4$ (909 sccm) and $O_2$ (102 sccm) are introduced into the chamber, the pressure in the chamber is set to 10000 mTorr and treatment is performed for 15 seconds. In the second stage, the pressure is set to 1000 mTorr and treatment is performed for 5 seconds under the same etching gas condition. In the third stage, treatment power is set to 1 kW, the pressure is set to 1000 mTorr and treatment is performed for 5 seconds under the same etching gas condition. In the fourth stage, feeding of the film-forming gas is stopped and exhaustion is performed for 5 seconds. Thereby, the titanium nitride film on the bonding pad 35b is etched so that the copper-containing aluminum film of the bonding pad 35b may appear in the electrode drawing window 52b.

Afterward, when the twelfth resist pattern 56 is removed, as illustrated in FIG. 33, the surface profile sensor is completed.

As described above, according to the method for manufacturing the surface profile sensor in accordance with this embodiment, the titanium nitride film on the surface of the bonding pad 35b is left until the protection insulating film 54 covering the hole 40d is formed (FIG. 5E) after the hole 40d is formed on the bonding pad 35b (FIG. 5A). Then, only after the protection insulating film 54 is patterned (FIG. 5F to FIG. 5G), the titanium nitride film on the surface of the bonding pad 35b is removed.

Therefore, since the surface of the bonding pad 35b is covered with the titanium compound film when patterning the protection insulating film 54, the aluminum film or the compound film mainly containing aluminum under the titanium compound film can be prevented from being oxidized by the etching gas (oxygen-containing gas) for the protection insulating film 54. Thereby, the wire can be easily bonded to the surface of the bonding pad 35b, on which the unoxidized aluminum film or compound film mainly containing aluminum is exposed.

Second Embodiment

Next, with reference to FIG. 8A to FIG. 8H, a C-MOS type surface profile sensor on an electrostatic capacitance method in accordance with a second embodiment and a manufacturing method thereof are described. FIG. 8A to FIG. 8H are sectional views illustrating a manufacturing process of the surface profile sensor.

Figure 8A:
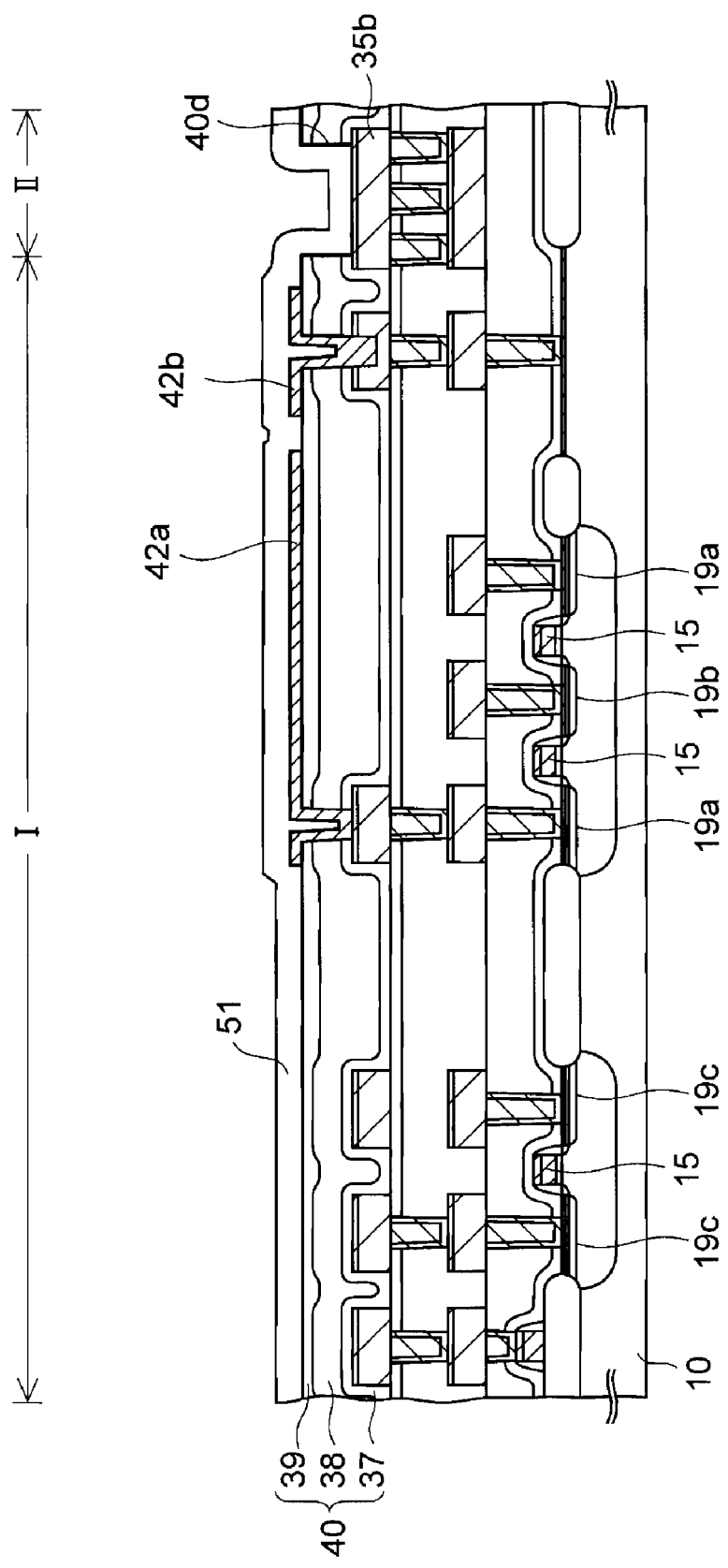
Figure 8B:
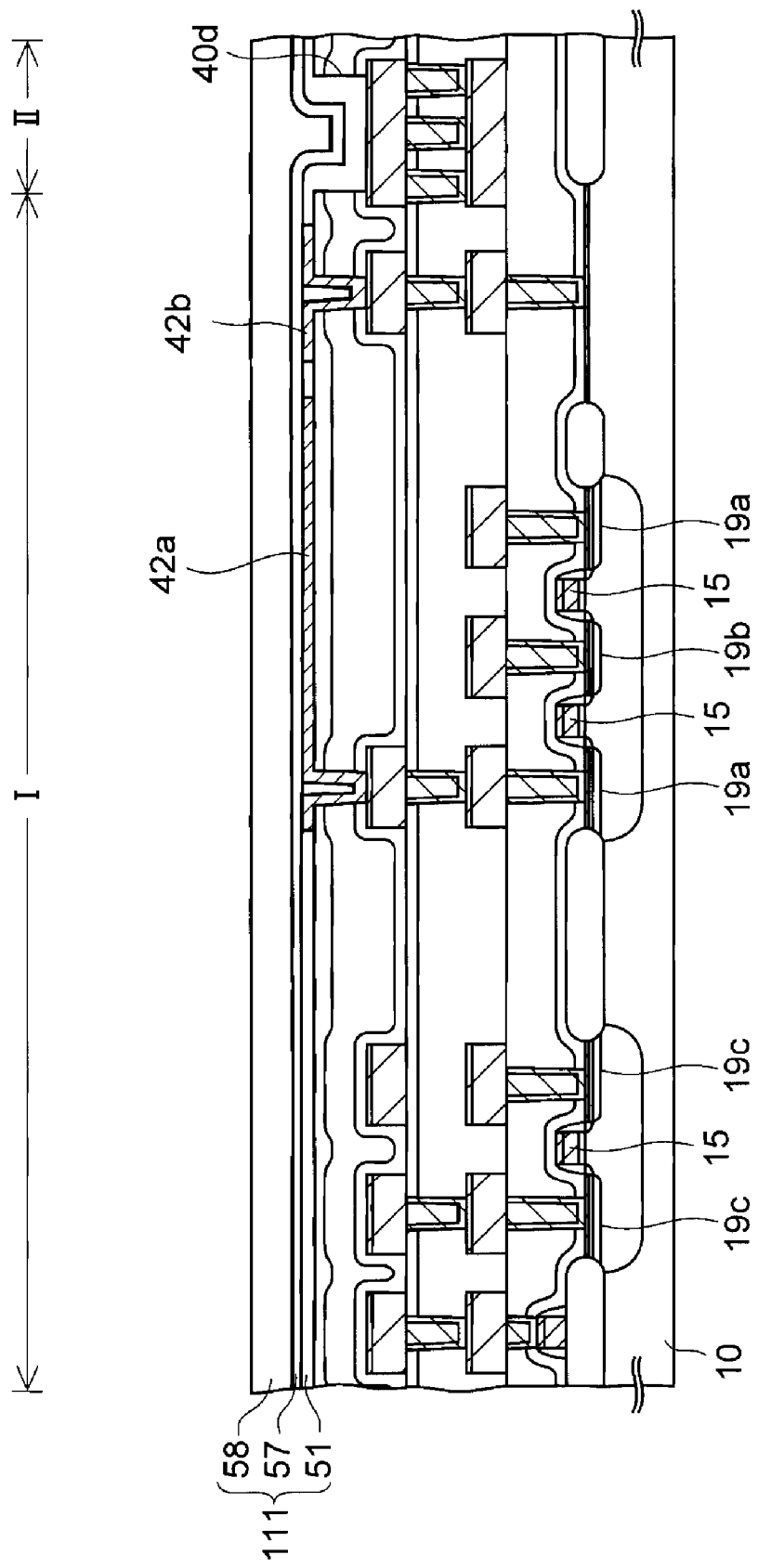
Figure 8C:
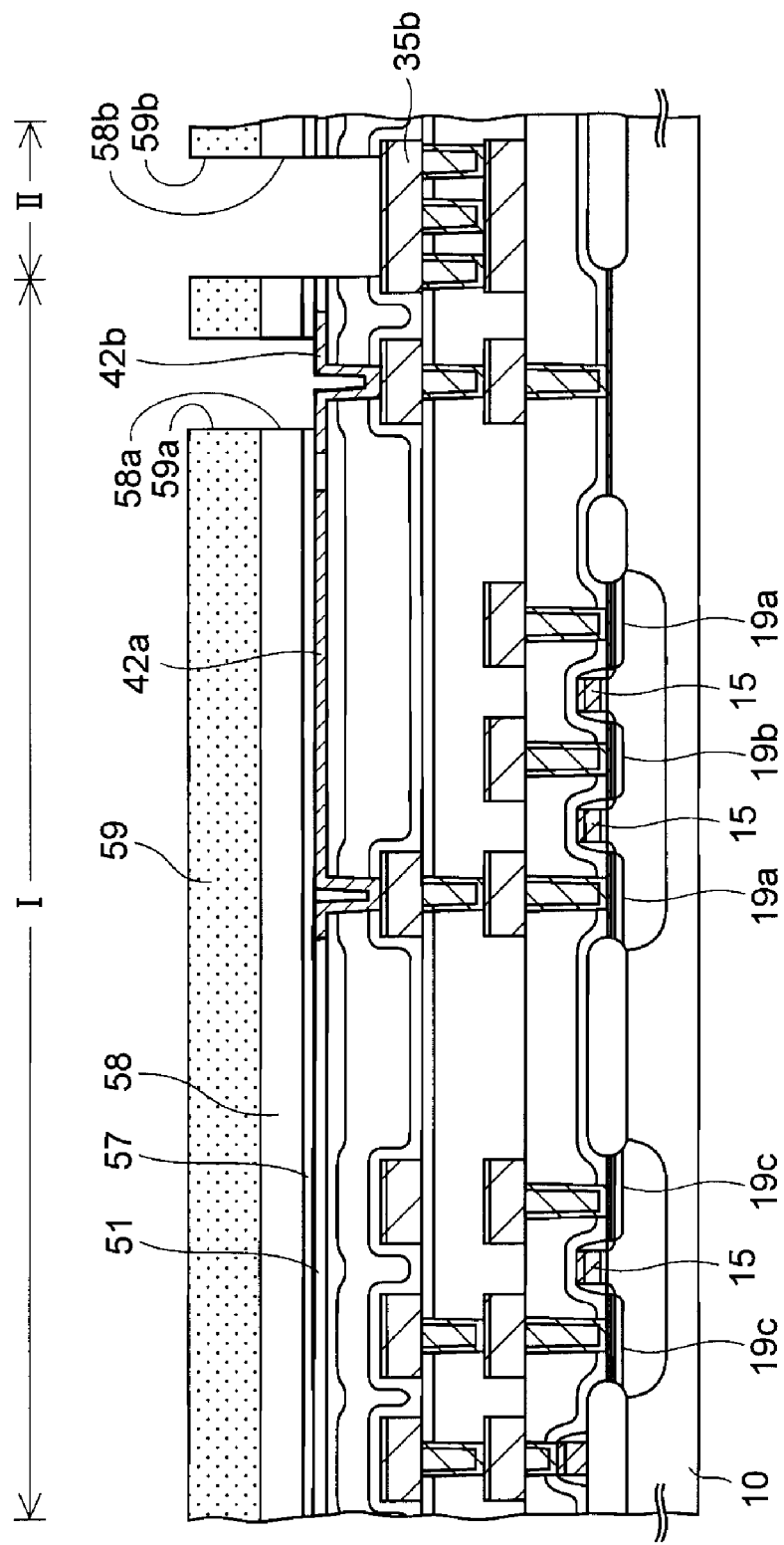
Figure 8D:
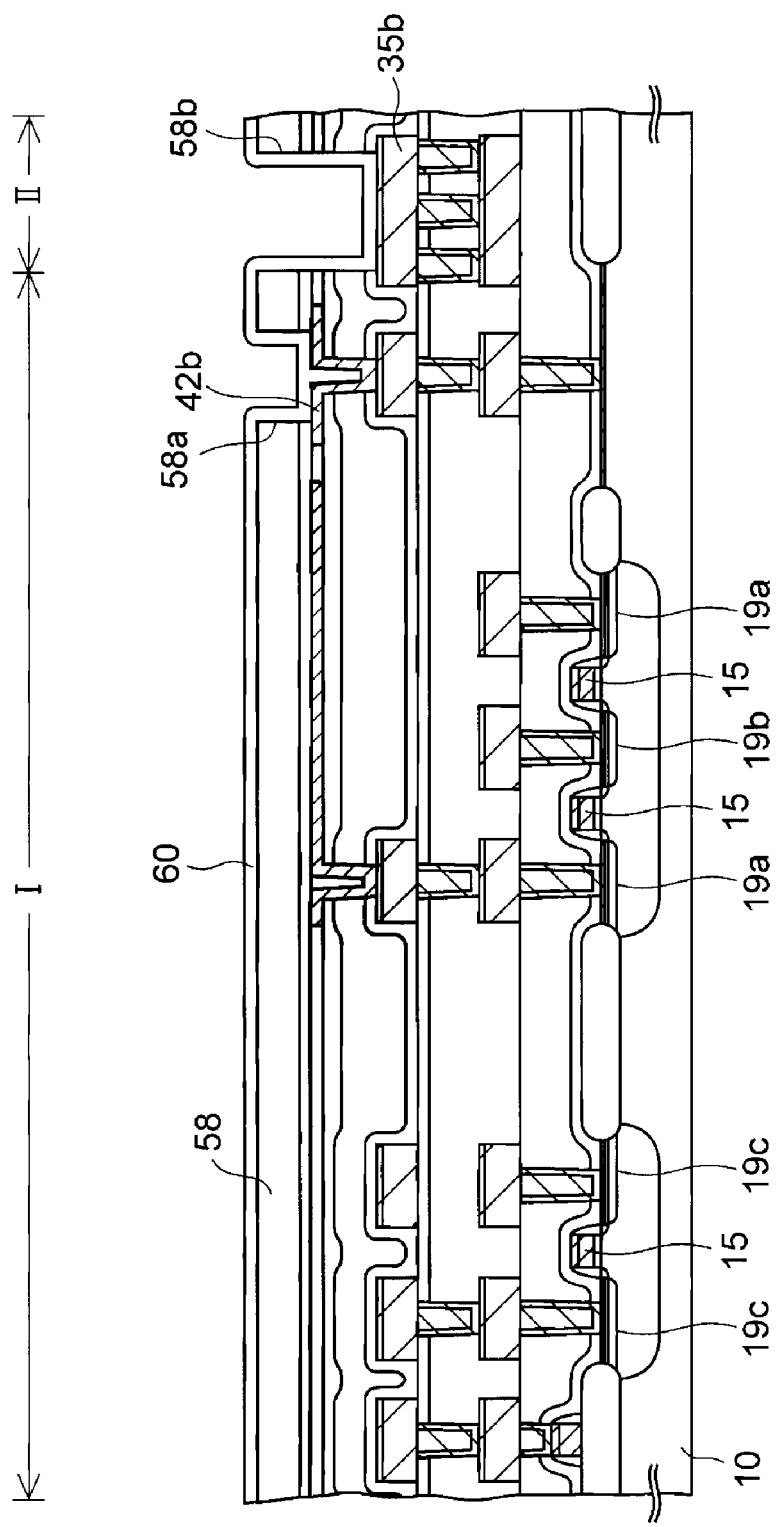
Figure 8E:
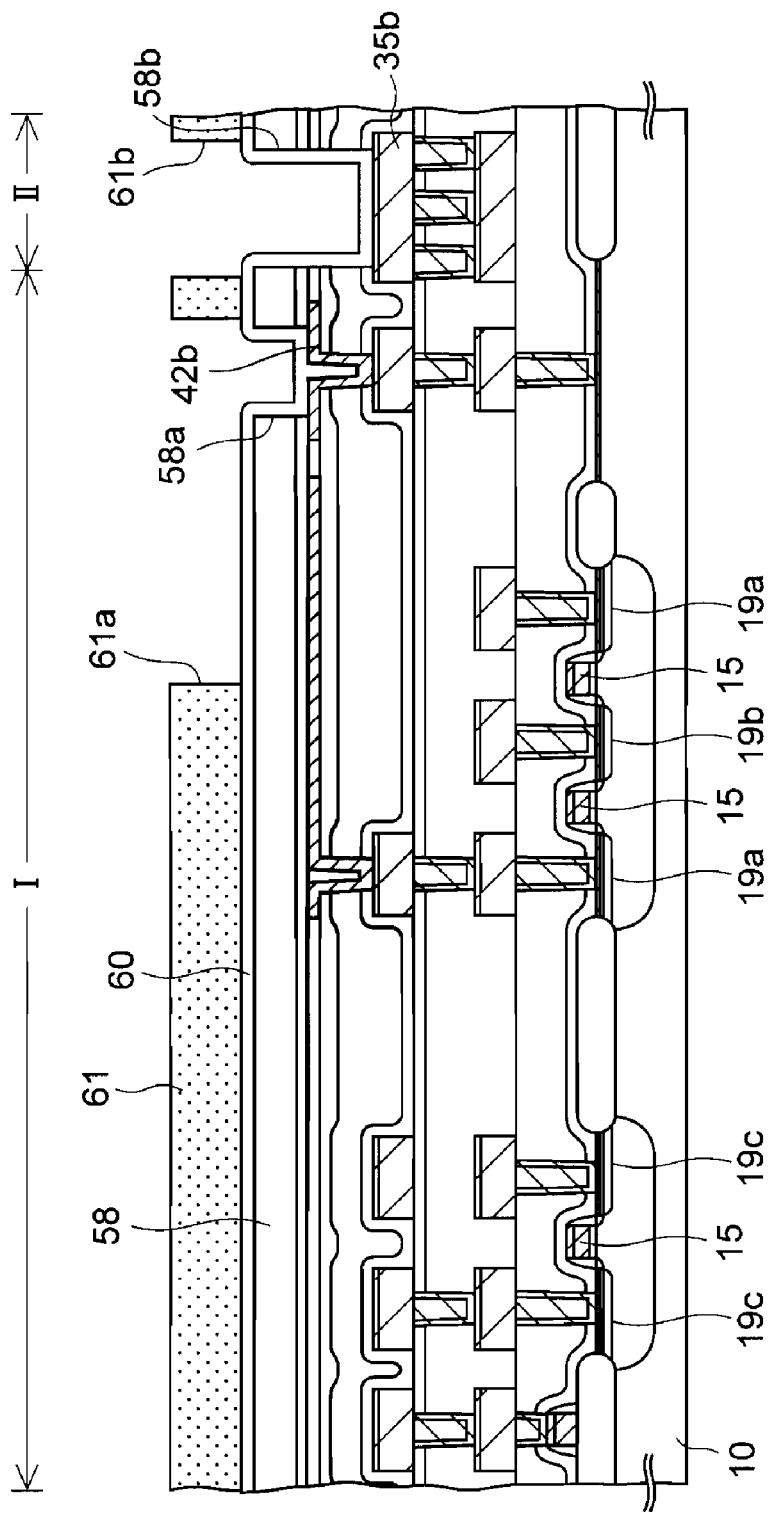
Figure 8F:
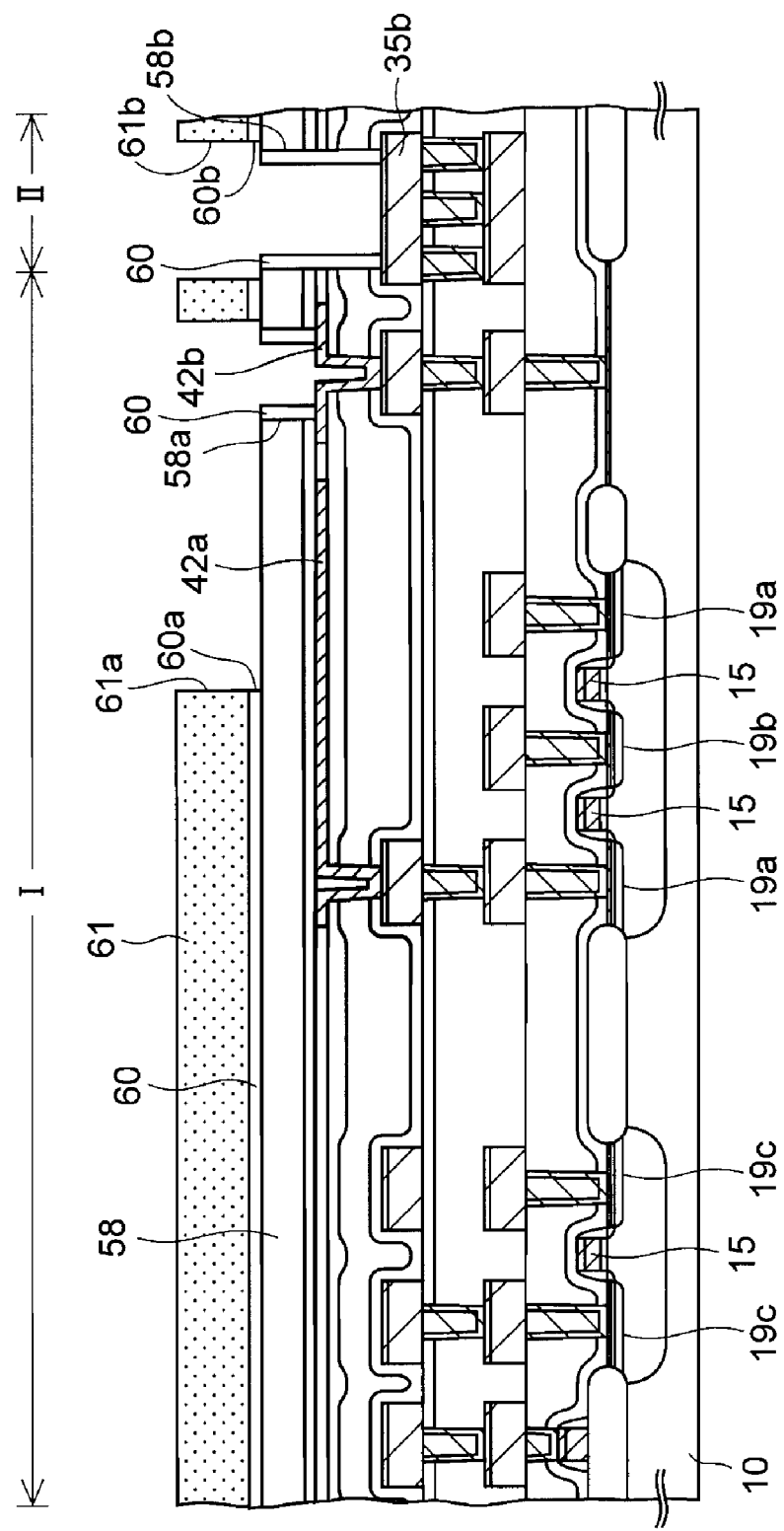
Figure 8H:
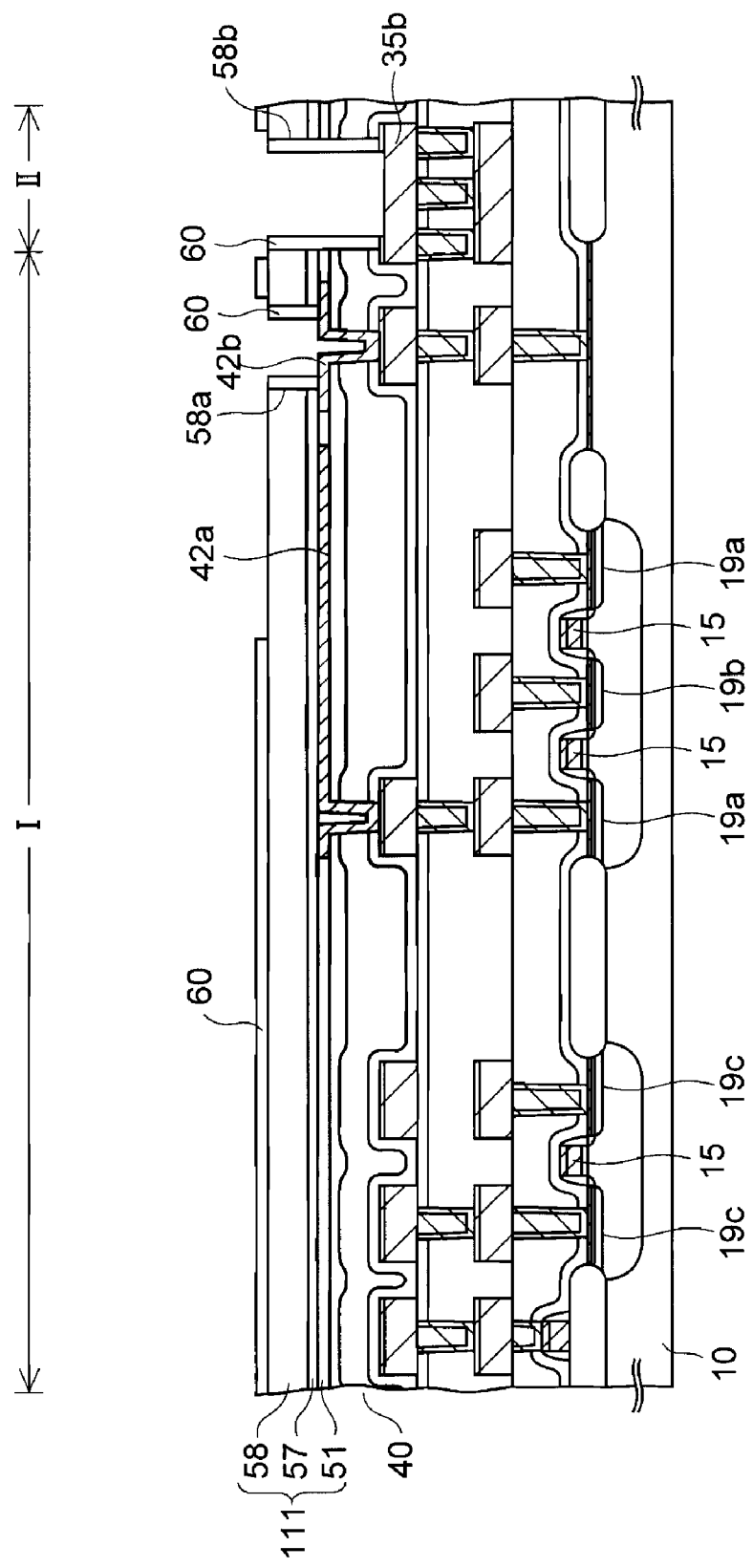

The surface profile sensor illustrated in FIG. 8H in accordance with this embodiment is different from the surface profile sensor in accordance with First embodiment in that a second cover insulating film 57 formed of a silicon oxide film is interposed between a moisture barrier insulating film 58 and a first cover insulating film 51, the detection electrode film 42a and the ground electrode film 42b. The first cover insulating film 51, the second cover insulating film 57 and the moisture barrier insulating film 58 form an upper insulating film 111.

Thereby, stress applied from the moisture barrier insulating film 58 to the detection electrode film 42a and the ground electrode film 42b can be relaxed and thus, reliability of the surface profile sensor can be improved.

Since the processes illustrated in FIG. 1A to FIG. 1T and the process illustrated in FIG. 5A are also performed in this manufacturing method, only the subsequent processes are described.

As illustrated in FIG. 5A, the hole 40d is formed in the third interlayer insulating film 40 by patterning through the window 50a of the resist pattern so that the titanium nitride film on the surface of the bonding pad 35b is exposed in the hole 40d. Thereafter, as illustrated in FIG. 8A, a silicon oxide film as the first cover insulating film 51 is formed at a thickness of about 600 nm on the third interlayer insulating film 40, the detection electrode film 42a and the ground electrode film 42b so that the first cover insulating film 51 covers the hole 40d. It is preferred that the thickness of the first cover insulating film 51 is 1.5 times or more the thickness of the detection electrode film 42a and the ground electrode film 42b. The first cover insulating film 51 is formed, for example, according to the plasma-enhanced CVD method using TEOS.

Next, a process until a cross-sectional structure illustrated in FIG. 8B is obtained is described.

First, the first cover insulating film 51 is polished according to the CMP method and the recessed portion between the detection electrode film 42a and the ground electrode film 42b is filled to planarize the surface so as not to generate a step on the surface on which the detection electrode film 42a and the ground electrode film 42b are formed.

Subsequently, a silicon oxide film as the second cover insulating film 57 is formed at a thickness of about 50 nm on the first cover insulating film 51, the detection electrode film 42a and the ground electrode film 42b so as to cover the hole 40d. The second cover insulating film 57 is formed, for example, according to the plasma-enhanced CVD method using TEOS.

Subsequently, a silicon nitride film as the moisture barrier insulating film 58 having a thickness of about 650 nm is formed on the second cover insulating film 57 so as to cover the hole 40d. The moisture barrier insulating film 58 is formed in a film-forming temperature of 400° C., for example, according to the plasma-enhanced CVD method using mixed gas of silane and ammonia as reactant gas. The first cover insulating film 51, the second cover insulating film 57 and the moisture barrier insulating film 58 constitute the upper insulating film 111.

Next, as illustrated in FIG. 8C, a thirteenth resist pattern 59 provided with windows 59a, 59b above the ground electrode film 42b and the bonding pad 35b, respectively, is formed on the moisture barrier insulating film 58.

Next, an ESD hole (first hole) 58a through which the ground electrode film 42b is exposed is formed by etching the moisture barrier insulating film 58 and the second cover insulating film 57 through the window 59a of the thirteenth resist pattern 59. In addition, an electrode drawing window (second hole) 58b is formed above the bonding pad 35b by etching the moisture barrier insulating film 58, the second cover insulating film 57 and the first cover insulating film 51 through the window 59b. The titanium nitride film on the surface of the bonding pad 35b is exposed through the electrode drawing window 58.

Afterward, the thirteenth resist pattern 59 is removed, and then dehydration treatment is performed in an N₂ atmosphere in a substrate temperature of 430° C. for 30 minutes.

Next, as illustrated in FIG. 8D, according to the PVD method, the CVD method or the FCVA method, a tetrahedral amorphous carbon film, which is to be a protection insulating film 60, is formed at a thickness of about 100 nm on the moisture barrier insulating film 58 so as to cover the ESD hole 58a and the electrode drawing window 58b. Film-forming conditions of the tetrahedral amorphous carbon film are the same as the film-forming conditions described in the section (Course leading to the embodiments).

Subsequently, as illustrated in FIG. 8E, a fourteenth resist pattern 61 is formed at a thickness of about 10 μm on the tetrahedral amorphous carbon film. The fourteenth resist pattern has a window 61a in which the sensor portion and the ESD portion are included and a window 61b in which the pad portion is included.

Next, as illustrated in FIG. 8F, the protection insulating film 60 is anisotropicaly etched and removed through the window 61a of the fourteenth resist pattern 61 to form a first window (sensor window) 60a and to leave the protection insulating film 60 in the protection portion. At the same time, the protection insulating film 60 in the pad portion is etched and removed through the window 61b to form a second window 60b. Etching conditions of the tetrahedral amorphous carbon film as the protection insulating film 60 are the same as those in the first embodiment.

In this case, the titanium nitride films on the surfaces of the ground electrode film 42b and the bonding pad 35b are exposed on the bottoms of the ESD hole 58a and the electrode drawing window 58b, respectively, but the tetrahedral amorphous carbon film which is a material of the protection insulating film 60 remains on the side walls of the inner surfaces of the ESD hole 58a and the electrode drawing window 58b.

Afterward, the fourteenth resist pattern 61 is removed.

Subsequently, as illustrated in FIG. 8G, a fifteenth resist pattern 62 which covers the sensor portion, the ESD portion and the protection portion and which is provided with a window 62a in the pad portion is formed.

Next, the titanium nitride film on the surface of the bonding pad 35b is removed by etching through the window 62a of the fifteenth resist pattern 62. Thereby, the copper-containing aluminum film of the bonding pad 35b appears in the electrode drawing window 58b. Etching conditions of the titanium nitride film are the same as those in the first embodiment.

Afterward, when the fifteenth resist pattern 62 is removed, as illustrated in FIG. 8H, the surface profile sensor is completed.

As described above, according to the method for manufacturing the surface profile sensor in accordance with this embodiment, the titanium nitride film on the surface of the bonding pad 35b is left until the protection insulating film 60 covering the hole 40d is formed (FIG. 8D) after the hole 40d is formed on the bonding pad 35b (FIG. 5A). Then, after patterning the protection insulating film 60 (FIG. 8E to FIG. 8F), the titanium nitride film on the surface of the bonding pad 35b is etched and removed (FIG. 8G).

Therefore, since the surface of the bonding pad 35b is covered with the titanium compound film when patterning the protection insulating film 60, the aluminum film or the compound film mainly containing aluminum under the titanium compound film can be prevented from being oxidized by the etching gas (oxygen-containing gas) for the protection insulating film 60. Thereby, the wire can be easily bonded to the surface of the bonding pad 35b, on which the unoxidized aluminum film or compound film mainly containing aluminum is exposed.

Figure 9:
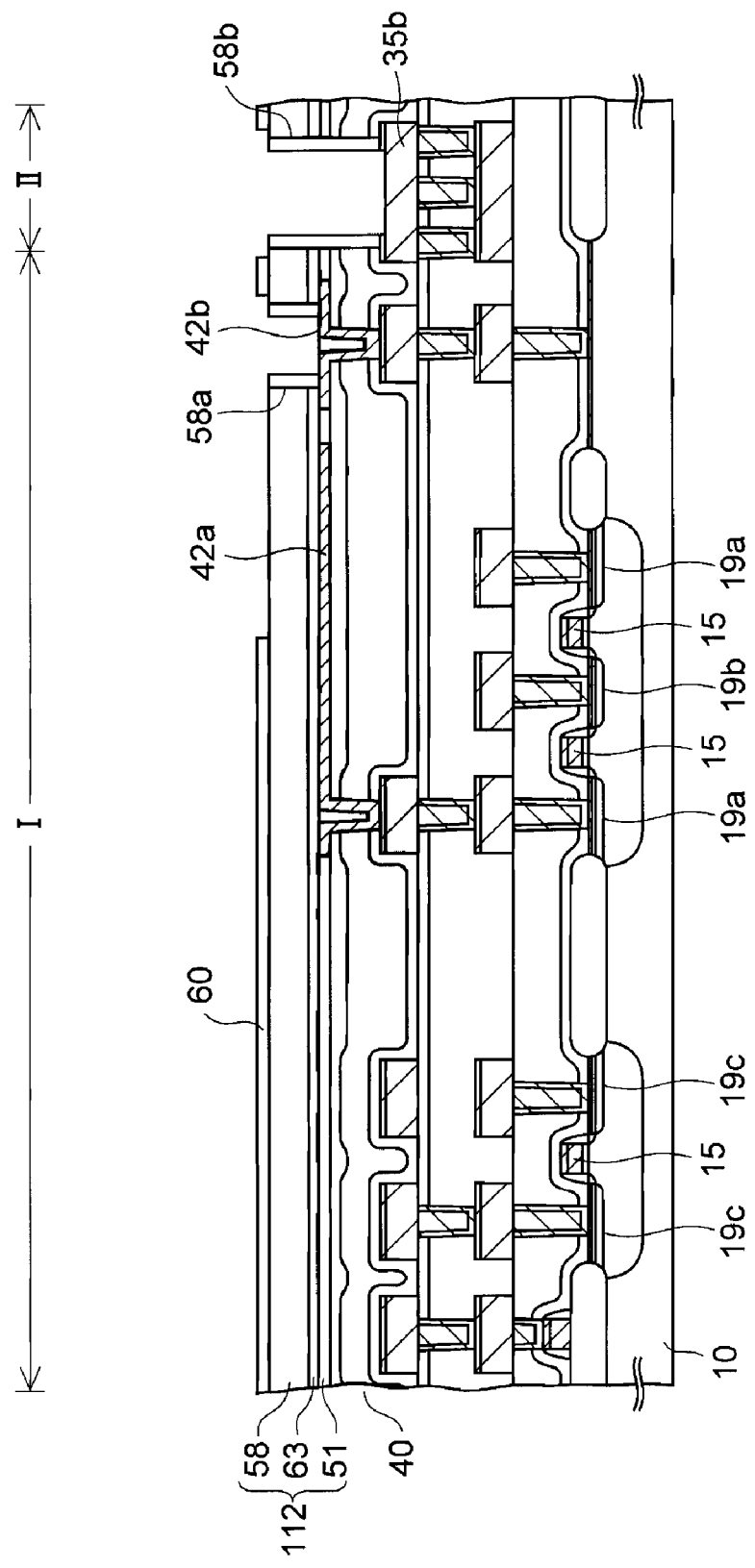
FIG. 9 is a sectional view illustrating another configuration of the surface profile sensor according to the second embodiment.

In the above-mentioned embodiment, although the silicon oxide film is used as the second cover insulating film 57, modification as illustrated in FIG. 9 may be made. Specifically, a silicon oxy-nitride film (SiON film) may be used as a second cover insulating film 63. The first cover insulating film 51, the second cover insulating film 63 and the moisture barrier insulating film 58 form an upper insulating film 112.

In this case, since the silicon oxy-nitride film has a higher moisture blocking capability than the silicon oxide film, the film thickness of a silicon nitride film formed on the silicon oxy-nitride film as the moisture barrier insulating film 58 can be further reduced, thereby improving the sensitivity of the sensor and improving the detection rate of the fingerprint.

Third Embodiment

With reference to FIG. 10A to FIG. 10H, a C-MOS type surface profile sensor on an electrostatic capacitance method in accordance with a third embodiment and a manufacturing method thereof are described.

Figure 10A:
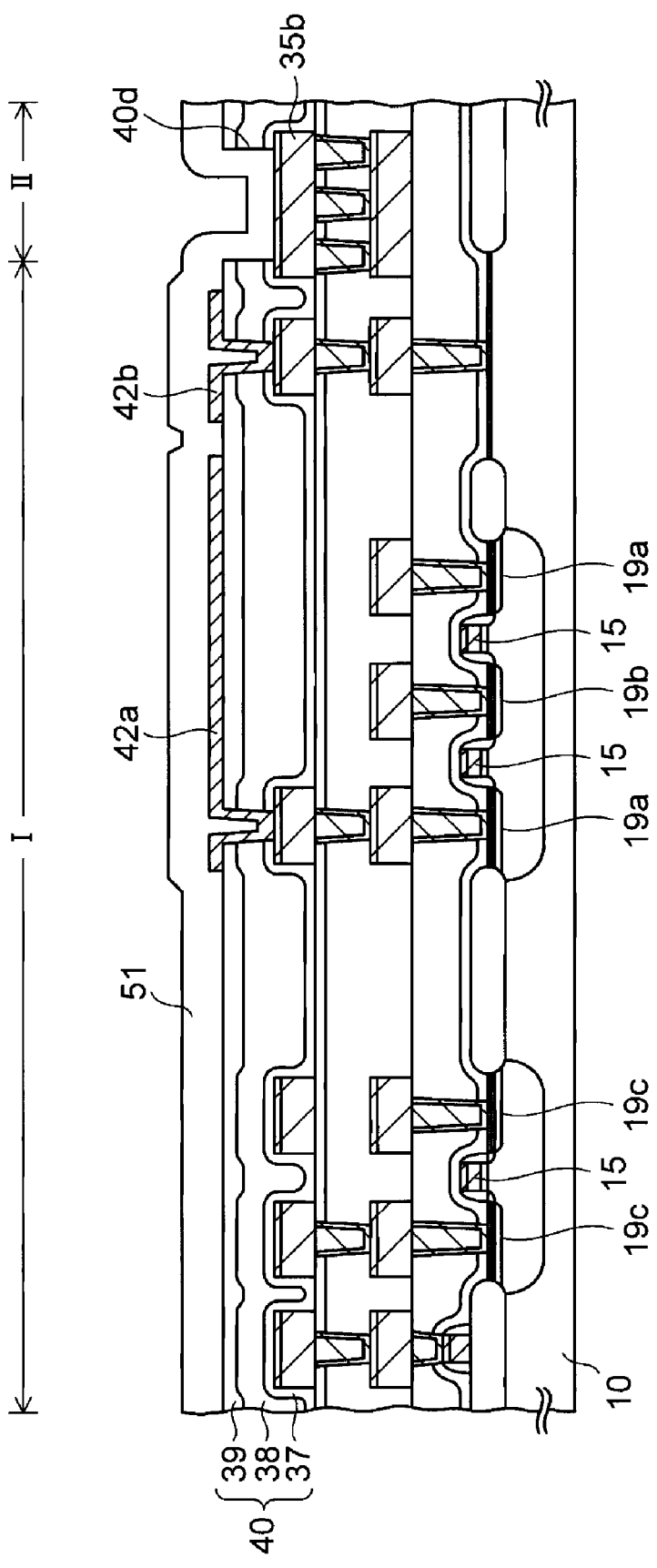
Figure 10B:
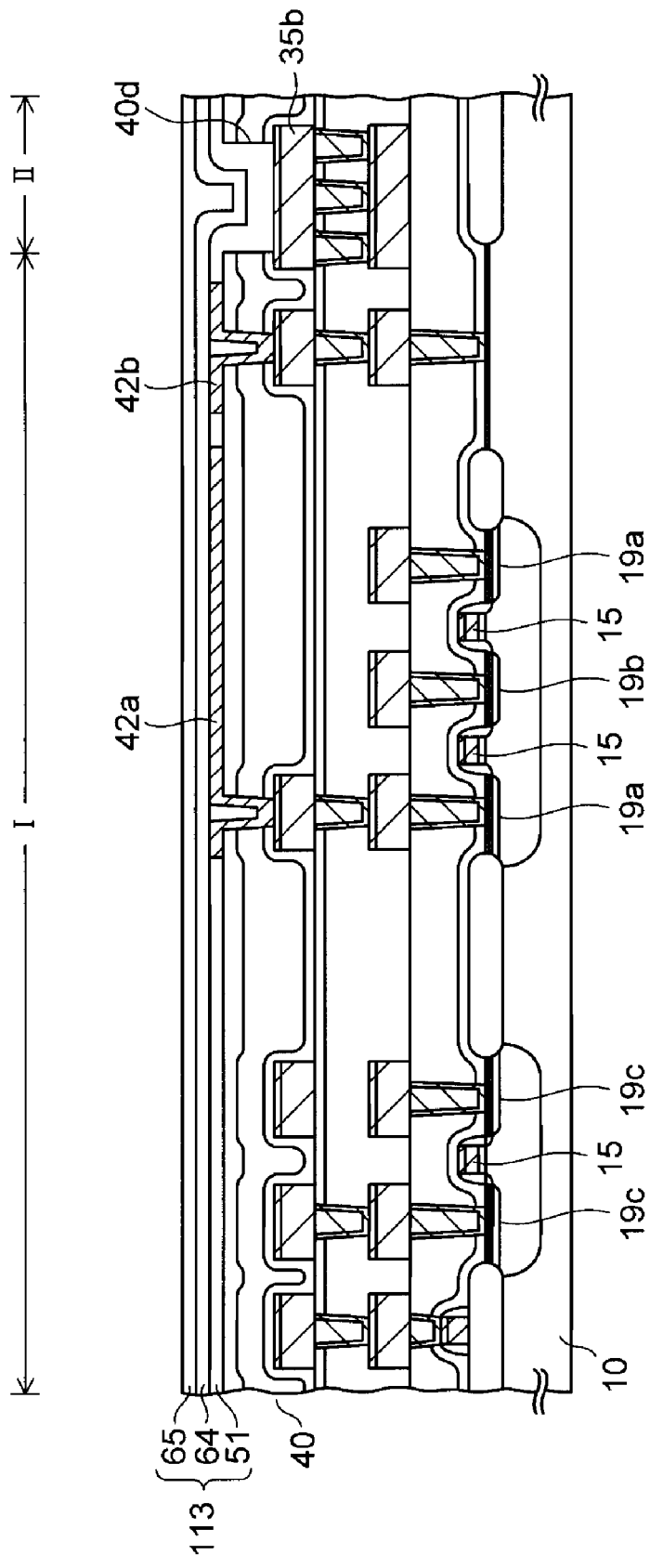
Figure 10C:
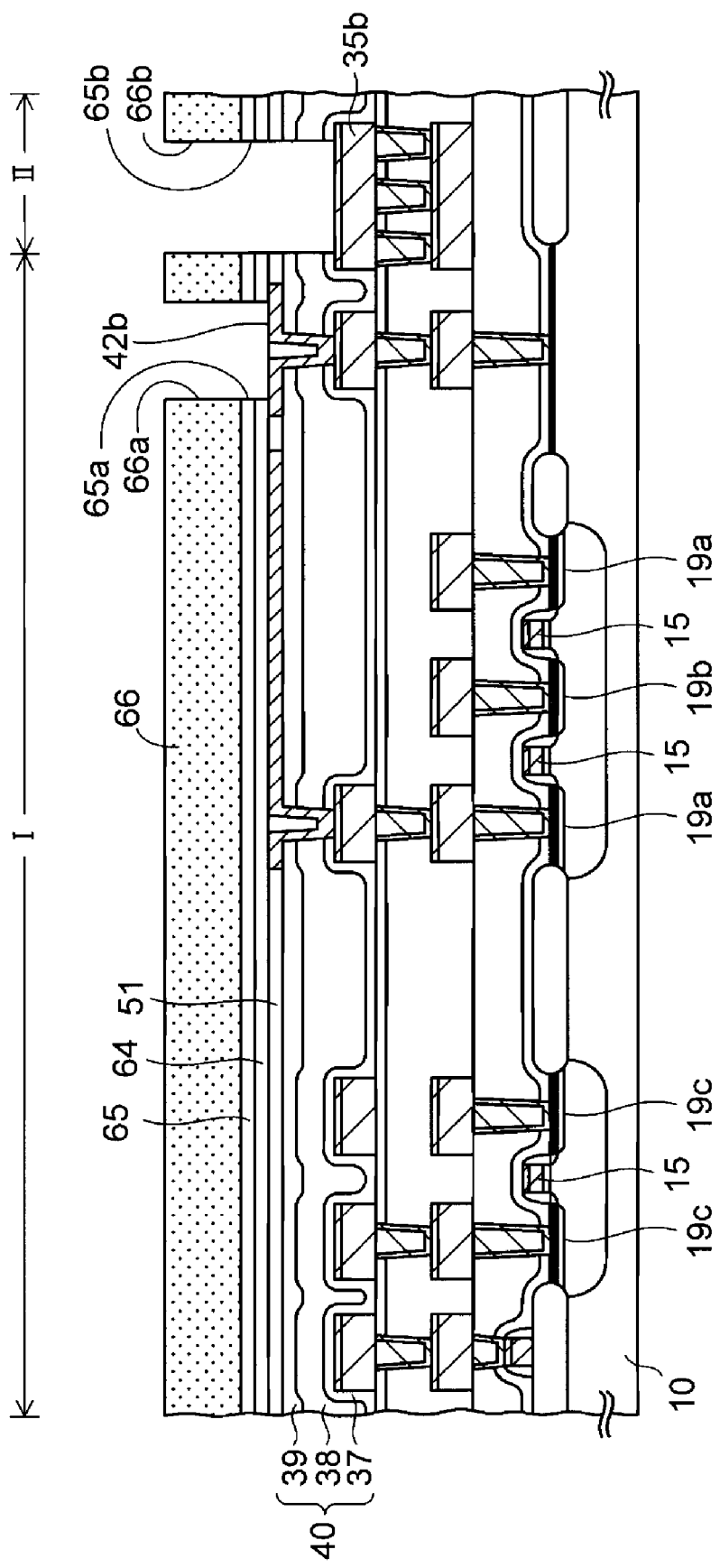
Figure 10D:
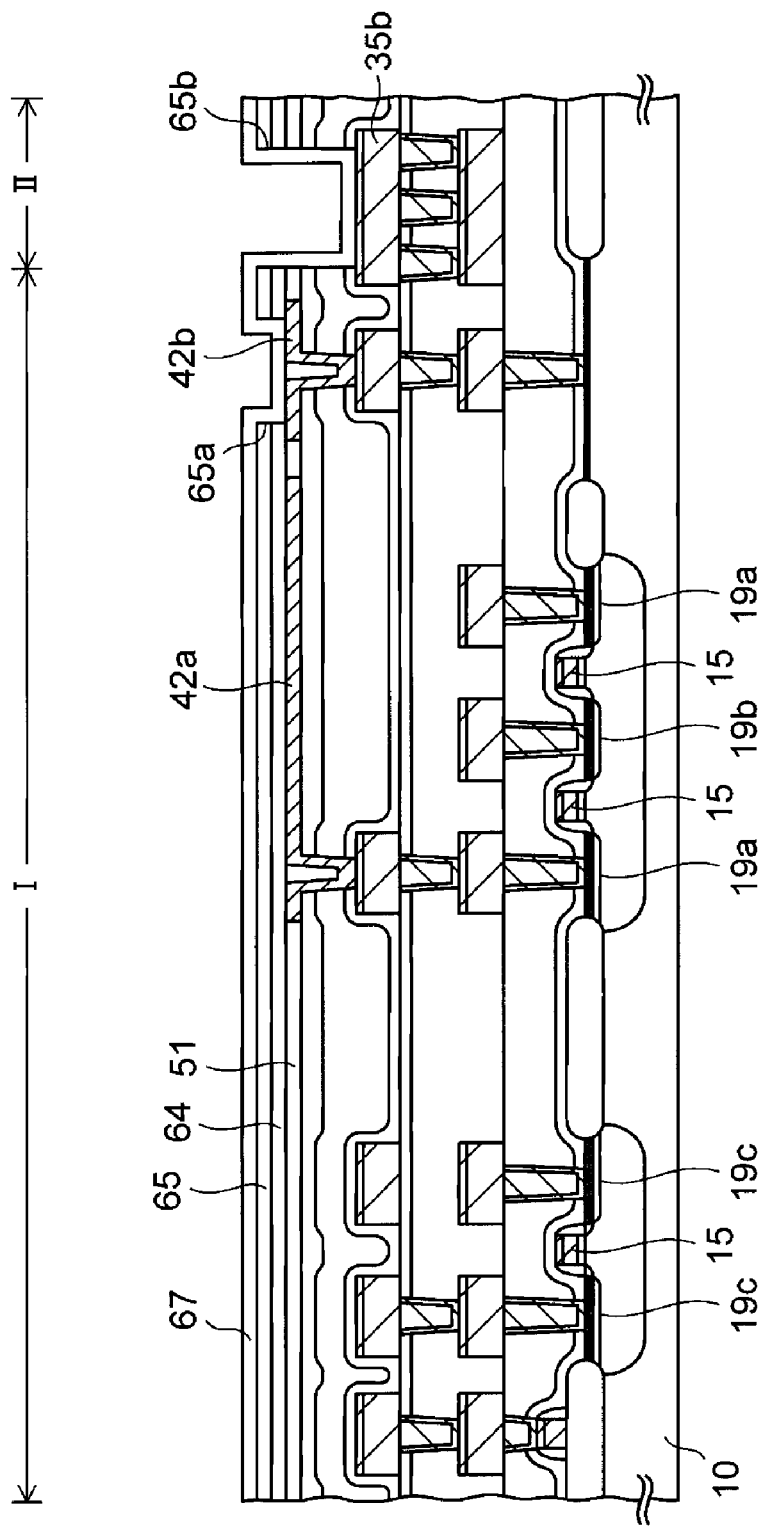
Figure 10E:
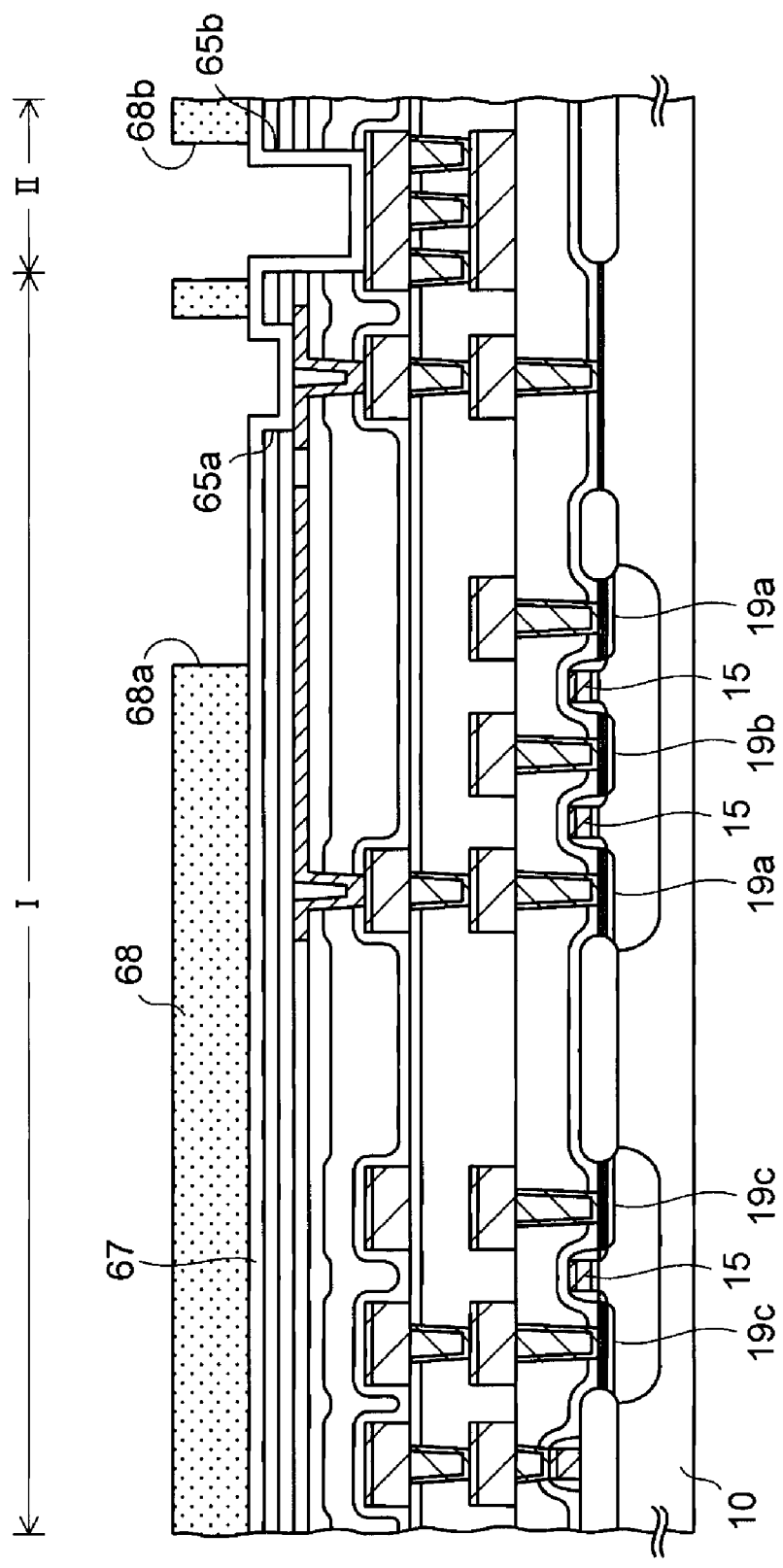
Figure 10F:
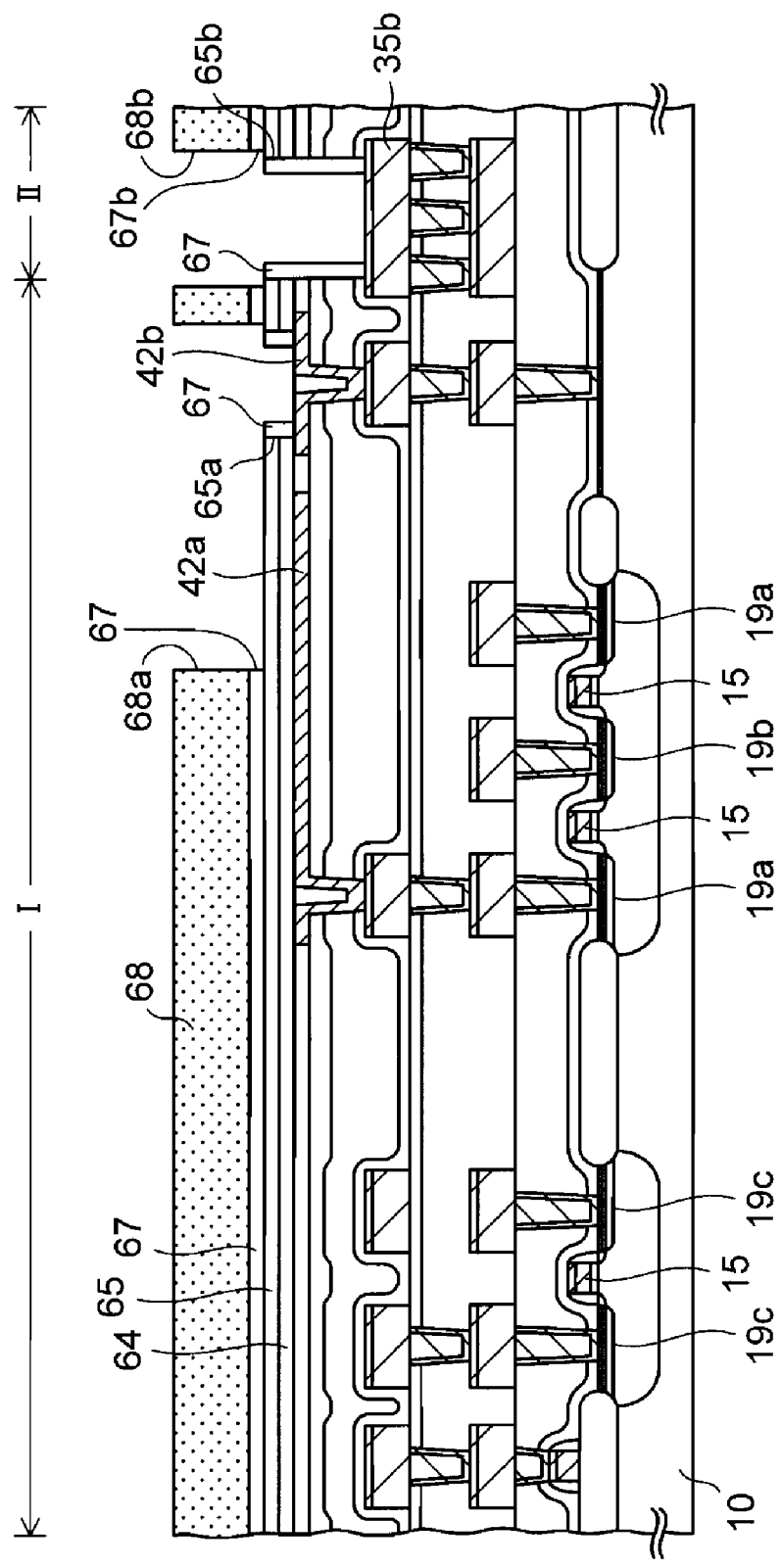
Figure 10G:
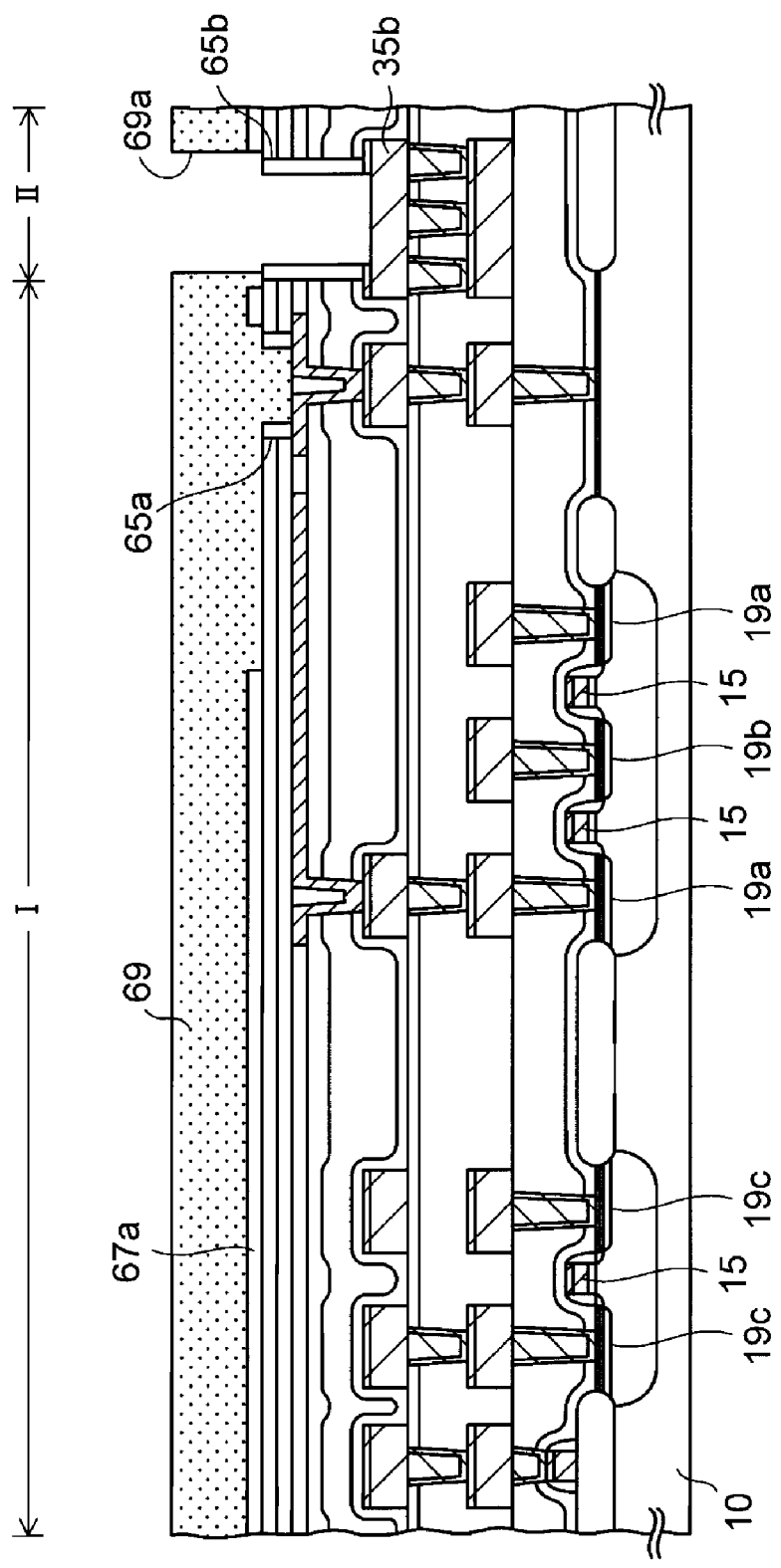
Figure 10H:
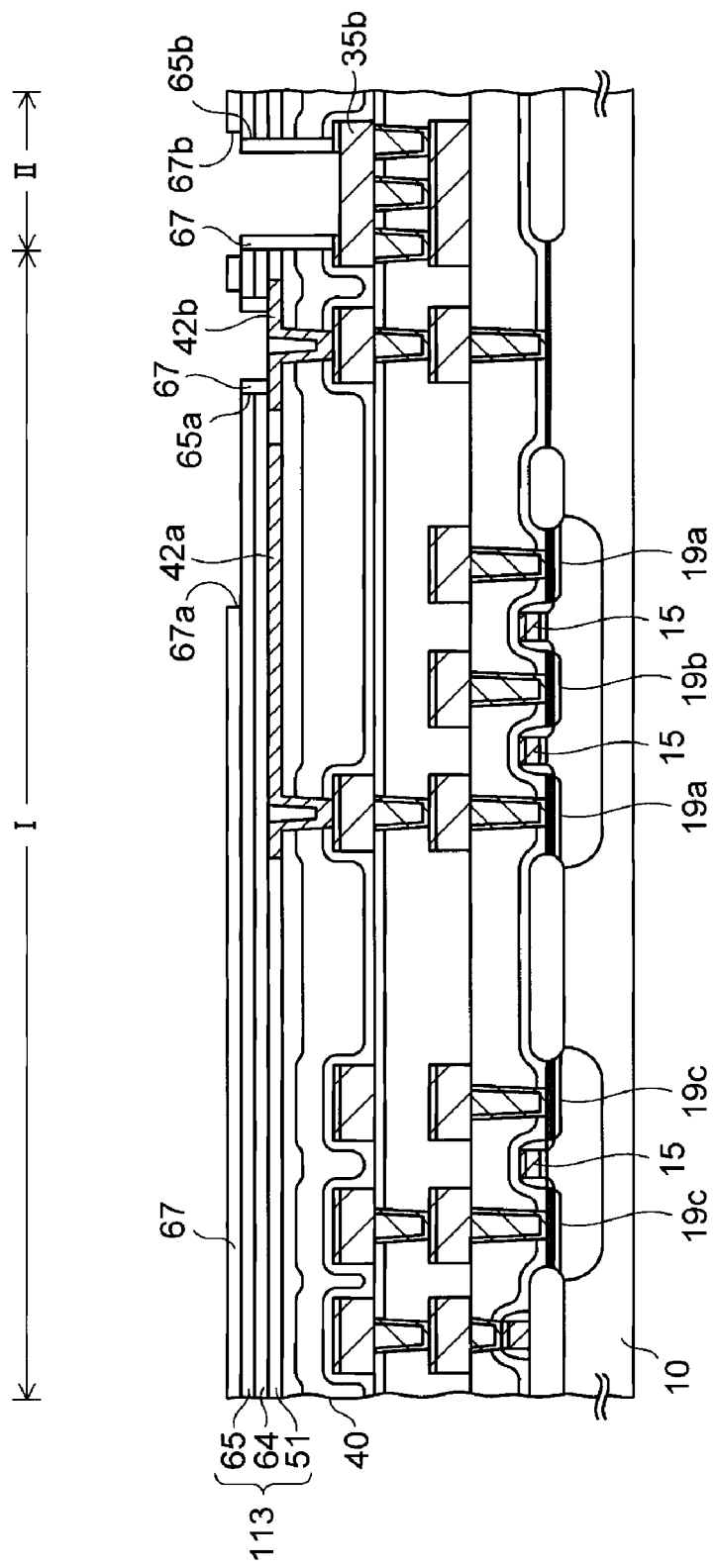

The surface profile sensor illustrated in FIG. 10H in accordance with this embodiment is the same as the surface profile sensors in accordance with the second embodiment in that a second cover insulating film 64 is interposed between a moisture barrier insulating film 65 and the first cover insulating film 51, the detection electrode film 42a and the ground electrode film 42b. However, the surface profile sensor in this embodiment is different from the surface profile sensors in the second embodiment in that an insulating metal oxide film is used as the second cover insulating film 64 and the thickness of the moisture barrier insulating film 65 is reduced by using the insulating metal oxide film. The first cover insulating film 51, the second cover insulating film 64 and the moisture barrier insulating film 65 constitute an upper insulating film 113.

In this case, as the insulating metal oxide film, an aluminum oxide ($Al_2O_3$) film, a titanium oxide ($TiO_x$) film, a zirconium oxide ($ZrO_x$) film, a magnesium oxide ($MgO_x$) film, a magnesium titanium oxide ($MgTiO_x$) film or the like may be used. The thickness of the insulating metal oxide film may be selected within the range of 20 to 100 nm, more preferably, the range of 50 to 70 nm. The reason why the lower limit of the film thickness is 20 nm is that when the film thickness is less than 20 nm, the moisture blocking capability greatly deteriorates. The reason why the upper limit is 100 nm is that when the film thickness is more than 100 nm, etching becomes difficult.

The water-resisting property of the insulating metal oxide film is much higher than that of the silicon oxide film, the silicon oxy-nitride film and the silicon nitride film. For example, the moisture blocking capability of the insulating metal oxide film having a thickness of 50 nm is equal to that of the silicon nitride film having a thickness of 1000 nm. For this reason, the film thickness of the moisture barrier insulating film 65 can be greatly reduced. In this embodiment, the thickness of the insulating metal oxide film is about 50 nm and the thickness of the moisture barrier insulating film 65 is about 150 nm.

As described above, in this embodiment, the insulating metal oxide film is used as the second cover insulating film 64 and the thickness of the moisture barrier insulating film 65 can be greatly reduced. Accordingly, detection sensitivity of the sensor can be further improved.

Since the processes illustrated in FIG. 1A to FIG. 1T and the process illustrated in FIG. 5A are also performed in this manufacturing method, description is performed from the subsequent process.

As illustrated in FIG. 5A, the hole 40d is formed in the third interlayer insulating film 40 by patterning through the window 50a of the resist pattern 50. The titanium nitride film on the surface of the bonding pad 35b is exposed in the hole 40d. Thereafter, as illustrated in FIG. 10A, a silicon oxide film as the first cover insulating film 51 is formed at a thickness of about 600 nm on the detection electrode film 42a, the ground electrode film 42b and the third interlayer insulating film 40 so as to cover the hole 40d. For example, the first cover insulating film 51 is formed according to the plasma-enhanced CVD method using TEOS. In this case, it is preferred that the thickness of the first cover insulating film 51 is 1.5 times or more the thickness of the detection electrode film 42a and the ground electrode film 42b.

Next, a process until a cross-sectional structure illustrated in FIG. 10B is obtained is described.

First, the first cover insulating film 51 is polished according to the CMP method and the recessed portion between the detection electrode film 42a and the ground electrode film 42b is filled to planarize the surface so as not to generate a step on the surface on which the detection electrode film 42a and the ground electrode film 42b are formed.

Subsequently, an aluminum oxide film (insulating metal oxide film) as the second cover insulating film 64 is formed at a thickness of about 50 nm on the first cover insulating film 51, the detection electrode film 42a and the ground electrode film 42b so as to cover the hole 40d. The second cover insulating film 64 is formed, for example, according to the PVD method such as the sputtering method.

Subsequently, a silicon nitride film as the moisture barrier insulating film 65 is formed at a thickness of about 150 nm on the second cover insulating film 64 so as to cover the hole 40d. The moisture barrier insulating film 65 is formed in a film-forming temperature of 400° C., for example, according to the plasma-enhanced CVD method using mixed gas of silane and ammonia as reactant gas. The first cover insulating film 51, the second cover insulating film 64 and the moisture barrier insulating film 65 constitute the upper insulating film 113.

Next, as illustrated in FIG. 10C, a sixteenth resist pattern 66 provided with windows 66a, 66b in the ESD portion and the pad portion, respectively, is formed on the moisture barrier insulating film 65. Subsequently, an ESD hole (first hole) 65a is formed by etching and removing the moisture barrier insulating film 65 and the second cover insulating film 64 through the window 66a. The ground electrode film 42b is exposed in the ESD hole 65a. At the same time, an electrode drawing window (second hole) 65b is formed by etching and removing the moisture barrier insulating film 65, the second cover insulating film 64 and the first cover insulating film 51 through the window 66b. The titanium nitride film on the bonding pad 35d is exposed through the electrode drawing window 65b.

Afterward, the sixteenth resist pattern 66 is removed, and then dehydration treatment is performed in an $N_2$ atmosphere in a substrate temperature of 430° C. for 30 minutes.

Next, as illustrated in FIG. 10D, a tetrahedral amorphous carbon film to be a protection insulating film 67 is formed at a thickness of about 100 nm on the moisture barrier insulating film 65 so as to cover the ESD hole 65a and the electrode drawing window 65b. The tetrahedral amorphous carbon film is formed according to the PVD method, the CVD method or the FCVA method. Film-forming conditions of the tetrahedral amorphous carbon film are the same as the film-forming conditions described in the section (Course leading to the embodiments).

Subsequently, as illustrated in FIG. 10E, a seventeenth resist pattern 68 is formed on the protection insulating film 67. The seventeenth resist pattern 68 has a window 68a in which the sensor portion and the ESD portion are included and a window 68b in which the pad portion is included.

Next, as illustrated in FIG. 10F, first window (sensor window) 67a is formed by etching and removing the protection insulating film 67 through the window 68a of the seventeenth resist pattern 68 to allow the ground electrode film 42b to be exposed through the ESD hole 65a and leave the protection insulating film 67 in the protection portion. At the same time, a second window 67b is formed by etching and removing the protection insulating film 67 in the pad portion through the window 68b to allow the titanium nitride film on the surface of the bonding pad 35b to be exposed through the electrode drawing window 65b.

Etching of the tetrahedral amorphous carbon film as the protection insulating film 67 is performed by use of a parallel-plate type plasma etching apparatus in the following four stages. Etching conditions are different from those in the first embodiment and are as follows. In the first stage, the semiconductor substrate 10 is set at a lower electrode of opposing electrodes provided in a chamber and is cooled. In this state, $CF_4$ gas (909 sccm) and $O_2$ gas (102 sccm) are introduced into the chamber as etching gas, the pressure is set to 10000 mTorr and treatment is performed for 15 seconds. Subsequently, in the second stage, under the same etching gas condition, the pressure is set to 1000 mTorr and treatment is performed for 5 seconds. In the third stage, under the same etching gas condition, the pressure is set to 1000 mTorr, treatment power (RF power) is set to 1 kW and treatment is performed for 5 seconds. In the fourth stage, feeding of the film-forming gas is stopped and exhaustion is performed for 5 seconds.

Afterward, the seventeenth resist pattern 68 is removed.

Subsequently, as illustrated in FIG. 10G, an eighteenth resist pattern 69 including a window 69a in the pad portion is formed. Subsequently, the titanium nitride film on the surface of the bonding pad 35b is removed by etching through the window 69a of the eighteenth resist pattern 69 to allow the copper-containing aluminum of the bonding pad 35b to be exposed. Etching conditions of the titanium nitride film are the same as the etching conditions in the first embodiment.

Afterward, when the eighteenth resist pattern 69 is removed, as illustrated in FIG. 10H, the surface profile sensor is completed.

As described above, according to the method for manufacturing the surface profile sensor in accordance with this embodiment, the titanium nitride film on the surface of the bonding pad 35b is left until, after the hole 40d is formed on the bonding pad 35b (FIG. 5A), the protection insulating film 67 covering the hole 40d is formed (FIG. 10D) and then the patterning thereof is finished (FIG. 10F). Afterward, the titanium nitride film on the surface of the bonding pad 35b is removed (FIG. 10G).

Therefore, since the surface of the bonding pad 35b is covered with the titanium compound film when patterning the protection insulating film 67, the aluminum film or the compound film mainly containing aluminum under the titanium compound film can be prevented from being oxidized by the etching gas (oxygen-containing gas) for the protection insulating film 67. Thereby, a wire can be easily bonded to the surface of the bonding pad 35b on which the unoxidized aluminum film or compound film mainly containing aluminum is exposed.

Fourth Embodiment

With referent to FIG. 11A to FIG. 11F, a C-MOS type surface profile sensor on an electrostatic capacitance method in accordance with a fourth embodiment and a manufacturing method thereof are described.

Figure 11A:
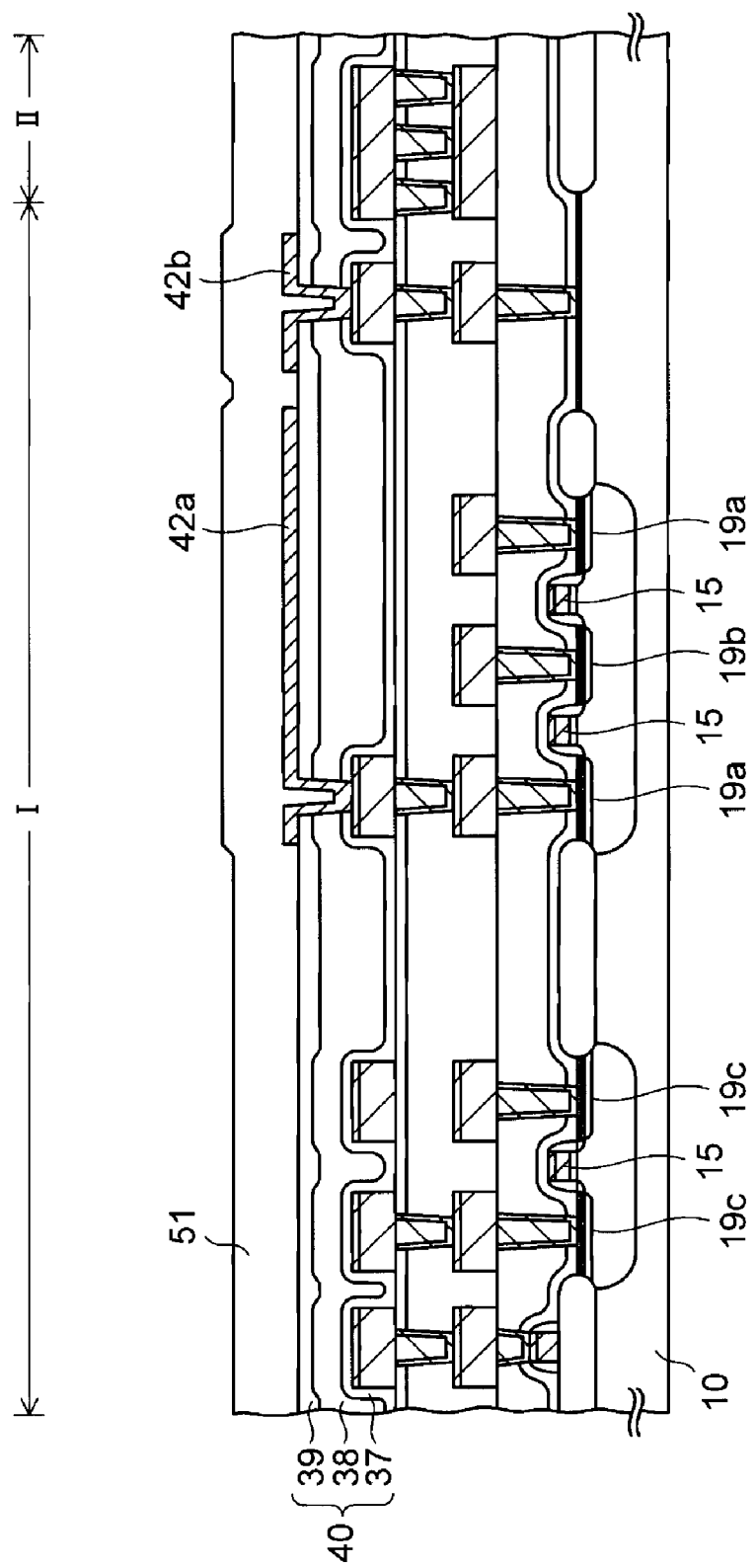
FIGS. 11A to 11F are sectional views illustrating a manufacturing process of a surface profile sensor according to the fourth embodiment.
Figure 11B:
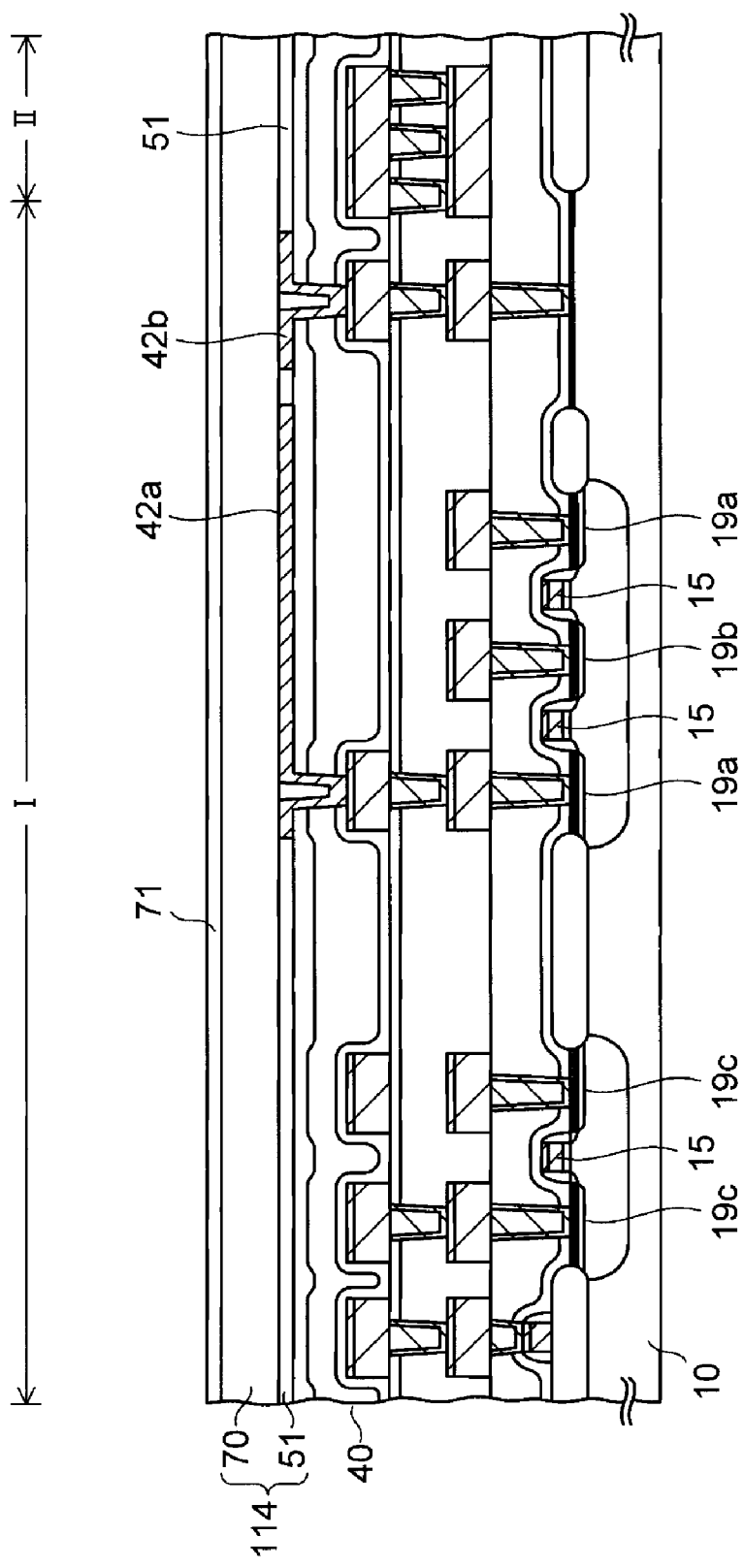
Figure 11C:
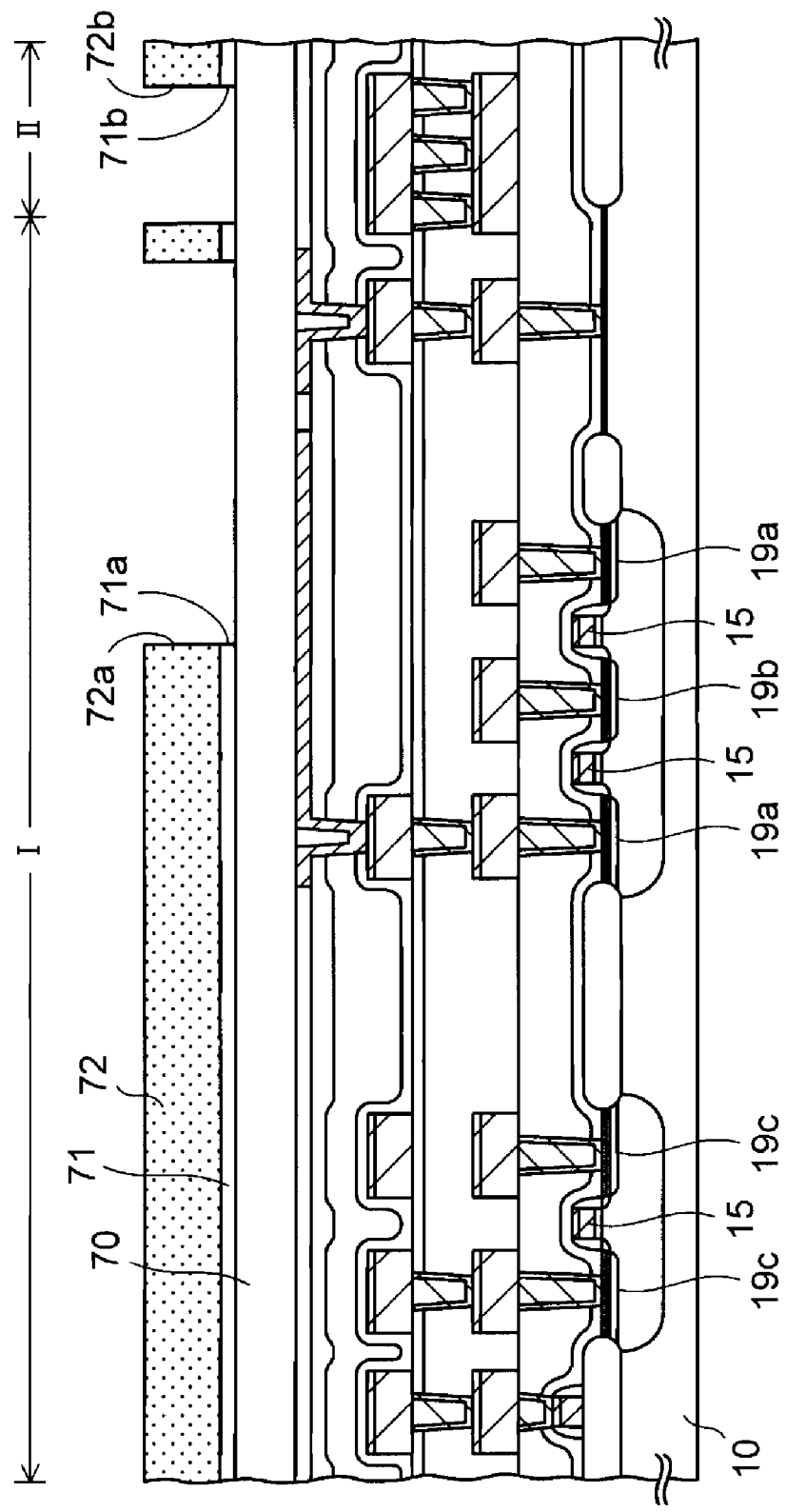
Figure 11D:
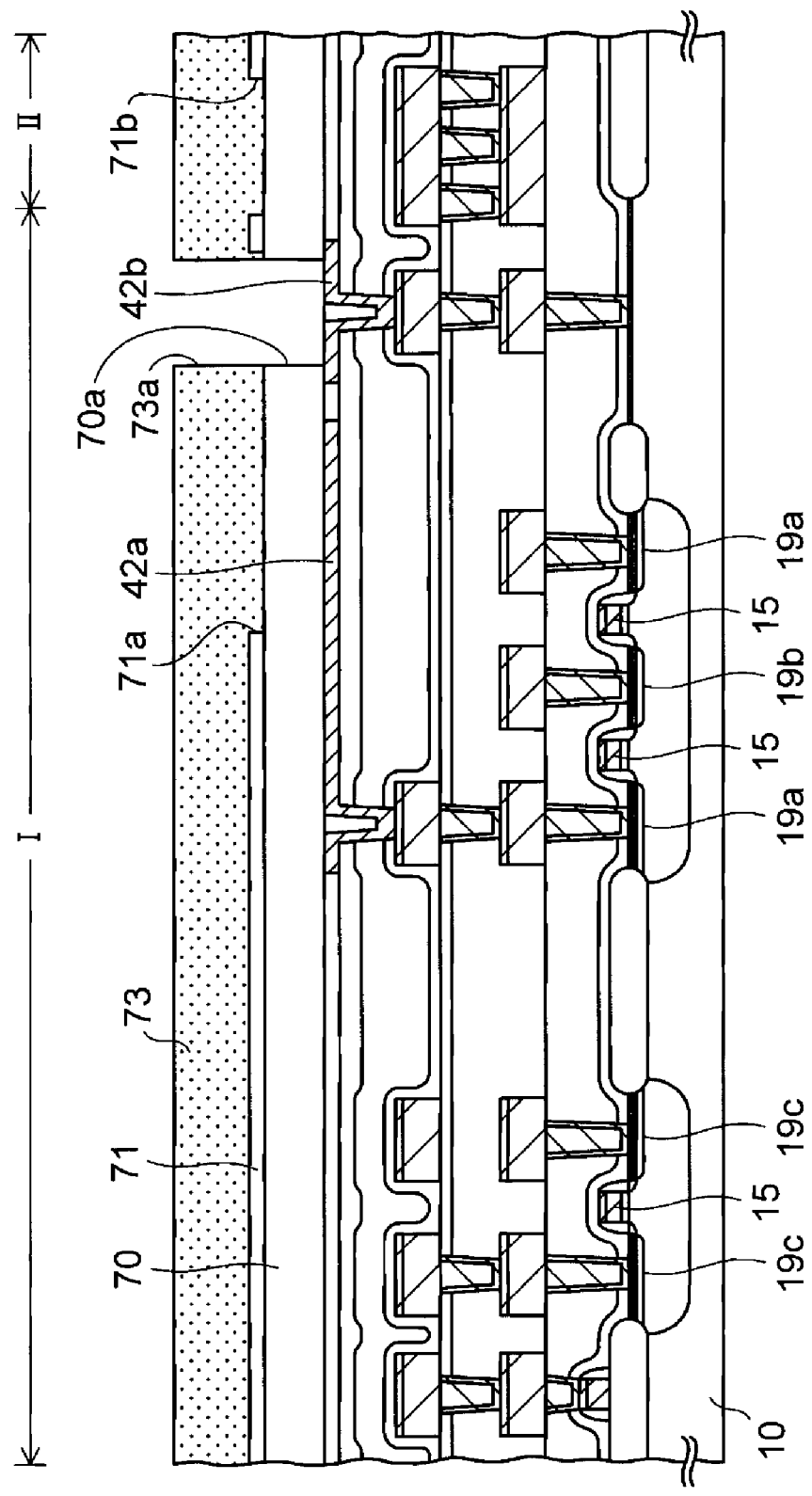
Figure 11E:
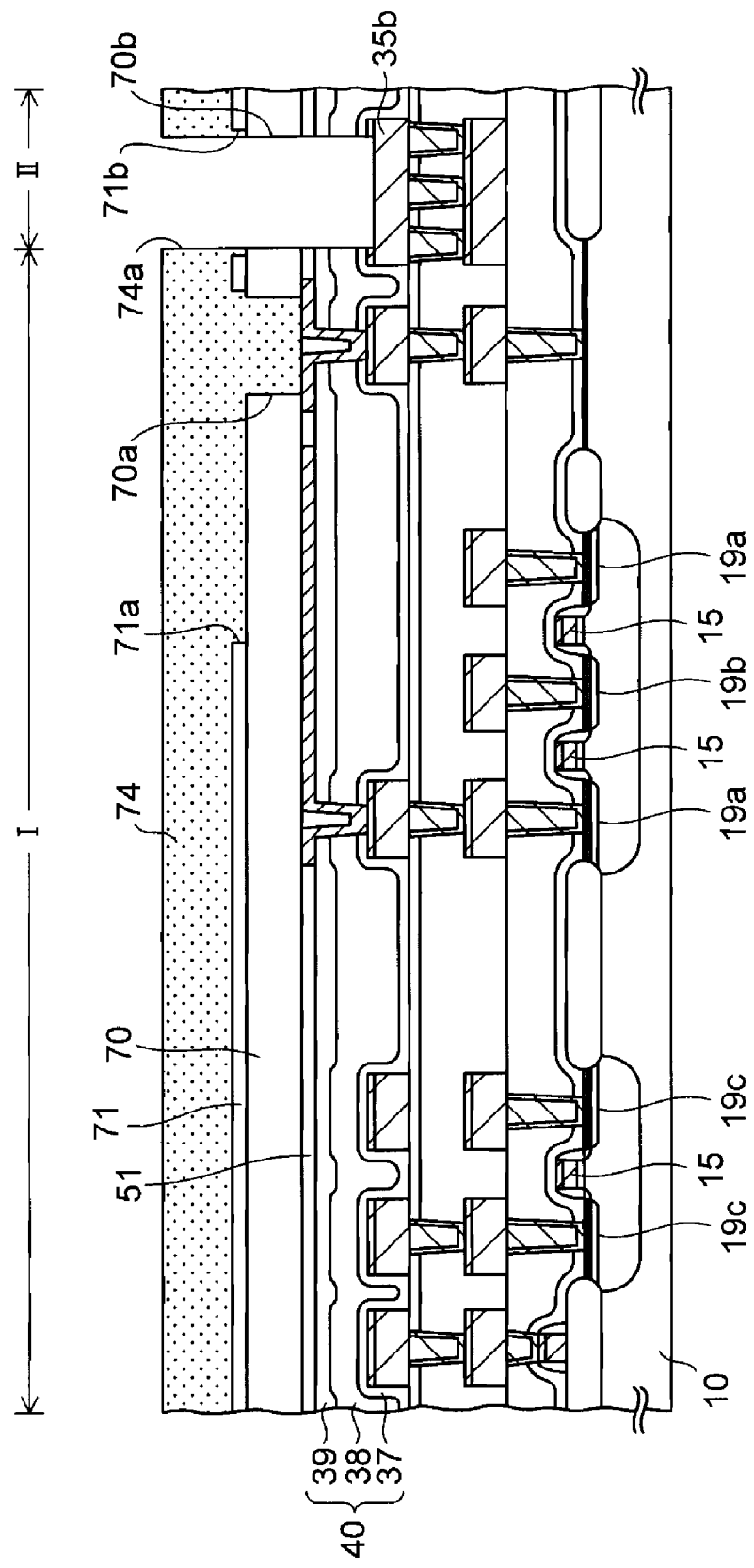
Figure 11F:
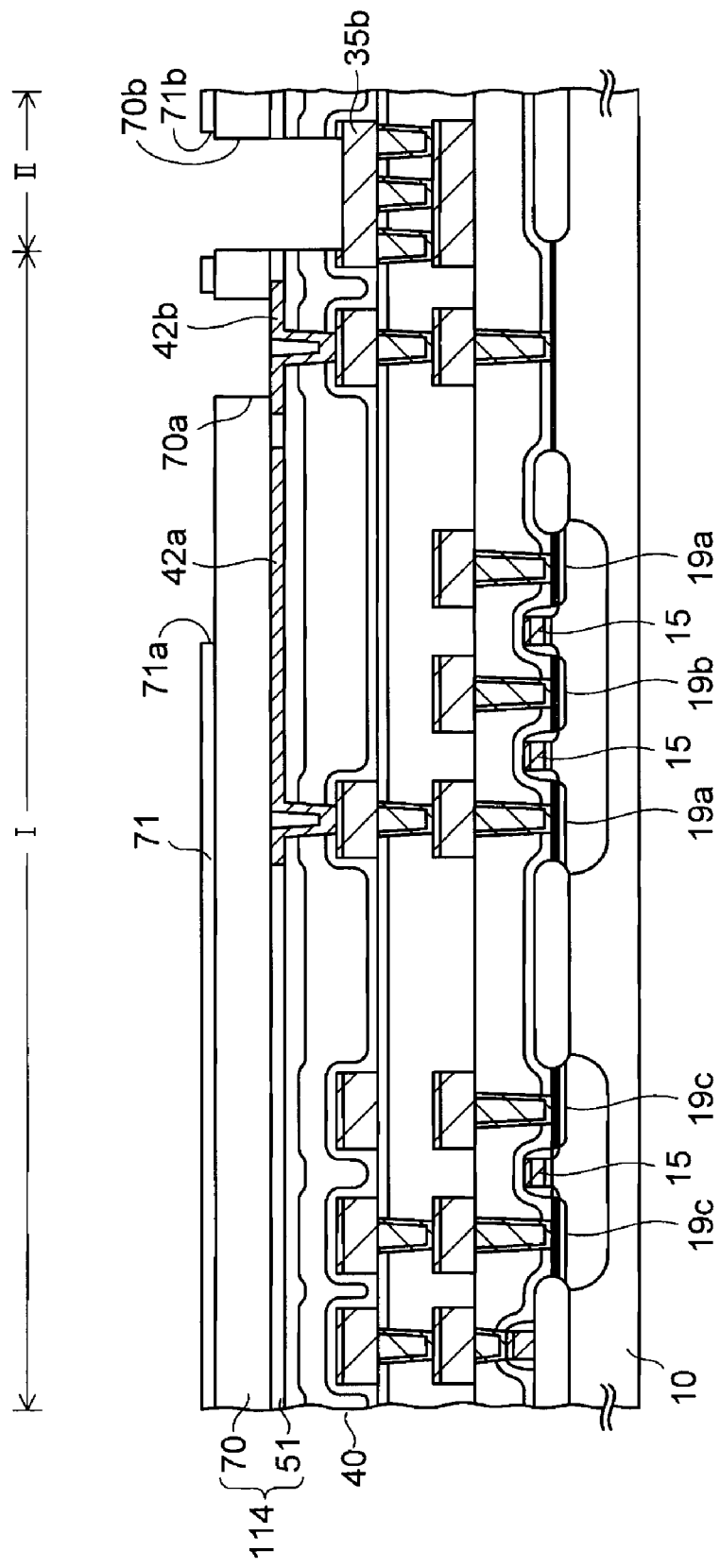

The surface profile sensor illustrated in FIG. 11F in accordance with this embodiment has substantially same structure as the surface profile sensor illustrated in FIG. 5I in accordance with the first embodiment except that the tetrahedral amorphous carbon film is not adhered to the side wall of each of an ESD hole 70a and a electrode drawing window 70b of the bonding pad. Elements in FIG. 11F similar to those in FIG. 5I are given the same reference numeral as in FIG. 5I. The other reference numeral 70 denotes a moisture barrier insulating film made of the silicon nitride film, a reference numeral 71 denotes a protection insulating film made of the tetrahedral amorphous carbon film, a reference numeral 71a denotes a first window (sensor window) formed in the protection insulating film 71 in the region containing the sensor portion and the ESD portion and a reference numeral 71b denotes a second window formed in the protection insulating film 71 in the region containing the electrode drawing window 70b. The cover insulating film 51 and the moisture barrier insulating film 70 serve as an upper insulating film 114.

Also in the surface profile sensor in this embodiment, the tetrahedral amorphous carbon film is used as the protection insulating film 71 as in the surface profile sensor in the first embodiment. As a result, as compared to the case where the polyimide film is used as the protection insulating film, the thickness of the protection insulating film 71 can be greatly reduced to about 100 nm while maintaining mechanical strength. Thereby, detection sensitivity of the fingerprint can be improved while maintaining mechanical strength.

Next, the method for manufacturing the surface profile sensor illustrated in FIG. 11F is described. The manufacturing method is different from the manufacturing methods in the first to third embodiments in that the protection insulating film 71 is left in the protection portion by patterning the protection insulating film 71 before forming the ESD hole 70a and the electrode drawing window 70b of the bonding pad.

Since the processes illustrated in FIG. 1A to FIG. 1T are also performed in this manufacturing method, only the subsequent processes are described.

As illustrated in FIG. 1T, the detection electrode film 42a and the ground electrode film 42b which are connected to the second layer wirings 35a through the holes 40a, 40b, respectively, and which extend on the third interlayer insulating film 40 are formed by patterning. Thereafter, as illustrated in FIG. 11A, a silicon oxide film as the first cover insulating film 51 is formed at a thickness of about 600 nm on the detection electrode film 42a, the ground electrode film 42b and the third interlayer insulating film 40. The first cover insulating film 51 is formed, for example, according to the plasma-enhanced CVD method using TEOS. In this case, it is preferred that the thickness of the first cover insulating film 51 is 1.5 times or more the thickness of the detection electrode film 42a and the ground electrode film 42b.

Next, a process until a cross-sectional structure illustrated in FIG. 11B is obtained is described.

First, the first cover insulating film 51 is polished according to CMP method and the recessed portion between the detection electrode film 42a and the ground electrode film 42b is filled to planarize the surface so as not to generate a step on the surface on which the detection electrode film 42a and the ground electrode film 42b are formed.

Subsequently, a silicon nitride film as the moisture barrier insulating film 70 is formed at a thickness of about 800 nm on the flattened surface. The moisture barrier insulating film 70 is formed in a film-forming temperature of 400° C., for example, according to the plasma-enhanced CVD method using mixed gas of silane and ammonia as reactant gas. The cover insulating film 51 and the moisture barrier insulating film 70 form the upper insulating film 114.

Next, a tetrahedral amorphous carbon film to be the protection insulating film 71 is formed at a thickness of about 100 nm on the moisture barrier insulating film 70. The tetrahedral amorphous carbon film is formed according to the PVD method, the CVD method or the FCVA method. Film-forming conditions of the tetrahedral amorphous carbon film are the same as the film-forming conditions described in the section (Course leading to the embodiments).

Subsequently, as illustrated in FIG. 11C, a nineteenth resist pattern 72 is formed on the protection insulating film 71. The nineteenth resist pattern 72 is provided with a window 72a in which the sensor portion and the ESD portion are included and a window 72b in which the pad portion is included. Subsequently, the first window (sensor window) 71a and the second window 71b are formed by etching and removing the protection insulating film 71 through the windows 72a, 72b of the nineteenth resist pattern 72 to allow the moisture barrier insulating film 70 to be exposed through the windows 71a, 71b and leave the protection insulating film 71 in the protection portion. Etching conditions of the tetrahedral amorphous carbon film as the protection insulating film 71 are the same as those in the first embodiment.

Afterward, the nineteenth resist pattern 72 is removed.

Subsequently, as illustrated in FIG. 1D, a twentieth resist pattern 73 having a window 73a in the ESD portion is formed on the protection insulating film 71 and the moisture barrier insulating film 70. Subsequently, the moisture barrier insulating film 70 is etched and removed through the window 73a of the twentieth resist pattern 73 to form the ESD hole (first hole) 70a in the first window 71a. The ground electrode film 42b is allowed to be exposed through the ESD hole 70a.

Afterward, the twentieth resist pattern 73 is removed.

Subsequently, as illustrated in FIG. 11E, a twenty-first resist pattern 74 having a window 74a in the pad portion is formed on the surface. Subsequently, the moisture barrier insulating film 70, the first cover insulating film 51 and the third interlayer insulating film 40 are etched and removed in this order through the window 74a of the twenty-first resist pattern 74 to form the electrode drawing window (second hole) 70b in the second window 71b.

Next, the titanium nitride film on the surface of the bonding pad 35b is removed by etching to expose copper-containing aluminum film.

Afterward, the twenty-first resist pattern 74 is removed. Then, dehydration treatment is performed in an $N_2$ atmosphere in a substrate temperature of 430° C. for 30 minutes. In this manner, as illustrated in FIG. 11F, the surface profile sensor is completed.

As described above, according to the method for manufacturing the surface profile sensor in accordance with this embodiment, the protection insulating film 71 is formed on the upper insulating film 114 before forming the ESD hole 70a and the electrode drawing window 70b. Afterward, the protection insulating film 71 is left in the protection portion by patterning the protection insulating film 71 (FIG. 11C). Then, the ESD hole 70a and the electrode drawing window 70b of the bonding pad are formed (FIG. 11D to FIG. 11E). Thereafter, the titanium nitride film on the surface of the bonding pad 35b is removed (FIG. 11E).

Therefore, since the surface of the bonding pad 35b is covered with the upper insulating film 114 and the interlayer insulating film 40 when patterning the protection insulating film 71, the bonding pad 35b is protected against the etching gas (oxygen-containing gas) for the protection insulating film 71. Thereby, afterward, a wire can be easily bonded to the surface of the bonding pad 35b on which the aluminum film or the compound film mainly containing aluminum is exposed by etching through the electrode drawing window 70b.

Fifth, Sixth and Seventh Embodiments

Fifth, sixth and seventh embodiments describe cases where the manufacturing method in the fourth embodiment is applied to sensors having the same layer structures above the detection electrode film 42a as those in FIGS. 8H and 9 in the second embodiment and FIG. 10H in the third embodiment, respectively.

Figure 12:
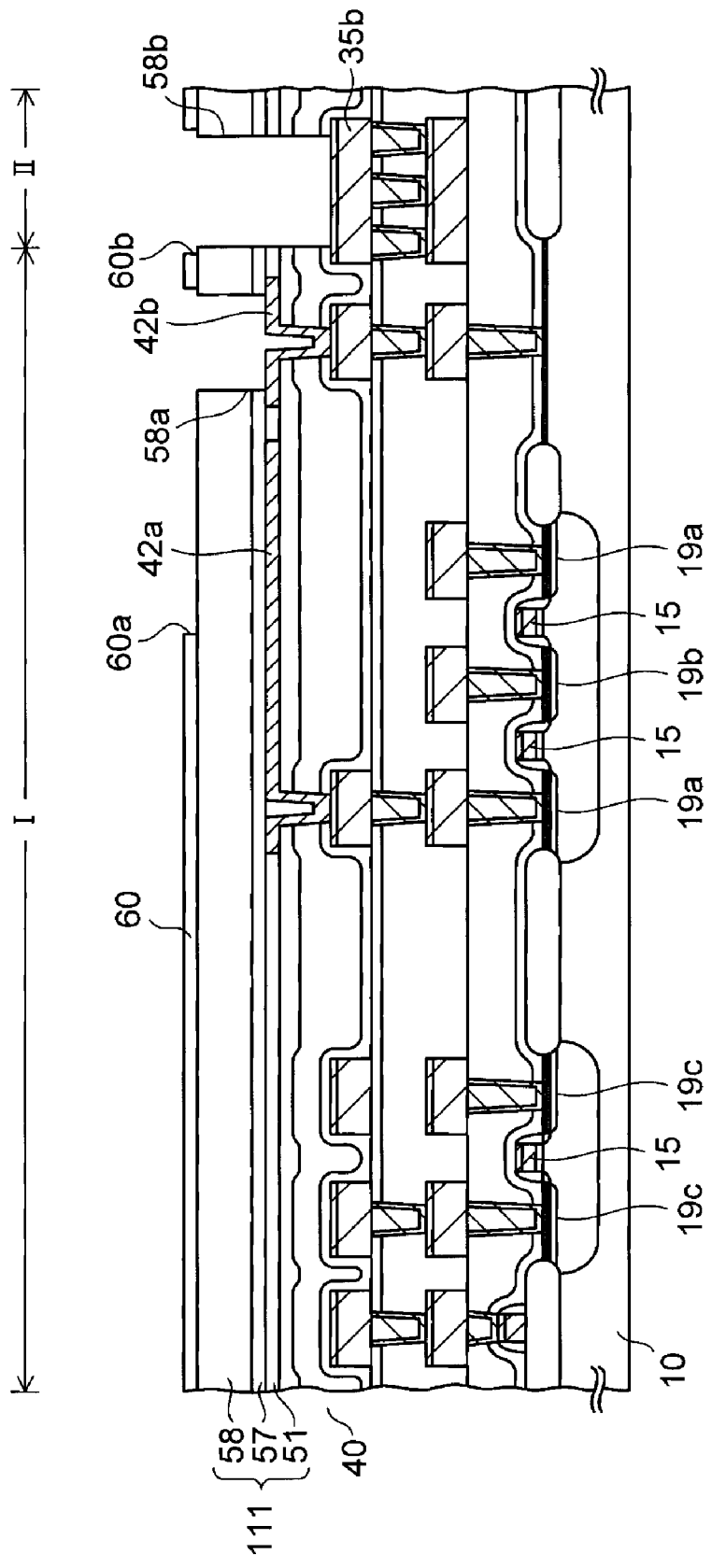
FIG. 12 is a sectional view illustrating configuration of a surface profile sensor according to the fifth embodiment.

FIG. 12 is a sectional view depicting a C-MOS type surface profile sensor on an electrostatic capacitance method in accordance with the fifth embodiment.

The surface profile sensor in accordance with this embodiment has the same layer structure above the detection electrode film 42a as that in FIG. 8H in the second embodiment, and is manufactured in the manufacturing method of the fourth embodiment.

Since the object to be etched during manufacturing process is different, an etching seed suitable for the structure needs to be used. The surface profile sensor thus manufactured is different from the surface profile sensor illustrated in FIG. 8H only in that the tetrahedral amorphous carbon film does not remain on the side walls of the ESD hole 58a and the electrode drawing window 58b of the pad portion. Elements in FIG. 12 similar to those in FIG. 8H are given the same reference numerals as those in FIG. 8H.

Figure 13:
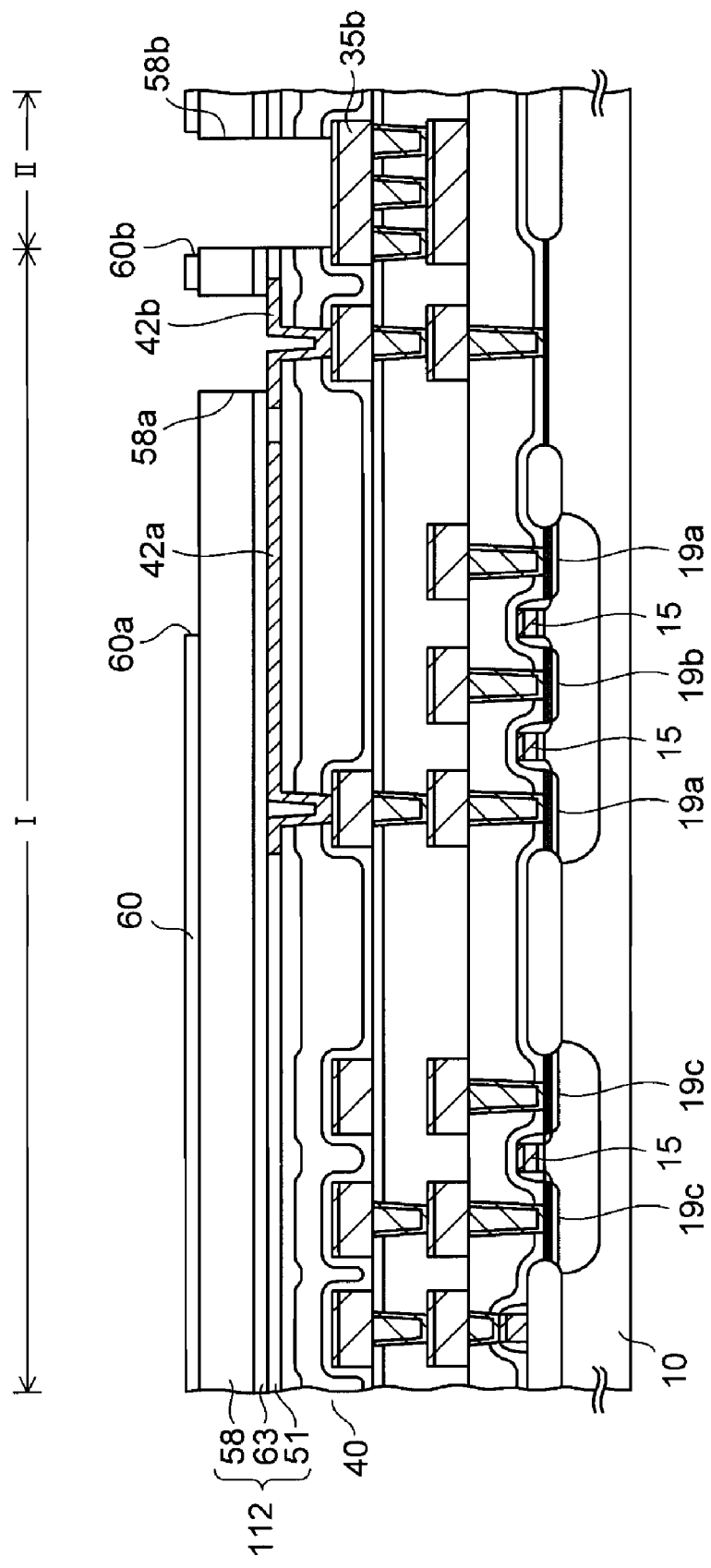
FIG. 13 is a sectional view illustrating configuration of a surface profile sensor according to the sixth embodiment.

FIG. 13 is a sectional view illustrating a C-MOS type surface profile sensor on an electrostatic capacitance method in accordance with the sixth embodiment.

The surface profile sensor in accordance with this embodiment has the same layer structure above the detection electrode film 42*a* as that in FIG. 9 in the second embodiment, and is manufactured in the manufacturing method of the fourth embodiment.

Since the object to be etched during manufacturing process is different, an etching seed suitable for the structure needs to be used. The surface profile sensor thus manufactured is different from the surface profile sensor illustrated in FIG. 9 only in that the tetrahedral amorphous carbon film does not remain on the side walls of the ESD hole 58*a* and the electrode drawing window 58*b* of the pad portion. Elements in FIG. 13 similar to those in FIG. 9 are given the same reference numerals as those in FIG. 9.

Figure 14:
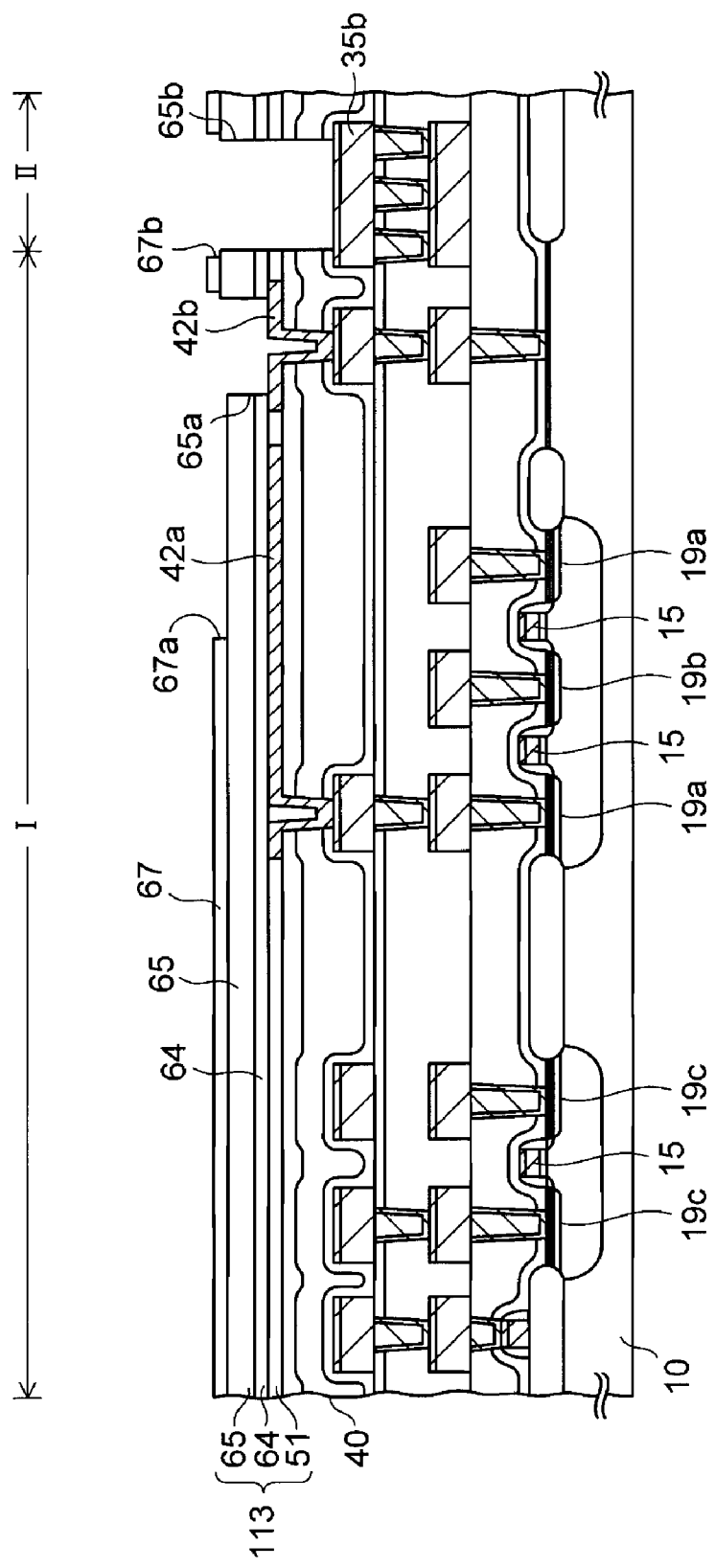
FIG. 14 is a sectional view illustrating configuration of a surface profile sensor according to the seventh embodiment.

FIG. 14 is a sectional view illustrating a C-MOS type surface profile sensor on an electrostatic capacitance method in accordance with the seventh embodiment.

The surface profile sensor in accordance with this embodiment has the same layer structure above the detection electrode film 42*a* as that in FIG. 10H in the third embodiment, and is manufactured in the manufacturing method of the fourth embodiment.

Since the object to be etched during manufacturing is different, an etching seed suitable for the structure needs to be used. The surface profile sensor thus manufactured is different from the surface profile sensor illustrated in FIG. 10H only in that the tetrahedral amorphous carbon film does not remain on the side walls of the ESD hole 58*a* and the electrode drawing window 65*b* of the pad portion. Elements in FIG. 14 similar to those in FIG. 10H are given the same reference numerals as those in FIG. 10H.

Also, in the surface profile sensors in these embodiments, the tetrahedral amorphous carbon film is used as the protection insulating films 60, 67 as in the surface profile sensors in the second and third embodiments. Accordingly, as compared to the case where the polyimide film is used, the thickness of the protection insulating films 60, 67 can be greatly reduced to about 100 nm while maintaining mechanical strength. Thereby, detection sensitivity of the fingerprint can be improved while maintaining mechanical strength.

Since the fourth embodiment is applied to these manufacturing methods, as in the fourth embodiment, the copper-containing aluminum film which is the base of the bonding pad 35*b* can be protected against etching gas (oxygen-containing gas) for the tetrahedral amorphous carbon film.

Eighth Embodiment

Figure 15A:
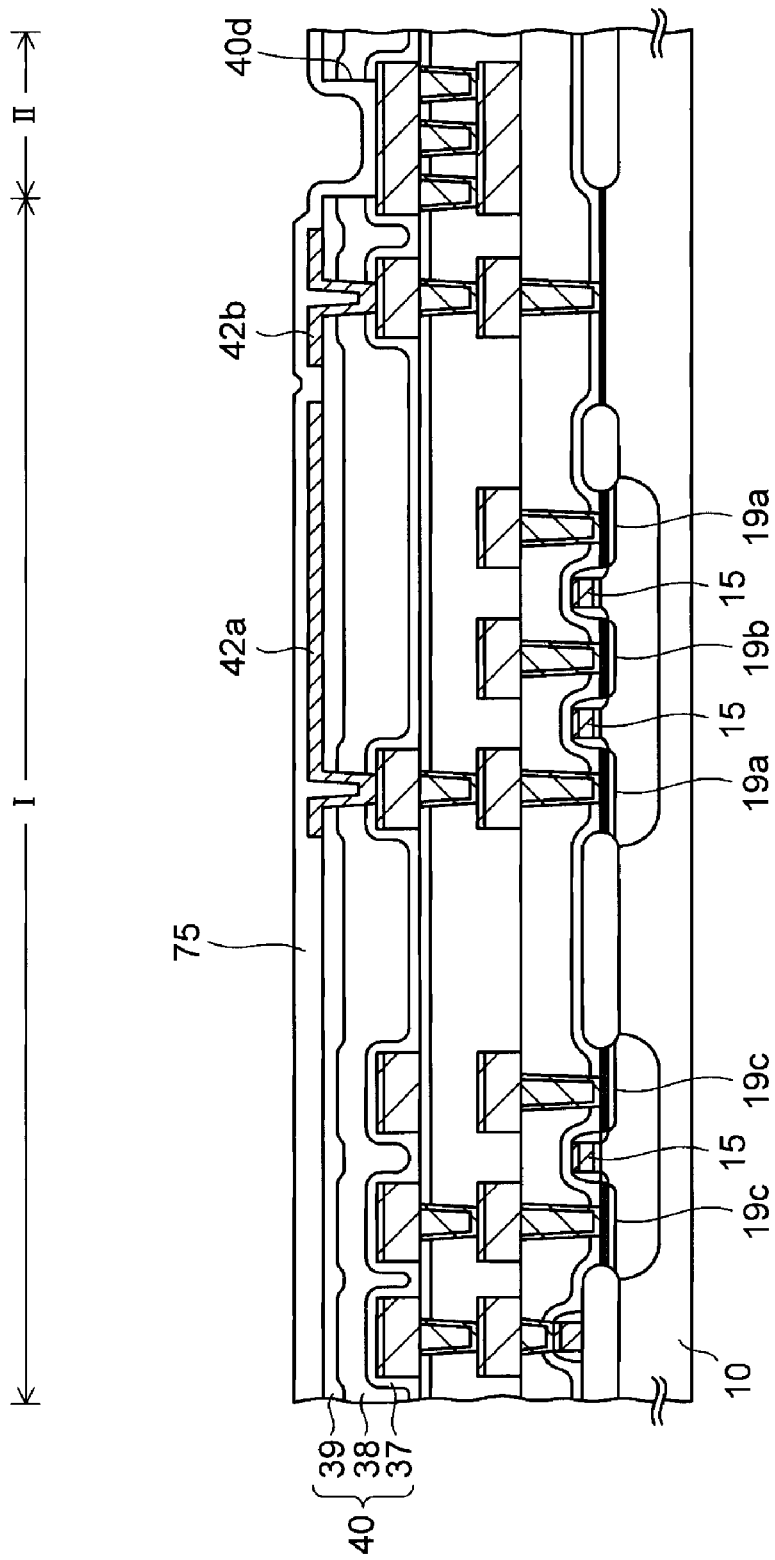
FIGS. 15A to 15C are sectional views illustrating a manufacturing process of a surface profile sensor according to the eighth embodiment.
Figure 15B:
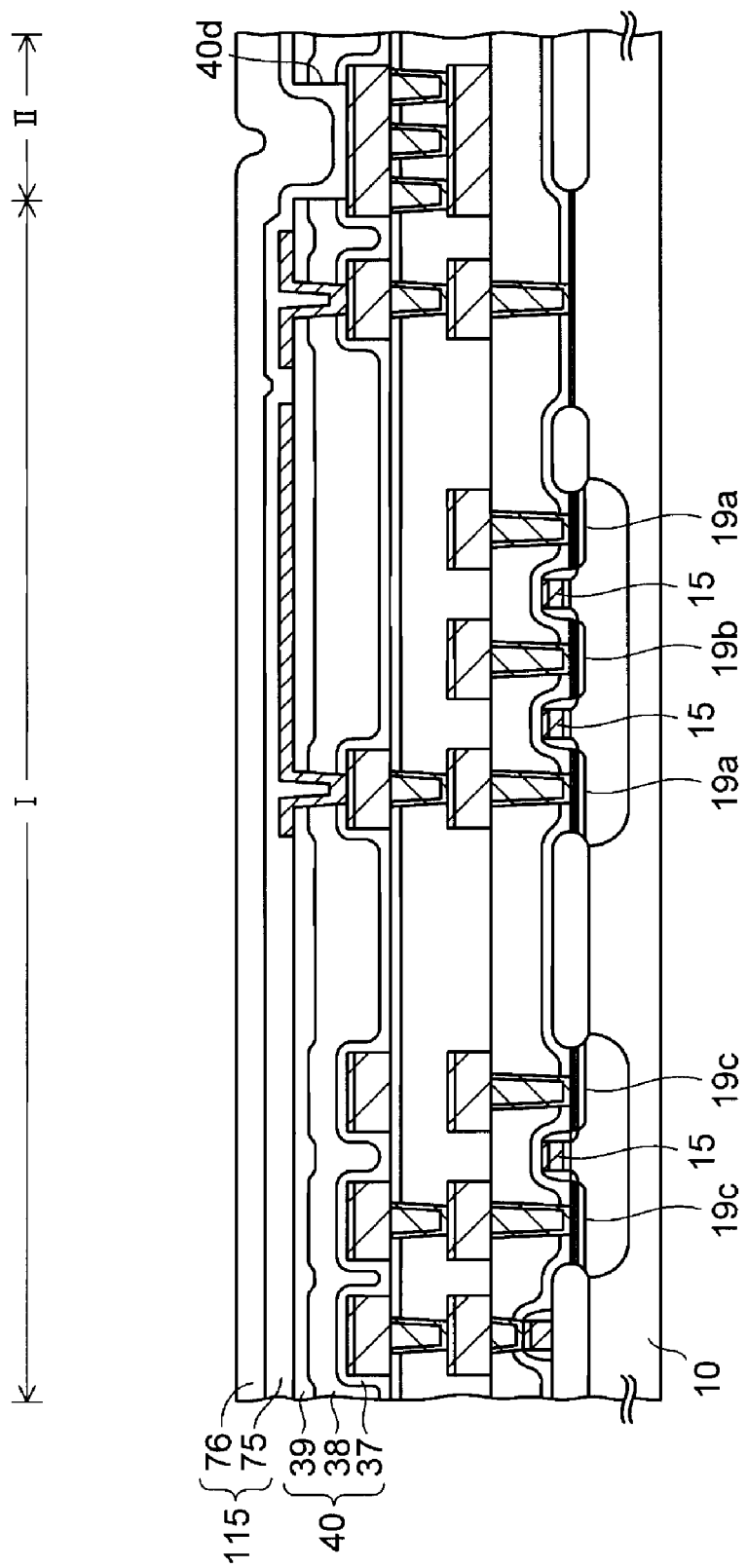
Figure 15C:
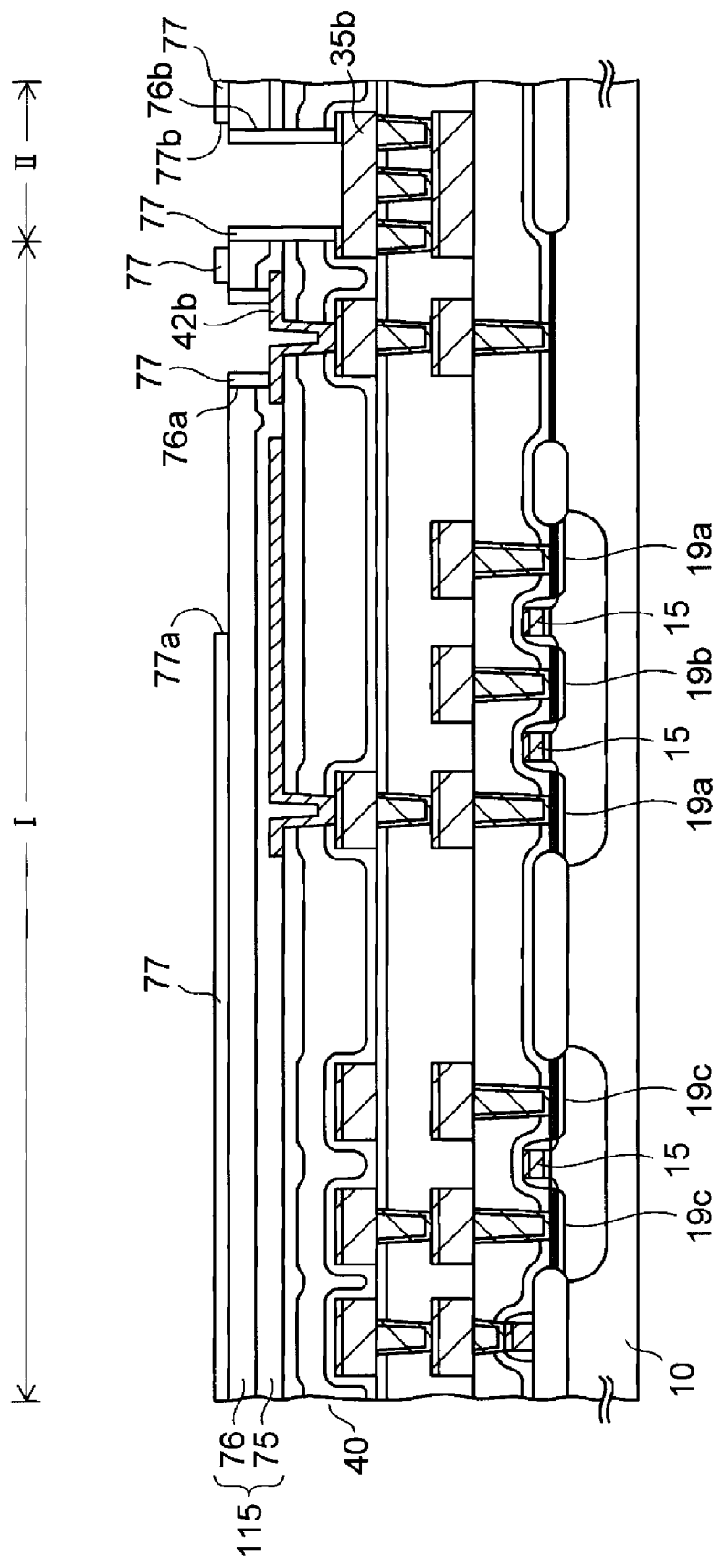

With reference to FIG. 15A to FIG. 15C, a C-MOS type surface profile sensor on an electrostatic capacitance method in accordance with the eighth embodiment and a manufacturing method thereof are described.

As illustrated in FIG. 15C, the surface profile sensor in this embodiment is different from the surface profile sensor in the above-mentioned embodiments in that a SOG (Spin On Glass) film is used as a cover insulating film 75. Elements in FIG. 15C similar to those in FIG. 5I are given the same reference numerals as those in FIG. 5I. A reference numeral 76 denotes a moisture barrier insulating film and a reference numeral 77 denotes a protection insulating film made of a tetrahedral amorphous carbon film. The cover insulating film 75 and the moisture barrier insulating film 76 serve as an upper insulating film 115.

In the surface profile sensor in this embodiment, the tetrahedral amorphous carbon film is used as the protection insulating film 77 as in the surface profile sensors in the above-mentioned embodiments. Accordingly, as compared to the case where the polyimide film is used as the protection insulating film 77, the thickness of the protection insulating film 77 can be greatly reduced to about 100 nm while maintaining mechanical strength. Thereby, detection sensitivity of the fingerprint can be improved while keeping the mechanical strength.

Since the processes illustrated in FIG. 1A to FIG. 1T and the process illustrated in FIG. 5A are also performed in this manufacturing method, description is performed from the subsequent process.

As illustrated in FIG. 5A, the hole 40*d* in which the titanium nitride film on the surface of the bonding pad 35*b* is exposed is formed in the third interlayer insulating film 40 by patterning through a hole 50*a* of the resist pattern. Thereafter, as illustrated in FIG. 15A, an SOG film as the cover insulating film 75 having a film thickness of about 300 nm is formed according to the coating method on the interlayer insulating film 40, the detection electrode film 42*a* and the ground electrode film 42*b* so as to cover the hole 40*d*. In this case, it is preferred that the thickness of the cover insulating film 51 is 1.5 times or more the thickness of the detection electrode film 42*a* and the ground electrode film 42*b*. Since the SOG film has low viscosity, its surface can be easily made flat as it is. Thus, it is possible to omit the process of planarizing the surface of the SOG film according to the CMP method or the like.

Next, as illustrated in FIG. 15B, a silicon nitride film as the moisture barrier insulating film 76 is formed at a thickness of about 700 nm on the cover insulating film 75 so as to cover the hole 40*d*. The cover insulating film 75 and the moisture barrier insulating film 76 form the upper insulating film 115.

Subsequently, processes same as the processes illustrated in FIG. 8B to FIG. 8G are performed, and the structure illustrated in FIG. 15C is formed. In the etching process of the SOG film among these processes, the SOG film is etched using mixed gas of $CHF_3$ (300 sccm) and $O_2$ (50 sccm) and under pressure of 80 mTorr and treatment power (RF power) of 1600 W.

In FIG. 15C, a reference numeral 76*a* denotes an ESD hole (first hole) formed in the ground electrode film 42*b* and a reference numeral 76*b* denotes a electrode drawing window (second hole) formed on the bonding pad 35*b*. On the surface of the bonding pad 35*b* exposed in the electrode drawing window 76*b*, the titanium nitride film is removed to allow the copper-containing aluminum film to be exposed. A reference numeral 77 denotes a protection insulating film made of a tetrahedral amorphous carbon film formed on the moisture barrier insulating film 76. The tetrahedral amorphous carbon film is formed so as to have a thickness of about 100 nm according to the PVD method, the CVD method or the FCVA method and is selectively etched under any of the above-mentioned etching conditions to cover the protection portion.

Since the sensor is formed in the same manufacturing process as that illustrated in FIG. 8C to FIG. 8D, the tetrahedral amorphous carbon film remains on the side walls of the ESD hole 76*a* and the electrode drawing window 76*b*. The remaining film does not influence subsequent wire bonding and operations of elements.

As described above, according to the method for manufacturing the surface profile sensor in accordance with the eighth embodiment, the manufacturing process can be simplified, since it is possible to omit the process of planarizing the surface of the SOG film being the first cover insulating film according to the CMP method or the like.

Moreover, the titanium nitride film on the surface of the bonding pad 35b is left until the protection insulating film 77 is formed so as to cover the hole 40d (FIG. 8D) after the hole 40d is formed on the bonding pad 35b (FIG. 5A), and then patterned (FIG. 8E to FIG. 8F). It is only after patterning of the protection insulating film 77 (FIG. 8F) that the titanium nitride film on the surface of the bonding pad 35b is removed (FIG. 8G).

As described above, since the surface of the bonding pad 35b is covered with the titanium compound film when patterning the protection insulating film 77, the aluminum film or the compound film mainly containing aluminum under the titanium compound film can be prevented from being oxidized by etching gas (oxygen-containing gas) for the protection insulating film 77. Thereby, a wire can be easily bonded to the surface of the bonding pad 35b on which unoxidized aluminum film or compound film mainly containing aluminum is exposed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A surface profile sensor comprising:
   an interlayer insulating film formed above a semiconductor substrate, the interlayer insulating film including a planarized upper surface;
   a detection electrode film formed on the interlayer insulating film;
   an upper insulating film formed on the detection electrode film and the interlayer insulating film, the upper insulating film including a surface on which a silicon nitride film is exposed; and
   a protection insulating film formed on the upper insulating film, the protection insulating film made of a tetrahedral amorphous carbon (ta-C) film including a window formed above the detection electrode film, wherein
   the tetrahedral amorphous carbon (ta-C) film does not cover the window.

2. The surface profile sensor according to claim 1, wherein the upper insulating film includes a first cover insulating film being formed on the interlayer insulating film at least on a vicinity of the detection electrode film and planarizing a surface including the detection electrode film, and the silicon nitride film formed above the first cover insulating film and the detection electrode film.

3. The surface profile sensor according to claim 2, further comprising:
   a second cover insulating film formed on the surface planarized by the first cover insulating film and under the silicon nitride film.

4. The surface profile sensor according to claim 3, wherein the second cover insulating film is one selected from a group consisting of a silicon oxide film, a silicon oxy-nitride film and an insulating metal oxide film.

5. The surface profile sensor according to claim 4, wherein the insulating metal oxide film is one selected from a group consisting of an aluminum oxide film, a titanium oxide film, a zirconium oxide film, a magnesium oxide film and a magnesium titanium oxide film.

6. The surface profile sensor according to claim 1, wherein a thickness of the protection insulating film is 10 to 200 nm.

7. The surface profile sensor according to claim 1, further comprising:
   a base insulating film formed above the semiconductor substrate; and
   a wiring formed on the base insulating film, wherein
   the interlayer insulating film is formed on the base insulating film and the wiring, the interlayer insulating film including a via hole on the wiring, and
   the detection electrode film is electrically connected to the wiring through the via hole.

8. The surface profile sensor according to claim 1, further comprising:
   a ground electrode film formed on the interlayer insulating film under the window and in the same layer as the detection electrode film, the ground electrode film being separate from the detection electrode film, wherein
   the ground electrode film is exposed through a first hole formed in the upper insulating film on the ground electrode film.

9. The surface profile sensor according to claim 8, wherein the detection electrode film and the ground electrode film are films made of any one of titanium and a titanium compound, respectively.

10. The surface profile sensor according to claim 9, wherein the titanium compound is titanium nitride or titanium nitride aluminum.

11. The surface profile sensor according to claim 7, further comprising a bonding pad on the base insulating film, the bonding pad including an aluminum film or a compound film mainly containing aluminum, and a titanium compound film on the aluminum film or the compound film, wherein
   the aluminum film or the compound film mainly containing aluminum of the bonding pad is exposed through a second hole formed in the interlayer insulating film and the upper insulating film on the bonding pad.

12. The surface profile sensor according to claim 1, wherein the protection insulating film is configured to be touched by a subject.

* * * * *